(12) United States Patent
Nakatani et al.

(10) Patent No.: US 6,919,301 B2
(45) Date of Patent: Jul. 19, 2005

(54) GREASE COMPOSITION AND ROLLING APPARATUS

(75) Inventors: Shinya Nakatani, Fujisawa (JP); Hirotoshi Miyazima, Hiratsuka (JP); Michita Hokao, Inagi (JP)

(73) Assignee: NSK Ltd., Tokyo (JP)

( * ) Notice: Subject to any disclaimer, the term of this patent is extended or adjusted under 35 U.S.C. 154(b) by 80 days.

(21) Appl. No.: 10/270,477

(22) Filed: Oct. 15, 2002

(65) Prior Publication Data

US 2003/0176298 A1 Sep. 18, 2003

(30) Foreign Application Priority Data

| Oct. 16, 2001 | (JP) | 2001-318685 |
| Jan. 31, 2002 | (JP) | 2002-024520 |
| Feb. 6, 2002 | (JP) | 2002-029996 |
| Jun. 12, 2002 | (JP) | 2002-171693 |
| Aug. 28, 2002 | (JP) | 2002-249022 |
| Aug. 28, 2002 | (JP) | 2002-249024 |

(51) Int. Cl.[7] .................... C10M 123/06; C10M 123/02
(52) U.S. Cl. .................. 508/391; 508/399; 508/400; 508/485; 508/516; 508/525; 508/552
(58) Field of Search .......................... 508/391

(56) References Cited

U.S. PATENT DOCUMENTS

| 4,597,880 A | * | 7/1986 | Eliades ................... 508/401 |
| 4,902,435 A | * | 2/1990 | Waynick .................. 508/163 |
| 5,084,193 A | * | 1/1992 | Waynick .................. 508/528 |
| 5,126,062 A | * | 6/1992 | Barnes .................... 508/163 |
| 5,308,514 A | * | 5/1994 | Olson et al. .............. 508/155 |
| 5,338,467 A | * | 8/1994 | Olson et al. .............. 508/186 |
| 5,589,444 A | * | 12/1996 | Hatakeyama ............. 508/168 |
| 5,607,906 A | * | 3/1997 | Okaniwa et al. .......... 508/168 |
| 5,840,666 A | * | 11/1998 | Yokouchi et al. ......... 508/291 |
| 6,020,290 A | * | 2/2000 | Takata et al. ............. 508/364 |
| 6,037,314 A | * | 3/2000 | Kondo et al. ............. 508/363 |
| 6,214,778 B1 | * | 4/2001 | Todd ...................... 508/518 |
| 6,432,889 B1 | * | 8/2002 | Kinoshita et al. ......... 508/399 |

FOREIGN PATENT DOCUMENTS

| JP | 6-31375 | 8/1986 |
| JP | 6-92592 | 6/1989 |
| JP | 2544952 | 7/1989 |
| JP | 2862612 | 9/1991 |
| JP | 5-8760 | 2/1993 |
| JP | 5-86389 | 4/1993 |
| JP | 6-1989 | 1/1994 |
| JP | 2864473 | 1/1994 |
| JP | 8-20789 | 1/1996 |
| JP | 2001-3074 | 1/2001 |
| JP | 2001-187891 | 7/2001 |

OTHER PUBLICATIONS

Arthur T. Polishuk. "A Brief History of Lubricating Greases" 1998.

* cited by examiner

*Primary Examiner*—Ellen M McAvoy
(74) *Attorney, Agent, or Firm*—Crowell & Moring LLP

(57) ABSTRACT

A grease composition with a thickener of a calcium sulfonate complex and a second thickener component in a base oil. The second thickener component may be, for instance, polyurea, a metallic soap, a complex metallic soap or an N-substituted terephthalamic acid metal salt. Alternatively, a grease composition with a thickener of an N-substituted terephthalamic acid metal salt and a second thickener component in a base oil. Furthermore, a grease composition with a thickener component of polyurea and complex metallic soap in an ester oil. Still further, a grease composition with a thickener of polyurea and a complex metallic soap in a base oil.

20 Claims, 9 Drawing Sheets

GREASE COMPOSITION AND ROLLING APPARATUS

BACKGROUND OF THE INVENTION

1. Field of the Invention

The present invention relates to a grease composition having excellent heat resistance, load carrying capacity, water resistance and lubricating life, and a grease composition having excellent heat resistance, load carrying capacity, water resistance, lubricating life and biodegradability. Particularly, the present invention relates to a grease composition, which can preferably be used for lubrication of the rolling and abrading portions of iron manufacturing machines, construction machines, cars and others, which are used under high load. Moreover, the present invention relates to a rolling apparatus which is long-lived although it is used under strict conditions, and a rolling apparatus which is long-lived although it is used under strict conditions and produces little adverse effect to the environment.

Furthermore, the present invention relates to a grease composition having excellent heat resistance, oxidation stability and lubricating life, and a grease composition having excellent heat resistance, oxidation stability, lubricating life and biodegradability. Further, the present invention relates to a rolling apparatus which is long-lived, and a rolling apparatus which is long-lived and produces little adverse effect to the environment.

Still further, the present invention relates to a grease composition, which generates a few dusts at a high temperature and has excellent high-temperature performance. Further, the present invention relates to a rolling apparatus, which has low torque and excellent acoustic performance and generates a few dusts at a high temperature, and in particular, the present invention relates to a rolling apparatus which is preferably used in electronic intelligence equipment, semiconductor manufacturing machines and others.

Still further, the present invention relates to a grease composition, which has excellent performance under a high-speed and high-temperature environment and can significantly improve the seizuring life of a rolling apparatus. Further, the present invention relates to a rolling apparatus having excellent seizuring life under a high-speed and high-temperature environment, and it particularly relates to a rolling apparatus which is preferably used in cars, rolling stocks, electric motors, iron manufacturing machines, machine tools and others.

2. Description of the Related Art (1) With the development of mechanical technology in recent years, mechanical devices tend to be directed toward downsizing, weight saving and high-speed rotation. For this reason, mechanical portions such as a bearing and a gear become increasingly exposed at a high temperature.

On the other hand, with recent requirements for resources and power saving efforts, maintenance-free mechanical devices have been developed. For this reason, greases used in such mechanical devices are required to have heat resistance and lubricating life, which are more excellent than those of the conventional mechanical devices. Of these mechanical devices, iron manufacturing machines (e.g. a work roll of a rolling mill, etc.), construction machines, cars (e.g. a wheel bearing, etc.) and others are often used in contact with water, and so greases used in these machines are required to have excellent water resistance, load carrying capacity and durability.

At present, examples of a grease for high-temperature use include a complex metallic soap grease comprising, as a thickener, a complex metallic soap such as Ca, Al and Li complexes. Moreover, examples of a grease for high-temperature use also include an organic grease comprising an organic compound such as polyurea, a terephthalamic acid metal salt or polytetrafluoroethylene (PTFE), an inorganic grease comprising an inorganic compound such as bentonite or silica gel, and others.

Furthermore, as a general-purpose grease, a grease comprising a metallic soap, especially a lithium soap as a thickener has broadly been used. This is because the metallic soap has excellent thickening property and operability as well as being low-cost, and also because the lithium soap has well-balanced properties such as heat resistance, torque property, acoustic property and structural stability, which are required as properties for a grease.

Still further, as a grease having excellent water resistance, rust protection, heat resistance and load carrying capacity, there is known a calcium sulfonate complex grease, which comprises, as a thickener (an organic thickener), a calcium sulfonate complex containing calcium carbonate (Japanese Patent Publication No. 5-8760).

However, each of these greases has a problem. For example, once the above described complex metallic soap grease contains a large amount of water, then it cannot maintain the grease structure for a long time.

Moreover, while the metallic soap grease has excellent lubricating property, it cannot maintain the grease structure for a long time at a high temperature. Although the lithium soap grease is the most heat resistant, it has significantly decreased lubricating life at a high temperature over 130° C.

Furthermore, the organic grease comprising polyurea is likely to cause hardening phenomenon, and the organic grease comprising a terephthalamic acid metal salt causes large oil separation though it has excellent heat resistance. Further, the inorganic grease comprising bentonite or silica gel has insufficient lubricating and anticorrosive properties.

Still further, the calcium sulfonate complex grease comprises calcium carbonate, which is dispersed in a colloid state therein, and it has a small particle size of 0.2 to 0.5 $\mu$m. Accordingly, this grease has a low ability to maintain oil. When this grease is used for a long time for lubrication of rolling and abrading portions such as a bearing or gear, which are used under particularly high load, this grease causes problems regarding load carrying capacity such that uneven wear occurs in the above portions or that the temperature abnormally increases, and further, this grease has insufficient durability. Still further, since this grease tends to harden when water is mixed therein, in some cases, this grease has a problem with durability or pressure transmitting property.

On the other hand, when each of the above greases is used in various types of mechanical devices, the grease is often released to the environment, and thus the grease causes a risk of having adverse effect on the environment. To solve this problem, Japanese Patent Laid-Open Nos. 5-86389, 6-1989 and 8-20789 propose greases in which a polyol ester oil or plant oil is used as a base oil so as to impart biodegradability to the greases. However, the greases described in the above publications have a problem that their lubricating life and oxidation stability are insufficient.

Thus, it is a first object of the present invention to solve the above described problems of the prior art techniques and to provide a grease composition having excellent heat resistance, load carrying capacity, water resistance and lubricating life, and a grease composition having excellent heat resistance, load carrying capacity, water resistance, lubricating life and biodegradability.

Moreover, it is also the first object of the present invention to provide a rolling apparatus which is long-lived although being used under strict conditions, and a rolling apparatus which is long-lived although being used under strict conditions and has little adverse effect on the environment.

It is a second object of the present invention to solve the above described problems of the prior art techniques and to provide a grease composition having excellent heat resistance, oxidation stability and lubricating life, and a grease composition having excellent heat resistance, oxidation stability, lubricating life and biodegradability.

Moreover, it is also the second object of the present invention to provide a rolling apparatus which is long-lived, and a rolling apparatus which is long-lived and has little adverse effect on the environment.

(2) Generally, rolling apparatuses (e.g. rolling bearings, linear guide apparatuses, ball screws, etc.), which are used in electronic intelligence equipment, semiconductor manufacturing machines and others such as a hard disk drive (hereinafter referred to as HDD) or laser beam printer (LBP), are required to have various performances such that these apparatuses generate a few dusts, have low torque and excellent acoustic performance, and are long-lived.

Moreover, with the development of high-precision electronic intelligence equipment and semiconductors in recent years, the use conditions (temperature, speed, etc.) of rolling apparatuses, which are used in electronic intelligence equipment and semiconductor manufacturing machines, have become increasingly strict. Under such strict use conditions, the above stated various types of performance are required to be excellent.

For example, in the case of electronic intelligence equipment such as HDD used under a clean atmosphere, if the fine particles of a gaseous oil or grease are released from the inside of a bearing when a rolling apparatus rotates, the fine particles pollute a recording medium or the like and cause mechanical errors. Therefore, it is the most important to suppress the amount of dusts generated.

As a grease composition enclosed in such a rolling bearing for HDD, Undock C (Trade name) produced by ExxonMobil, which is a grease comprising a mineral oil as a base oil and a sodium complex soap as a thickener, is well known, and this product has been used over 20 years because it causes a small amount of dusts.

Nevertheless, in the above described sodium complex soap-mineral oil grease, the dispersibility of the thickener is insufficient and so it hardly becomes homogenous, and thereby problems regarding acoustic and vibration performances occur in the early stage of rotation of the rolling bearing. In addition, since this grease has high hygroscopicity and gets hard over time, and thereby the flowability in the rolling bearing decreases, this grease also has the problem of causing insufficient lubrication and readily generating abnormal sounds generated from the cage.

Therefore, when special emphasis is placed on low torque and low noise, a grease comprising a lithium soap as a thickener and an ester oil as a base oil is used at times. However, since this grease is easily dispersed (causes a large amount of dusts), there is a great risk that the grease might pollute a recording medium or the like when it is used in a rolling bearing for HDD. Moreover, since the temperature used for the rolling bearing for HDD is more and more increased, the above described lithium soap-esteroil grease cannot be applied in some cases.

As a grease having excellent high-temperature performance, a urea grease comprising a urea compound as a thickener is known. However, since this urea grease generally does not have sufficient acoustic performance, when emphasis is placed on acoustic performance, it is difficult to use this grease. Under these circumstances, urea greases having improved acoustic performance have been proposed (Japanese Patent Publication No. 6-92592 and Japanese Patent Gazette No. 2864473), but these greases also have a problem that they are more expensive than greases comprising a metallic soap as a thickener.

Thus, it is a third object of the present invention to solve the above described problems of the prior art techniques and to provide a grease composition which causes a few dusts even at a high temperature and has excellent high-temperature performance. It is also the third object of the present invention to provide a rolling apparatus which has low torque and excellent acoustic performance and generates a few dusts even at a high temperature.

(3) In recent years, various types of machines such as cars, rolling stocks, electric motors, iron manufacturing machines and machine tools tend to be directed toward downsizing, weight saving and speeding up. With this phenomenon, a grease for a rolling apparatus (e.g. a rolling bearing, a linear guide apparatus, a ball screw, etc.), which is incorporated into each of the above various machines, is used at a higher speed and a higher temperature, and the use conditions of this grease become extremely severe.

For example, in a car equipped with a disk brake, a grease used in the wheel bearing could have a high temperature of 150 to 200° C. due to friction heat generated as a result of actuation of the brake. If the grease has such a high temperature, there is a risk that the grease might soften, flow and run out of a hub, or deterioration by oxidation might quickly progress, resulting in insufficient lubrication.

The electric motor of a rolling stock has been shifted from a direct-current motor to an induction motor, and therefore the use conditions of a grease for the electric motor are directed to the use under a high-speed and high-temperature environment. That is to say, the dmN value of a bearing used in an electric motor increases from 300,000 to 800,000, and with this change, the temperature of the bearing also increases from about 80° C. to about 100° C. It should be noted that, herein, dm of the dmN value means the pitch circle diameter (unit: mm) of a rolling bearing, and N of the dmN value means rotation speed (unit: $min^{-1}$).

Under these circumstances, a grease used in a rolling apparatus incorporated in each of the above various types of machines is required to have excellent performance even extremely severe conditions such as a high speed and a high temperature.

Moreover, for each of the above various types of machines, there are not only requirements for downsizing, weight saving and speeding up, but there are also strong requirements for maintenance-free. Accordingly, a rolling apparatus incorporated in each of the above various types of machines is required to have excellent seizuring life.

As a grease composition used in the rolling apparatus incorporated in each of the above various types of machines, a grease composition comprising a metallic soap such as a lithium soap has previously been used, but in recent years, a grease composition comprising a complex metallic soap has largely been used to improve heat resistance.

An example of such a grease composition comprising a complex metallic soap includes a grease composition comprising a lithium complex soap, which is described in Japanese Patent Gazette Nos. 2544952 and 2862612, and Japanese Patent Laid-Open No. 2001-187891.

However, the above described grease composition comprising a lithium complex soap has a problem that the grease composition hardens over time. Similarly, a grease composition comprising a calcium complex soap has the same problem. A grease composition comprising an aluminum complex soap has a problem regarding long-term stability. Thus, grease compositions comprising the conventional complex metallic soaps have various problems.

As a grease composition used under a high-speed and high-temperature environment, a grease composition comprising urea as a thickener has previously been known. This urea grease has been used in a bearing, which is incorporated in the electrical component or engine accessory equipment of a car. However, this urea grease has a problem that, when the grease is used in a ball bearing, the grease can impart a sufficient seizuring life to the ball bearing, but when the grease is used in a roller bearing, in some cases the grease cannot impart a sufficient seizuring life to the roller bearing.

Thus, it is a fourth object of the present invention to solve the above described problems of the prior art techniques, and to provide a grease composition which has excellent performance even under a high-speed and high-temperature environment and can impart an excellent seizuring life to a rolling apparatus. Moreover, it is also the fourth object of the present invention to provide a rolling apparatus having excellent seizuring life even under a high-speed and high-temperature environment.

(4) As stated above, greases are classified into the following 4 types according to the types of a thickener:

(i) a metallic soap grease comprising a metallic soap such as Li, Ca, Na or Al;

(ii) a complex metallic soap grease comprising a complex metallic soap such as Li, Ca, Na and Al;

(iii) an organic grease comprising an organic compound (an organic thickener) such as polyurea, a terephthalamic acid metal salt or a calcium sulfonate complex; and (iv) an inorganic grease comprising an inorganic compound (an inorganic thickener) such as bentonite or silica gel.

However, as described in the "Lubrication Control Manual Book" edited by the Japan Lubricating Oil Society and the Lubrication Control Diffusion Task Force (the Japanese Lubricating Oil Society, published Mar. 20, 1990) and "A Brief History of Lubricating Greases" written by Arthur T. Polishuk (Llewellyn& McKane, Inc., published 1998), it has previously been thought that, when different types of greases are mixed, the properties of the greases are altered and deteriorated in many cases. This deterioration naturally occurs when 2 types from among the above 4 types of greases are mixed, but it could also occur when 2 types of metallic soap greases are mixed, in which the type of metals is different.

When a significant deterioration occurs in a grease, the grease structure is destroyed, significant softening of the grease or decrease of the dropping point occurs, and the grease is liquefied at times. Moreover, there are also cases where additives which are added to a grease, act on one another and reduce the performance of the grease. For these reasons, it has generally been believed that the mixing of greases should be prevented as much as possible.

Greases used in rolling apparatuses such as a rolling bearing, a ball screw, a linear guide apparatus and a linear bearing are required to have various performances such as lubricating performance, load carrying capacity, heat resistance, water resistance, low torque and few dusts generating property. To obtain such a grease having many excellent performances, a method for mixing greases each having one of the above performances is considered to be effective. However, probably because it has generally been believed that the mixing of greases comprising different types of thickeners is not good, the above method has seldom been used. Only a few examples are found, such as a combined use of an N-substituted terephthalamic acid metal salt and polyurea disclosed in Japanese Patent Publication No. 6-31375 and a combined use of a sodium soap and a lithium soap disclosed in Japanese Patent Laid-Open No. 2001-3074.

Although two types of thickeners are used in combination, if the excellent performances of both thickeners consist with each other, the above described grease having many excellent performances can be obtained. Thus, the present invention adopts a method involving the combined use of two different types of thickeners to achieve the above described first to fourth objects.

SUMMARY OF THE INVENTION (1) The grease composition of the present invention is a grease composition in which two different types of thickeners are used in combination, and the grease composition of the present invention has many excellent performances. A large number of combinations of two types of thickeners can be conceived, but in the present invention, as a first thickener, an organic thickener such as a calcium sulfonate complex, an N-substituted terephthalamic acid metal salt or polyurea is used. As a second thickener, a thickener selected from the above three thickeners which is not used as the first thickener, a metallic soap or a complex metallic soap is used. However, the combination of an N-substituted terephthalamic acid metal salt and polyurea is excluded from the present invention.

(2) To achieve the first object described above, the present invention has the following features. That is to say, the grease composition of the present invention is a grease composition comprising a base oil and a thickener, wherein the thickener comprises a calcium sulfonate complex and a second thickener component.

This calcium sulfonate complex comprises calcium sulfonate and calcium carbonate as essential components, and preferably further comprises two or more selected from a group of calcium dibehenate, calcium distearate, calcium dihydroxystearate, calcium borate and calcium acetate.

Moreover, the second thickener component described above is preferably polyurea, a metallic soap, a complex metallic soap or an N-substituted terephthalamic acid metal salt.

Since a mixture of a calcium sulfonate complex and the second thickener component such as polyurea, a metallic soap, a complex metallic soap or an N-substituted terephthalamic acid metal salt is used as a thickener in this grease composition, the grease composition has excellent heat resistance, load carrying capacity and water resistance, and it is long-lived even at a high temperature.

Moreover, the above described thickener preferably comprises 5 to 95% by mass of the calcium sulfonate complex and 95 to 5% by mass of the above second thickener component.

If the composition of the thickener is out of the above range, there is a risk that the grease composition might have insufficient lubricating life. In order that the grease composition reliably has sufficient lubricating life, it is more preferable that the above described thickener comprises 10 to 90% by mass of the calcium sulfonate complex and 90 to 10% by mass of the above second thickener component.

Furthermore, the content of the above described thickener is preferably 3 to 40% by mass based on the total mass of the composition. If the content of the thickener is less than 3% by mass, it becomes difficult for the grease composition to maintain the grease structure, and if the content is more than 40% by mass, the grease composition gets so hardened that it becomes difficult for the grease composition to exert sufficient lubricating ability.

Still more, it is more preferable that the content of the above described thickener is 8 to 25% by mass based on the total mass of the composition, and that the grease composition has a worked penetration of 230 to 290. When the content of the thickener is 8 to 25% by mass, the worked penetration of the grease composition is 230 to 290, and therefore the handling property of the grease composition becomes good.

Still further, the above described base oil comprises a neopentyl-type polyol ester oil, and the content of the neopentyl-type polyol ester oil can be 80% or more by mass based on the total mass of the base oil. Such a grease composition is long-lived even at a high temperature, and further has excellent biodegradability because the base oil comprises the neopentyl-type polyol ester oil having biodegradability. Accordingly, even where the grease composition is released to the environment by leakage from mechanical devices or the like, it has little adverse effect on the environment.

If the content of the neopentyl-type polyol ester oil is less than 80% by mass based on the total mass of the base oil, the biodegradability of the grease composition decreases and so it is not preferable. In order that the grease composition has sufficient biodegradability, it is more preferable to control the content of the neopentyl-type polyol ester oil at 90% or more by mass based on the total mass of the base oil.

Moreover, this grease composition having biodegradability preferably comprises 80 to 97 parts by mass of the above described base oil and 3 to 20 parts by mass of the above described thickener. If the above thickener is less than 3 parts by mass, it becomes difficult for the grease composition to maintain the grease structure, and if the above thickener is more than 20 parts by mass, the biodegradability of the grease composition decreases.

Furthermore, in this grease composition having biodegradability, the biodegradability is preferably 80% or higher according to the Coordinating European Council guideline CEC L-33-T-82. When the grease composition has the above described configuration, even where the grease composition is released to the environment by leakage from mechanical devices or the like, it has little adverse effect on the environment.

Still more, the rolling apparatus of the present invention comprises an inner member having a raceway surface on the outer surface; an outer member which has a raceway surface opposed to the raceway surface of the above described inner member and is disposed outside of the above described inner member; and a plurality of rolling elements which are disposed between the above described two raceway surfaces so as to flexibly roll therebetween, wherein a space, which is formed between the above described inner member and the above described outer member and in which the above described rolling elements are disposed, is filled with the above described grease composition.

When the rolling apparatus has the above described configuration, the rolling apparatus has a long life, and even where the above described grease composition is released to the environment by leakage or the like, it has little adverse effect on the environment.

(3) To achieve the above second object, the present invention has the following features. That is to say, the grease composition of the present invention is a grease composition comprising a base oil and a thickener, wherein the thickener comprises an N-substituted terephthalamic acid metal salt and a second thickener component.

The above second thickener component is preferably polyurea, a metallic soap or a complex metallic soap. Since a mixture of an N-substituted terephthalamic acid metal salt and the second thickener component such as polyurea, a metallic soap or a complex metallic soap is used as a thickener in this grease composition, the grease composition has excellent heat resistance and oxidation stability, and it is long-lived even at a high temperature.

Moreover, the above described thickener preferably comprises 5 to 95% by mass of the N-substituted terephthalamic acid metal salt and 95 to 5% by mass of the above described second thickener component. If the composition of the thickener is out of the above range, there is a risk that the grease composition might have insufficient lubricating life. In order that the grease composition reliably has sufficient lubricating life, it is more preferable that the thickener comprises 10 to 90% by mass of the N-substituted terephthalamic acid metal salt and 90 to 10% by mass of the above described second thickener component.

Furthermore, the content of the above described thickener is preferably 3 to 40% by mass based on the total mass of the composition. If the content of the thickener is less than 3% by mass, it becomes difficult for the grease composition to maintain the grease structure, and if the content is more than 40% by mass, the grease composition gets so hardened that it becomes difficult for the grease composition to exert sufficient lubricating ability.

Still more, the above described base oil comprises a neopentyl-type polyol ester oil, and the content of the neopentyl-type polyol ester oil can be 80% or more by mass based on the total mass of the base oil. Such a grease composition is long-lived even at a high temperature, and further has excellent biodegradability because the base oil comprises the neopentyl-type polyol ester oil having biodegradability. Accordingly, even where the grease composition is released to the environment by leakage from mechanical devices or the like, it has little adverse effect on the environment.

If the content of the neopentyl-type polyol ester oil is less than 80% by mass based on the total mass of the base oil, the biodegradability of the grease composition decreases and so it is not preferable. In order that the grease composition has sufficient biodegradability, it is more preferable to control the content of the neopentyl-type polyol ester oil at 90% or more by mass based on the total mass of the base oil.

Still further, this grease composition having biodegradability preferably comprises 80 to 97 parts by mass of the above described base oil and 3 to 20 parts by mass of the above described thickener. If the above thickener is less than 3 parts by mass, it becomes difficult for the grease composition to maintain the grease structure, and if the above thickener is more than 20 parts by mass, the biodegradability of the grease composition decreases.

Moreover, in this grease composition having biodegradability, the biodegradability is preferably 80% or higher according to the Coordinating European Council guideline CEC L-33-T-82. When the grease composition has the above described configuration, even where the grease composition is released to the environment by leakage from mechanical devices or the like, it has little adverse effect on the environment.

Furthermore, the rolling apparatus of the present invention comprises an inner member having a raceway surface on the outer surface; an outer member which has a raceway surface opposed to the raceway surface of the above described inner member and is disposed outside of the above described inner member; and a plurality of rolling elements which are disposed between the above described two raceway surfaces so as to flexibly roll therebetween, wherein a space, which is formed between the above described inner member and the above described outer member and in which the above described rolling elements are disposed, is filled with the above described grease composition.

When the rolling apparatus has the above described configuration, the rolling apparatus has a long life, and even where the above described grease composition is released to the environment by leakage or the like, it has little adverse effect on the environment.

(4) To achieve the above third object, the present invention has the following features. That is to say, the grease composition of the present invention is a grease composition comprising a base oil and a thickener, wherein the thickener comprises 10 to 90% by mass of polyurea and 90 to 10% by mass of a metallic soap.

Since this grease composition comprises both polyurea and a metallic soap as thickeners, this grease composition generates a few dusts even at a high temperature and has excellent high-temperature performance, and imparts excellent acoustic performance and torque performance to a rolling apparatus in which this grease composition is enclosed.

If the composition of the thickener is out of the above range, there is a risk that the grease composition might generate a large amount of dusts at a high temperature or might have insufficient high-temperature performance. Moreover, there is also a risk that the acoustic performance of the rolling apparatus might decrease or torque might increase, when the grease composition is enclosed into a rolling apparatus such as a rolling bearing.

In order that the grease composition generates fewer dusts at a high temperature and has more excellent high-temperature performance, and further that a rolling apparatus in which the grease composition is enclosed has excellent acoustic and torque performances, it is more preferable that the thickener comprises 25 to 75% by mass of the polyurea and 75 to 25% by mass of the metallic soap.

Furthermore, the content of the above described thickener is preferably 8 to 28% by mass based on the total mass of the composition. If the content of the above thickener is less than 8% by mass, a problem regarding generation of dusts occurs, and if the content of the above thickener is more than 28% by mass, the grease composition gets so hardened that it becomes difficult for the grease composition to exert sufficient torque performance. However, taking into consideration generation of dusts at a high temperature and torque performance, it is more preferable that the content of the thickener is 10 to 25% by mass based on the total mass of the composition.

Still more, the above described base oil is preferably an ester oil having a kinematic viscosity at 40° C. of 20 to 180 mm²/s.

If an ester oil is used as a base oil, the oil is well infiltrated into the contact portion between the rolling contact outer surfaces of the rolling members of a rolling apparatus by the interaction between the ester group of the ester oil and a metal. Thereby, the friction property of the above contact portion becomes good, and the rolling apparatus in which the grease composition is enclosed has low torque. Further, since the ester group shows an interaction with the micellar structure of the metallic soap and weakens the bonding strength between the metallic soap fibers, when the rolling apparatus is actuated, the shear resistance of the grease composition is reduced, and the rolling apparatus thereby has further lower torque. Of ester oils, a diester oil and a neopentyl-type polyol ester oil are more preferable. This point will be described in detail in a later section of this specification on the explanation of base oil.

In order to suppress dusts generated at a high temperature from a rolling apparatus in which the grease composition is enclosed, and to impart low torque property to the rolling apparatus, it is more preferable that the kinematic viscosity at 40° C. of the base oil is 40 to 140 mm²/s.

Further, the worked penetration of this grease composition is preferably 190 to 250. To suppress dusts generated from a rolling apparatus in which the grease composition is enclosed, it is preferable to harden the grease composition. However, if the grease composition gets too hard, the flowability in the rolling apparatus decreases, resulting in insufficient lubrication and then ready generation of abnormal sounds from a cage. Therefore, the worked penetration of the grease composition is preferably 190 to 250. If the worked penetration is less than 190, the grease composition is so hard that the rolling apparatus filled with the grease composition has decreased acoustic and torque performances. If the worked penetration exceeds 250, the amount of dusts generated from the rolling apparatus increases.

Furthermore, the rolling apparatus of the present invention comprises an inner member having a raceway surface on the outer surface; an outer member which has a raceway surface opposed to the raceway surface of the above described inner member and is disposed outside of the above described inner member; and a plurality of rolling elements which are disposed between the above described two raceway surfaces so as to flexibly roll therebetween, wherein a space, which is formed between the above described inner member and the above described outer member and in which the above described rolling elements are disposed, is filled with the above described grease composition.

Since the rolling apparatus having the above configuration is filled with a grease composition containing both polyurea and a metallic soap as thickeners, the rolling apparatus has low torque and excellent acoustic performance, and further it generates a few dusts even at a high temperature.

(5) To achieve the above fourth object, the present invention comprises the following features. That is to say, the grease composition of the present invention is a grease composition comprising a base oil and a thickener, wherein the thickener comprises 10 to 90% by mass of polyurea and 90 to 10% by mass of a complex metallic soap.

Since this grease composition comprises polyurea as a thickener, it has excellent performance even under a high-speed and high-temperature environment. Moreover, since this grease composition also comprises a complex metallic soap as another thickener, a rolling apparatus, especially a roller bearing, which is filled with this grease composition, is provided with an excellent seizuring life.

If the composition of the thickener is out of the above range, there is a risk that the grease composition might have insufficient performance under a high-speed and high-temperature environment. Moreover, there is another risk that the seizuring life of a rolling apparatus might become insufficient, when the grease composition is enclosed into the rolling apparatus such as a roller bearing.

In order that the grease composition has excellent performance under a high-speed and high-temperature environment and that a rolling apparatus filled with the grease composition has a more excellent seizuring life, it is more preferable that the thickener comprises 25 to 75% by mass of polyurea and 75 to 25% by mass of the complex metallic soap.

Moreover, the content of the above described thickener is preferably 3 to 40% by mass based on the total mass of the composition. If the content of the above thickener is less than 3% by mass, it becomes difficult for the grease composition to maintain its grease state, and if the content of the above thickener exceeds 40% by mass, the grease composition gets so hardened that it becomes difficult for the grease composition to exert sufficient lubricating ability. However, considering the worked penetration of the grease composition and the durability of a rolling apparatus which is filled with the grease composition, it is more preferable that the content of the thickener is 10 to 30% by mass based on the total mass of the composition.

Furthermore, the above described base oil preferably has a kinematic viscosity at 40° C. of 50 to 500 mm$^2$/s. If the kinematic viscosity at 40° C. is less than 50 mm$^2$/s, it is difficult for the base oil to form an oil film having a sufficient thickness at a high temperature, and accordingly there is a risk that the durability of a rolling apparatus filled with the grease composition might be insufficient. If the kinematic viscosity at 40° C. exceeds 500 mm$^2$/s, a rolling apparatus filled with the grease composition has high torque, and a problem regarding operability might occur. In order to reduce the occurrence of these problems, it is more preferable that the kinematic viscosity at 40° C. of the base oil is 100 to 400 mm$^2$/s.

Still more, the worked penetration of this grease composition is preferably 220 to 385. If the worked penetration is less than 220, the grease composition is so hard that the rolling apparatus filled with the grease composition has a decreased seizuring life under a high-speed and high-temperature environment. On the other hand, if the worked penetration exceeds 385, the amount of the grease composition leaked from the rolling apparatus increases.

Still further, the rolling apparatus of the present invention comprises an inner member having a raceway surface on the outer surface; an outer member which has a raceway surface opposed to the raceway surface of the above described inner member and is disposed outside of the above described inner member; and a plurality of rolling elements which are disposed between the above described two raceway surfaces so as to flexibly roll therebetween, wherein a space, which is formed between the above described inner member and the above described outer member and in which the above described rolling elements are disposed, is filled with the above described grease composition.

Since a rolling apparatus having the above configuration (especially, a roller bearing) is filled with a grease composition containing both polyurea and a complex metallic soap as thickeners, the rolling apparatus has an excellent seizuring life even under a high-speed and high-temperature environment.

(6) All of the rolling apparatuses of the present invention, which achieve the above described first to fourth objects, can be applied to various rolling apparatuses such as rolling bearings, ball screws, linear guide apparatuses and linear bearings.

The term "inner member" is used in the present invention to mean a bearing inner ring when the rolling apparatus is a rolling bearing. Likewise, the term "inner member" is herein used to mean a screw shaft when the rolling apparatus is a ball screw, a guide rail when it is a linear guide apparatus, and a shaft when it is a linear bearing, respectively. The term "outer member" is used herein to mean a bearing outer ring when the rolling apparatus is a rolling bearing. Likewise, the term "outer member" is herein used to mean a nut when the rolling apparatus is a ball screw, a slider when it is a linear guide apparatus, and an outer casing when it is a linear bearing, respectively.

(7) Each of the components of the grease composition of the present invention will be explained below.

[Calcium Sulfonate Complex]

A calcium sulfate complex used as a thickener in the present invention comprises calcium sulfonate as an essential component, and also comprises a calcium salt (a calcium soap) selected from a group of (a) calcium carbonate, (b) a higher fatty acid calcium salt such as calcium dibehenate, calcium distearate and calcium dihydroxystearate, (c) a lower fatty acid calcium salt such as calcium acetate, and (d) calcium borate.

It is particularly preferable to use a calcium sulfate complex, which comprises calcium sulfonate and calcium carbonate as essential components and also comprises two or more selected from a group of calcium dibehenate, calcium distearate, calcium dihydroxystearate, calcium borate and calcium acetate.

In terms of thickening effect, the above described calcium sulfonate preferably has a base number of 50 to 500 mgKOH/g, and more preferably it is overbased calcium sulfonate with a base number of 300 to 500 mgKOH/g.

The calcium sulfonate complex may be dispersed in a base oil after it is synthesized separately, or the calcium sulfonate complex may also be dispersed in a base oil by synthesis in the base oil. However, since the thickener is better dispersed in a base oil by the latter method, when the thickener is industrially produced, the latter method is advantageous.

Likewise, the second thickener component (e.g. polyurea, an N-substituted terephthalamic acid metal salt, etc.), which is used as another thickener together with the calcium sulfonate complex, may be dispersed in a base oil after it is synthesized separately, or the second thickener component may also be dispersed in a base oil by synthesis in the base oil. That is to say, a grease composition may be produced by synthesizing the calcium sulfonate complex and the second thickener separately, and dispersing them in a base oil separately. Or, a grease composition may also be produced by synthesizing one of the calcium sulfonate complex and the second thickener component separately, and then dispersing it in a base oil, while synthesizing the other in the base oil. Otherwise, a grease composition may also be produced by synthesizing both of the calcium sulfonate complex and the second thickener component in a base oil. Needless to say, when a grease composition is produced by synthesizing both of them in a base oil, the thickener is well dispersed in the base oil, and this method is therefore advantageous when the grease composition is industrially produced.

[Polyurea]

Examples of polyurea used as a thickener in the present invention include diurea, triurea, tetraurea and others, but of these, diurea represented by the following general formula (I) is particularly preferable.

[Formula 1]

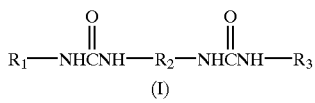

In the general formula (I), $R_2$ represents an aromatic hydrocarbon group containing 6 to 15 carbon atoms. $R_1$ and $R_3$ represent an aliphatic hydrocarbon group, aromatic hydrocarbon group or condensed hydrocarbon group, and $R_1$ and $R_3$ may be identical. The condensed hydrocarbon group preferably contains 9 to 19 carbon atoms, and more preferably 9 to 13 carbon atoms. If the number of carbon atoms of these hydrocarbon groups is smaller than the above minimum value, the thickener is hardly dispersed in a base oil, and the thickener and the base oil are likely to separate from each other. If the number of carbon atoms of the hydrocarbon groups is greater than the above maximum value, the production of the thickener is industrially unrealistic.

The polyurea such as diurea maybe synthesized separately and then dispersed in a base oil, or may be dispersed in a base oil by synthesis in the base oil. However, since the thickener is better dispersed in a base oil by the latter method, when the thickener is industrially produced, the latter method is advantageous.

A synthesis method of synthesizing diurea in a base oil is not particularly limited, but a method of reacting 1 mole of diisocyanate having the aromatic hydrocarbon group $R_2$ with 2 moles of monoamine having the hydrocarbon groups $R_1$ and $R_3$ is the most preferable.

Examples of diisocyanate preferably used include diphenylmethane diisocyanate, tolylene diisocyanate, xylylene diisocyanate, biphenylene diisocyanate, dimethyl diphenylene diisocyanate and an alkyl substituted compound thereof.

When $R_1$ and $R_3$ are aliphatic hydrocarbon groups or aromatic hydrocarbons, examples of monoamine include aniline, cyclohexylamine, octylamine, toluidine, dodecylaniline, octadecylamine, hexylamine, heptylamine, nonylamine, ethylhexylamine, decylamine, undecylamine, dodecylamine, tetradecylamine, pentadecylamine, nonadecylamine, eicodecylamine, oleylamine, linoleylamine, linolenylamine, methylcyclohexylamine, ethylcyclohexylamine, dimethylcyclohexylamine, diethylcyclohexylamine, butylcyclohexylamine, propylcyclohexylamine, amylcyclohexylamine, cyclooctylamine, benzylamine, benzhydrylamine, phenetylamine, methylbenzylamine, biphenylamine, phenylisopropylamine, phenylhexylamine, and others.

When $R_1$ and $R_3$ are condensed hydrocarbon groups, examples of monoamine preferably used include an indene amine compound such as aminoindene, aminoindan or amino-1-methyleneindene; a naphthalene amine compound such as aminonaphthalene (naphthylamine), aminomethylnaphthalene, aminoethylnaphthalene, aminodimethylnaphthalene, aminocadalene, aminovinylnaphthalene, aminophenylnaphthalene, aminobenzylnaphthalene, aminodinaphthylamine, aminobinaphthyl, amino-1,2-dihydronaphthalene, amino-1,4-dihydronaphthalene, aminotetrahydronaphthalene or aminooctaline; a condensed bicyclic amine compound such as aminopentalene, aminoazulene or aminoheptalene; an aminofluorene amine compound such as aminofluorene or amino-9-phenylfluorene; an anthracene amine compound such as aminoanthracene, aminomethylanthracene, aminodimethylanthracene, aminophenylanthracene or amino-9,10-dihydroanthracene; a phenanthrene amine compound such as aminophenanthrene, amino-1,7-dimethylphenanthrene or aminoretene; a condensed tricyclic amine compound such as aminobiphenylene, amino-sym-indacene, amino-as-indacene, aminoacenaphthylene, aminoacenaphthene or aminophenalene; a condensed tetracyclic amine compound such as aminonaphthacene, aminochrysene, aminopyrene, aminotriphenylene, aminobenzoanthracene, aminoaceanthrylene, aminoaceanthrene, aminoacephenanthrylene, aminoacephenanthrene, aminofluoranthene or aminopleiadene; a condensed pentacyclic amine compound such as aminopentacene, aminopentaphen, aminopicene, aminoperylene, aminodibenzoanthracene, aminobenzopyrene or aminocholanthrene; a condensed polycyclic (hexacyclic or more) amine compound such as aminocoronene, aminopyranthrene, aminoviolanthrene, aminoisoviolanthrene or aminoovalene; and others.

[N-Substituted Terephthalamic Acid Metal Salt]

An N-substituted terephthalamic acid metal salt used as a thickener in the present invention is represented by the following general formula (II):

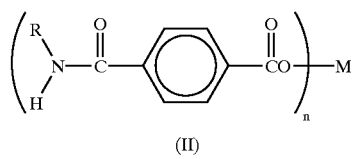

[Formula 2]

(II)

In the general formula (II), a substituent R binding to a nitrogen atom is a straight chain, branched chain or cyclic, saturated or unsaturated, monovalent hydrocarbon group, M is a metal, and n denotes a number equivalent to the valence of the metal.

When the substituent R is a straight or branched chain hydrocarbon group, the hydrocarbon group contains 10 to 32, preferably 12 to 22 carbon atoms, and when the substituent R is a cyclic hydrocarbon group, the hydrocarbon group contains 6 to 28, preferably 7 to 22 carbon atoms. If the number of carbon atoms is smaller than the above described minimum value, the thickener is hardly dispersed in a base oil and further the thickener is likely to separate from the base oil. To the contrary, if the number of carbon atoms is greater than the above maximum value, then the production of the thickener is industrially unrealistic.

Examples of the substituent R include a decyl group, a tetradecyl group, a hexadecyl group, an octadecyl group, a cyclohexyl group, a benzyl group, a phenyl group, a tolyl group, a butylphenyl group and others. Examples of the metal M include a 1-, 2-, 12- or 13-group metal, and examples of such a metal include lithium, potassium, sodium, magnesium, calcium, barium, zinc, aluminum and others. Of these, sodium, barium, lithium and potassium are particularly preferable, and sodium is the most realistic.

As stated above, such an N-substituted terephthalamic acid metal salt may be synthesized separately and then dispersed in a base oil, or may be dispersed in the base oil by synthesis in the base oil. However, since the thickener is better dispersed in a base oil by the latter method, when the thickener is industrially produced, the latter method is advantageous.

[Metallic Soap]

An example of a metallic soap used as a thickener in the present invention includes an aliphatic monobasic metal salt, which is synthesized from a 1-, 2- or 13-group metallic compound (e.g. metallic hydroxide) according to the periodic table, and higher fatty acid containing 10 or more carbon atoms or higher hydroxyfatty acid containing one or more hydroxy group(s) and 10 or more carbon atoms.

Examples of the metal include lithium, sodium, calcium, barium, aluminum and others. Examples of the higher fatty acid include lauric acid, myristic acid, palmitic acid, margaric acid, stearic acid, arachidic acid, behenic acid, lignoceric acid, tallow fatty acid and others. Examples of the higher hydroxyfatty acid include 9-hydroxystearic acid, 10-hydroxystearic acid, 12-hydroxystearic acid, 9,10-dihydroxystearic acid and others. Of these aliphatic monobasic acids, 12-hydroxystearic acid is the most preferable.

[Complex Metallic Soap]

An example of a complex metallic soap used as a thickener in the present invention includes a complex metallic soap, which is synthesized from a 1-, 2- or 13-group metallic compound (e.g. metallic hydroxide) according to the periodic table, aliphatic monocarboxylic acid containing at least one hydroxyl group and 12 to 24 carbon atoms, and aliphatic dicarboxylic acid containing 2 to 12 carbon atoms.

Examples of the metal include lithium, sodium, calcium, barium, aluminum and others.

Examples of the aliphatic hydroxymonocarboxylic acid include 9-hydroxystearic acid, 10-hydroxystearic acid, 12-hydroxystearic acid, 9,10-dihydroxystearic acid and others. Of these, 12-hydroxystearic acid is the most preferable.

Examples of the aliphatic dicarboxylic acid include oxalic acid, malonic acid, succinic acid, glutaric acid, adipic acid, pimelic acid, suberic acid, azelaic acid, sebacic acid, dodecanedioic acid and others, and of these, azelaic acid is the most preferable.

A grease composition comprising the above described complex metallic soap has a higher dropping point than that of a grease composition comprising an ordinary metallic soap, and it is excellent in heat resistance. Among them, a lithium complex soap is the most preferable, since it is excellent in heat resistance.

It should be noted that, with regard to the amount ratio of aliphatic hydroxymonocarboxylic acid and aliphatic dicarboxylic acid, it is important that aliphatic dicarboxylic acid is set at 20 to 40% by mass with the respect to the total 100% by mass of both compounds. If the amount ratio is out of this range, there is a risk that the heat stability of the grease composition might become insufficient.

[Base Oil]

Examples of abase oil contained in the grease composition of the present invention may include a mineral lubricating oil and a synthetic lubricating oil. The type of the oils is not particularly limited, and examples of the mineral lubricating oil may include a paraffin mineral oil, a naphthene mineral oil and a mixed oil thereof. Examples of the synthetic lubricating oil may include a synthetic hydrocarbon oil, an ether oil, an ester oil, a fluorine oil and others.

More specifically, examples of the synthetic hydrocarbon oil may include a poly α-olefin oil and others, examples of the ether oil may include a dialkyl diphenyl ether oil, an alkyl triphenyl ether oil, an alkyl tetraphenyl ether oil and others, examples of the ester oil may include a diester oil, a neopentyl-type polyol ester oil, a complex ester oil thereof, an aromatic ester oil and others, and examples of the fluorine oil may include a perfluoro ether oil, a fluoro silicone oil, a chlorotrifluoro ethylene oil, a fluoro phosphazene oil and others. These base oils may be used singly, or may be used in combination of two or more oils as appropriate.

Taking into consideration lubricating performance and durability (life) under a high-temperature and high-speed environment, preferably the base oil comprises a synthesized lubricating oil, and more preferably the base oil comprises at least one type selected from an ester oil, an ether oil and a fluorine oil. Furthermore, in terms of cost saving, it is preferable that the base oil comprises at least one of the ester and ether oils, or a mineral oil.

However, in the case of the grease composition of the present invention directed towards achieving the third object, taking into consideration the dust generating property at a high temperature or the torque performance of a rolling apparatus in which the grease composition is enclosed, the base oil used is preferably an ester oil, and a diester oil and a neopentyl-type polyol ester oil are more preferable. The diester oil is obtained by a reaction between dibasic acid and branched chain alcohol, and the examples include dioctyl adipate, diisobutyl adipate, dibutyl adipate, dibutyl sebacate, dioctyl sebacate, methylacetyl ricinolate and others.

The kinematic viscosity at 40° C. of the base oil comprised in the grease composition of the present invention is preferably 10 to 600 mm²/s. If the kinematic viscosity at 40° C. is less than 10 mm²/s, the base oil is likely to evaporate at a high temperature, resulting in the difficulty of the production of the grease composition. On the other hand, the kinematic viscosity at 40° C. of more than 600 mm²/s is also not preferable, because the torque of a rolling apparatus in which the grease composition is enclosed, is likely to increase. To prevent the occurrence of these problems, it is more preferable that the kinematic viscosity at 40° C. of the base oil is 20 to 500 mm²/s.

Where a neopentyl-type polyol ester oil is used as a base oil, biodegradability is imparted to the grease composition.

The neopentyl-type polyol ester is an ester oil, which is obtained by a reaction between monovalent alcohol having a neopentyl structure represented by the following formula (III) (hereinafter referred to as neopentyl-type polyol), and organic acid (monobasic acid).

[Formula 3]

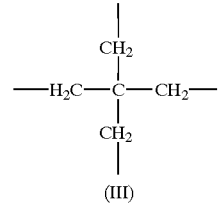

(III)

The neopentyl-type polyol contains preferably 5 to 12 carbon atoms, and more preferably 5 to 9 carbon atoms. The organic acid contains preferably 4 to 18 carbon atoms, and more preferably 6 to 12 carbon atoms. If the number of carbon atoms of both the neopentyl-type polyol and the organic acid is out of the above range, there is a risk that the oxidation stability of the grease composition might be impaired.

Examples of the neopentyl-type polyol include 2,2-dimethylpropane-1,3-diol (that is, neopentyl glycol (hereinafter referred to as NPG)), 2-ethyl-2-butylpropane-1,3-diol, 2,2-diethylpropane-1,3-diol, 2-methyl-2-propylpropane-1,3-diol, trimethylolethane, trimethylolpropane (hereinafter referred to as TMP), trimethylolbutane, trimethylolhexane, pentaerythritol (hereinafter referred to as PE) and others. Of these, NPG, 2-methyl-2-propylpropane-1,3-diol, TMP and PE are preferable, and NPG, TMP and PE are particularly preferable. These neopentyl-type polyols can be used singly or in combination of two or more.

Examples of the organic acid include n-butanoic acid, isobutyric acid, n-pentanoic acid, isovaleric acid, n-hexanoic acid, 2-ethylbutanoic acid, isohexanoic acid, hexahydrobenzoic acid, n-heptanoic acid, isoheptanoic acid, methylhexahydrobenzoic acid, n-octanoic acid, dimethylhexanoic acid, 2-ethylhexanoic acid, 2,4,4-trimethylpentanoic acid, isooctanoic acid, 3,5,5-trimethylhexanoic acid, n-nonanoic acid, isononanoic acid, isodecanoic acid, isoundecanoic acid, 2-butyloctanoic acid, tridecanoic acid, tetradecanoic acid, hexadecanoic acid, octadecanoic acid and others. Of these, n-heptanoic acid, isoheptanoic acid, n-octanoic acid, dimethylhexanoic acid and 2-ethylhexanoic acid are preferable. These organic acids can be used singly or in combination of two or more.

Specific examples of the neopentyl-type polyol ester include a diester compound of NPG and heptanoic acid, a diester compound of NPG and 2-ethylbutanoic acid, a diester compound of NPG and a mixture of hexanoic acid and heptanoic acid, a triester compound of TMP and pentanoic acid, a triester compound of TMP and hexanoic acid, a triester compound of TMP and a mixture of butanoic acid and octadecanoic acid, a triester compound of TMP and a mixture of hexanoic acid, heptanoic acid and octanoic acid, a tetraester compound of PE and pentanoic acid, a tetraester compound of PE and a mixture of two or more types selected from a group of straight or branched chain organic acids containing 4 to 8 carbon atoms, and others.

Moreover, a neopentyl-type polyol ester obtained by a reaction between neopentyl-type polyol other than NPG, TMP and PE such as 2-methyl-2-propylpropane-1,3-diol, 2,2-diethylpropane-1,3-diol, trimethylolethane or trimethylolhexane, and the above organic acids (a single organic acid or a mixture of two or more types), can also be used.

To synthesize a neopentyl-type polyol ester from neopentyl-type polyol and organic acid, a common method (the esterification method), which has previously been known, can be used with no problems. For example, a method of carrying out a dehydration condensation reaction in the presence of an acidic catalyst or the like can be used.

[Additive]

Various additives maybe added, as desired, to the grease composition of the present invention so as to improve various performances of the grease composition. For example, additives such as an antioxidant, an anticorrosive, an extreme-pressure additive, an oil improver and a metal deactivator, which are generally used for grease compositions, can be used singly or in combination of two or more.

Examples of the antioxidant include amines, phenols, sulfurs, zinc dithiophosphate and others.

Specific examples of an amine antioxidant include phenyl-1-naphthylamine, phenyl-2-naphthylamine, diphenylamine, phenylenediamine, oleyl amide amine, phenothiazine and others.

Specific examples of a phenol antioxidant include hindered phenols or the like such as p-t-butylphenyl salicylate, 2,6-di-t-butylphenol, 2,6-di-t-butyl-p-phenylphenol, 2,2'-methylenebis(4-methyl-6-t-octylphenol), 4,4'-butylidenebis-6-t-butyl-m-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, n-octadecyl-β-(4'-hydroxy-3',5'-di-t-butylphenyl)propionate, 2-n-octyl-thio-4,6-di(4'-hydroxy-3',5'-di-t-butyl)phenoxy-1,3,5-triazine, 4,4'-thiobis(6-t-butyl-m-cresol), 2-(2'-hydroxy-3'-t-butyl-5'-methylphenyl)-5-chlorobenzotr iazole and others.

Examples of the anticorrosive include petroleum sulfonate, an organic sulfonic acid metal salt (herein, metal is an alkali metal, alkaline-earth metal or the like), esters and others.

Specific examples of the organic sulfonic acid metal salt include the metal salt of dinonylnaphthalene sulfonic acid or heavy alkylbenzene sulfonic acid (calcium sulfonate, barium sulfonate, sodium sulfonate, etc.), and others.

Specific examples of the esters include sorbitan esters such as sorbitan monolaurate, sorbitan tristearate, sorbitan monooleate and sorbitan trioleate, which are the partial esters of polybasic carboxylic acid and monovalent alcohol; alkyl esters such as polyoxyethylene laurate, polyoxyethylene oleate and polyoxyethylene stearate; and others.

Moreover, alkyl succinic acid derivatives and alkenyl succinic acid derivatives such as alkyl succinic acid ester and alkenyl succinic acid ester can also preferably be used as anticorrosives.

Examples of the oil improver include fatty acid such as oleic acid or stearic acid; alcohol such as lauryl alcohol or oleyl alcohol; amine such as stearylamine or cetylamine; phosphoric ester such as tricresyl phosphate; animal and plant oils; and others.

Furthermore, extreme-pressure additives such as phosphoruses, zinc dithiophosphate and organic molybdenum, and metal deactivators such as benzotriazole are also used.

The additive amount of these additives is not particularly limited unless it impairs the purpose of the present invention, but generally the additive amount of each additive is preferably 0.1 to 10% by mass based on the total mass of a grease composition, and the total additive amount of all additives is preferably 0.2 to 10% by mass based on the total mass of a grease composition. If the additive amount is less than 0.1% by mass, the additive effect of additives is poor. If the additive amount exceeds 10% by mass, it is not preferable because the improvement of the additive effect cannot be expected, and further, since the amount of a base oil and a thickener is relatively reduced, there is a risk that the lubricating ability might lower.

DETAILED DESCRIPTION OF THE PREFERRED EMBODIMENTS

Figure 1:
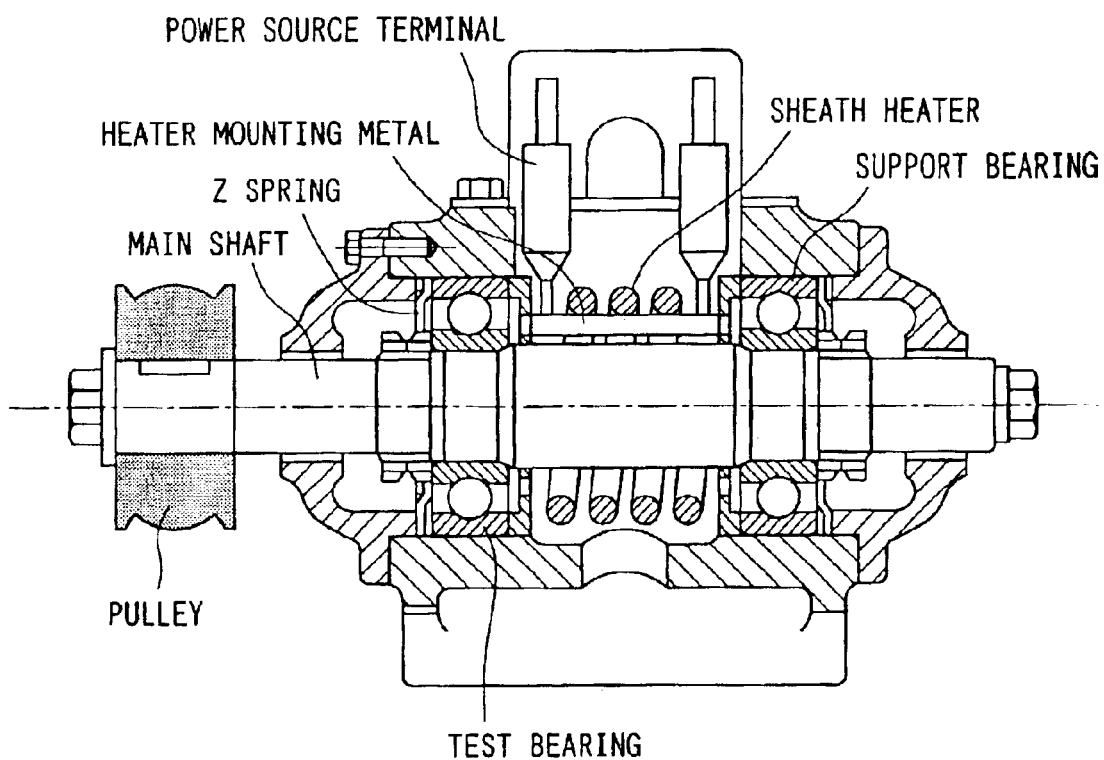
FIG. 1 is a cross-sectional view showing the configuration of a bearing life test machine for evaluating the lubricating life of a grease composition.

The embodiments of the grease composition and the rolling apparatus of the present invention will be explained in detail, while referring to figures.

(A) Grease Composition Comprising Calcium Sulfonate Complex and Polyurea as Thickeners

EXAMPLE A1

Firstly, a calcium sulfonate complex was synthesized in a base oil as follows.

Fifty gram of overbased calcium sulfonate having a base number of 300 mgKOH/g was added to 500 g of dialkyl diphenyl ether having a kinematic viscosity at 40° C. of 97.5 mm$^2$/s, and then the mixture was fully stirred at 50° C. One gram of boric acid, 4 g of acetic acid, 2 g of behenic acid, 2 g of stearic acid, 0.5 g of water and 35 g of calcium hydroxide were added thereto, and water was evaporated and removed by heating the mixture up to 80 to 95° C. Then, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, diurea was synthesized in a base oil as follows.

The mixture obtained by the above operations was cooled to 60° C., and 51 g of 4,4'-diphenylmethane diisocyanate was added to the mixture and completely dissolved. Thereafter, 44 g of cyclohexylamine and 291 g of dialkyl diphenyl ether were added thereto and stirred. After the mixture was retained at 100° C. for 60 minutes, the mixture was heated up to 150° C. and the generation reaction of diurea was terminated.

Thereafter, 10 g of amine antioxidant and 10 g of sulfonate anticorrosive were added to the mixture, and milling and degassing processes were carried out to obtain a grease composition. The mass ratio of the generated thickeners, a calcium sulfonate complex and diurea, was 50:50.

EXAMPLE A2

Firstly, a calcium sulfonate complex was synthesized in a base oil as follows.

Both 73.7 g of overbased calcium sulfonate having a base number of 400 mgKOH/g and 7.9 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 4 g of acetic acid, 1.8 g of behenic acid, 1.3 g of stearic acid, 2.9 g of hydroxystearic acid and 6.8 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, diurea was synthesized in a base oil as follows.

The mixture obtained by the above operations was cooled to 60° C., and after 51 g of 4,4'-diphenylmethane diisocyanate was added and completely dissolved therein, 44 g of cyclohexylamine and 317.9 g of dialkyl diphenyl ether were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and diurea, was 50:50.

EXAMPLE A3

Firstly, a calcium sulfonate complex was synthesized in a base oil as follows.

Both 38.3 g of overbased calcium sulfonate having a base number of 300 mgKOH/g and 3.8 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 0.4 g of boric acid, 1.5 g of acetic acid, 0.9 g of behenic acid, 0.7 g of stearic acid and 3.8 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, diurea was synthesized in abase oil as follows.

The mixture obtained by the above operations was cooled to 60° C., and after 76.5 g of 4,4'-diphenylmethane diisocyanate was added and completely dissolved therein, 66 g of cyclohexylamine and 297.7 g of dialkyl diphenyl ether were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and diurea, was 25:75.

EXAMPLE A4

Firstly, a calcium sulfonate complex was synthesized in a base oil as follows.

Both 115.2 g of overbased calcium sulfonate having a base number of 300 mgKOH/g and 11.6 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 1.2 g of boric acid, 4.5 g of acetic acid, 2.7 g of behenic acid, 1.9 g of stearic acid and 11.4 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, diurea was synthesized in a base oil as follows.

The mixture obtained by the above operations was cooled to 60° C., and after 25 g of 4,4'-diphenylmethane diisocyanate was added and completely dissolved therein, 21.6 g of cyclohexylamine and 297.7 g of dialkyl diphenyl ether were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and diurea, was 75:25.

EXAMPLE A5

Firstly, a calcium sulfonate complex was synthesized in a base oil as follows.

Both 76.6 g of overbased calcium sulfonate having a base number of 300 mgKOH/g and 7.7 g of methanol were added to 500 g of a mixed base oil of dialkyl diphenyl ether and pentaerythritol tetraester. The mixing ratio of dialkyl diphenyl ether and pentaerythritol tetraester in the above mixed base oil was 50:50, and the kinematic viscosity at 40° C. of the mixed base oil was 85.3 mm$^2$/s.

Then, methanol was evaporated and removed by heating the mixture up to 80 to 95° C., so that calcium carbonate contained in the overbased calcium sulfonate was dispersed in the base oil in a colloid state.

Subsequently, 0.8 g of boric acid, 3.0 g of acetic acid, 1.8 g of behenic acid, 1.3 g of stearic acid and 7.6 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, diurea was synthesized in a base oil as follows.

The mixture obtained by the above operations was cooled to 60° C., and after 52.6 g of 4,4'-diphenylmethane diisocyanate was added and completely dissolved therein, 9 g of p-toluidine, 33.4 g of cyclohexylamine and 317.7 g of the above mixed base oil were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and diurea, was 50:50.

EXAMPLE A6

A grease composition was obtained in the same manner as described in Example A1 with the exception that pentaerythritol tetraester (kinematic viscosity at 40° C. of which was 68.3 mm$^2$/s) was used instead of dialkyl diphenyl ether.

The biodegradability of this grease composition was 90% according to the Coordinating European Council guideline CEC L-33-T-82, and so the obtained grease composition had excellent biodegradability.

EXAMPLE A7

A grease composition was obtained in the same manner as described in Example A2 with the exception that pentaerythritol tetraester (kinematic viscosity at 40° C. of which was 68.3 mm$^2$/s) was used instead of dialkyl diphenyl ether.

The biodegradability of this grease composition was 91% according to the CEC L-33-T-82, and so the obtained grease composition had excellent biodegradability.

EXAMPLE A8

A grease composition was obtained in the same manner as described in Example A3 with the exception that pentaerythritol tetraester (kinematic viscosity at 4° C. of which was 68.3 mm$^2$/s) was used instead of dialkyl diphenyl ether.

The biodegradability of this grease composition was 93% according to the CEC L-33-T-82, and so the obtained grease composition had excellent biodegradability.

COMPARATIVE EXAMPLE A1

One hundred and two gram of 4,4'-diphenylmethane diisocyanate was added to 500 g of dialkyl diphenyl ether having a kinematic viscosity at 40° C. of 97.5 mm$^2$/s and completely dissolved. Then, 88 g of cyclohexylamine and 290 g of dialkyl diphenyl ether were added to the mixture and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition.

COMPARATIVE EXAMPLE A2

Both 300 g of overbased calcium sulfonate having a base number of 300 mgKOH/g and 30 g of methanol were added to 668 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 3 g of boric acid, 12 g of acetic acid, 7 g of behenic acid, 5 g of stearic acid and 30 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Thereafter, 10 g of amine antioxidant and 10 g of sulfonate anticorrosive were added to the mixture, and then milling and degassing processes were carried out to obtain a grease composition.

COMPARATIVE EXAMPLES A3 TO A5

Three types of commercially available grease compositions were prepared. The grease composition in Comparative Example A3 comprised a urea compound as a thickener and dialkyl diphenyl ether as a base oil. The grease composition in Comparative Example A4 comprised a urea compound as a thickener and pentaerythritol tetraester as a base oil. The grease composition in Comparative Example A5 comprised a calcium sulfonate complex as a thickener and a mineral oil as a base oil.

With regard to these 13 types of grease compositions (Examples A1 to A8, and Comparative Examples A1 to A5), worked penetration, dropping point, oil separation percentage and water washout resistance were determined (according to JIS K2220). The results are summarized in Tables 1 and 2.

Moreover, the load carrying capacity, lubricating life and rust protection of these grease compositions were also evaluated. The methods of evaluating the above properties will be explained below.

First, load carrying capacity was evaluated by a four-ball test, using a four-ball tester based on ASTM. That is, 3 test balls (SUJ2 steel balls for ball bearings having a diameter of about a half inch) were disposed and fixed in a regular triangle form so that the balls were contact with one another, and a test ball was then placed and held on a hollow, which was formed in the center of the three balls. An evaluation target, grease composition was applied on all the test balls, and the test ball which was placed and held as above was rotated at a certain rotation speed (4,000 rpm) under load conditions.

The above load was set at 98 N for 1 minute in the initial rotation stage, and then the load was gradually increased at a rate of 392 N per minute. Seizure load was defined as a load at the time when rotation torque was sharply increased, and load carrying capacity was evaluated with this seizure load.

Second, lubricating life was evaluated as follows. Each 5 g of the above 13 types of grease compositions was enclosed in a rolling bearing separately, and the rolling bearing was then mounted to a tester which was similar to the bearing life tester of ASTM D1741 shown in FIG. 1. Thereafter, the rolling bearing was rotated at a rotation speed of 1,000 rpm under conditions of a temperature of 150° C., a radial load of 98 N and an axial load of 294 N, and lubricating life was defined as a time when the motor stopped due to overload or a time when the temperature of the bearing exceeded 160° C.

Figure 2:
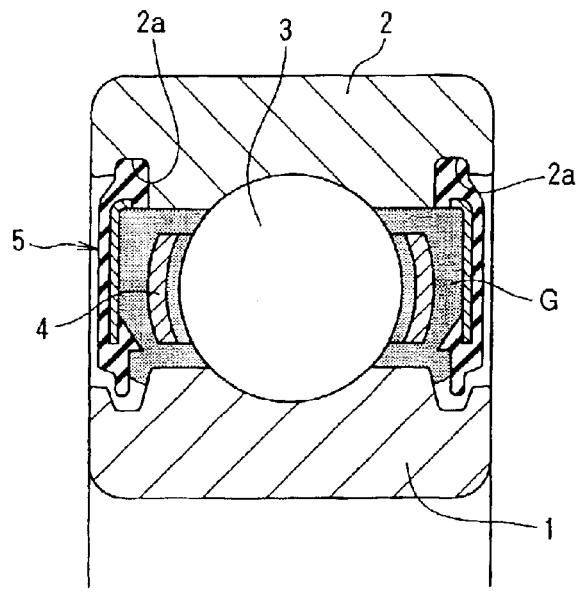
FIG. 2 is a partial longitudinal sectional view showing the configuration of a rolling bearing, which is one embodiment of the rolling apparatus of the present invention.

The configuration of the rolling bearing used in the test will be explained below, while referring to a partial longitudinal sectional view in FIG. 2.

This rolling bearing (Nominal No. 6306VV, inside diameter: 30 mm, outside diameter: 72 mm, width: 19 mm) is

TABLE 1

| | | Ex. A1 | Ex. A2 | Ex. A3 | Ex. A4 | Ex. A5 | Ex. A6 | Ex. A7 | Ex. A8 |
|---|---|---|---|---|---|---|---|---|---|
| Thickeners | Calcium sulfonate complex[1] | 50 | 50 | 25 | 75 | 50 | 50 | 50 | 25 |
| | Diurea[1] | 50 | 50 | 75 | 25 | 50 | 50 | 50 | 75 |
| Worked penetration | | 265 | 268 | 270 | 260 | 266 | 262 | 264 | 261 |
| Dropping point (° C.) | | 260 or higher | 260 or higher | 260 or higher | 260 or higher | 260 or higher | 260 or higher | 260 or higher | 260 or higher |
| Oil separation[1] [2] | | 0.2 | 0.3 | 0.3 | 0.2 | 0.3 | 0.3 | 0.3 | 0.4 |
| Water washout resistance[1] [3] | | 1.9 | 1.8 | 2.1 | 2.0 | 2.2 | 1.9 | 1.9 | 1.9 |
| Seizure load (N) | | 3626 | 4018 | 3234 | 4018 | 3626 | 3626 | 3626 | 3626 |
| Rust protection | | ○ | ○ | ○ | ○ | ○ | ○ | ○ | ○ |
| Lubricating life (hr) | | 1815 | 1845 | 1967 | 1792 | 1521 | 1376 | 1298 | 1357 |

[1] The unit of figures is % by mass.
[2] Under conditions of 100° C. and 24 hours
[3] Under conditions of 79° C. and 1 hour

TABLE 2

| | | Com. Ex. A1 | Com. Ex. A2 | Com. Ex. A3 | Com. Ex. A4 | Com. Ex. A5 |
|---|---|---|---|---|---|---|
| Thickeners | Calcium sulfonate complex[1] | — | 100 | — | — | — |
| | Diurea[1] | 100 | — | — | — | — |
| Worked penetration | | 270 | 285 | 283 | 281 | 276 |
| Dropping point (° C.) | | 260 or higher | 247 | 246 | 260 or higher | 260 or higher |
| Oil separation[1] [2] | | 0.3 | 0.3 | 0.3 | 0.4 | 0.3 |
| Water washout resistance[1] [3] | | 2.0 | 2.5 | 0.7 | 1.5 | 2.8 |
| Seizure load (N) | | 1666 | 4802 | 2058 | 1274 | 4802 |
| Rust protection | | Δ | ○ | Δ | Δ | ○ |
| Lubricating life (hr) | | 1126 | 832 | 890 | 649 | 302 |

[1] The unit of figures is % by mass.
[2] Under conditions of 100° C. and 24 hours
[3] Under conditions of 79° C. and 1 hour comprised of: an inner ring 1; an outer ring 2; a plurality of balls 3, which are disposed between the inner ring 1 and the outer ring 2 so as to flexibly roll therebetween; a cage 4 for retaining the plurality of balls 3 between the inner ring 1 and the outer ring 2; and a noncontact rubber seals 5, 5.

The rubber seal 5 is attached to a seal groove 2a of the outer ring 2, and the seal covered almost the entire opening portion located between the outer outer surface of the inner ring 1 and the inner outer surface of the outer ring 2. A space portion, which is formed between the inner ring 1 and the outer ring 2 and in which the balls 3 are placed, is filled with a grease composition G, and the rubber seals 5, 5 hermetically seal the grease composition in the bearing. This rubber seal 5 may also be a contact type.

The test results of lubricating life are shown in Tables 1 and 2. Each of the figures shown in the tables is an $L_{50}$ life, which was obtained by examining 10 test balls per one type of bearing and then using a Weibull distribution curve. The term "lubricating life" is not used herein to mean the rolling fatigue life of a bearing due to the generation of flaking, but the term is herein used to mean the life of a grease determined when a bearing becomes not to rotate because of the deterioration of a grease composition or the like.

As understood from Tables 1 and 2, the grease compositions in Examples A1 to A8 had a lubricating life more excellent than that of the grease compositions in Comparative Examples A1 to A5, and further the grease compositions in Examples A1 to A8 were long-lived under a high-temperature environment.

Then, rust protection was evaluated by the following rust protection test. The space portion of a rolling bearing (Nominal No. 6202VV) was filled with a grease composition at 35% the volume of the space portion, and under load conditions of an axial preload of 39.2 N, the rolling bearing was left at rest in a constant temperature and humidity bath, which is controlled at 80° C. and at 90% RH. At that time, the rolling bearing was placed in the constant temperature and humidity bath at an ordinary temperature without preheating it, so as to cause condensation on the rolling bearing. After leaving at rest the rolling bearing in the constant temperature and humidity bath for 1 month, the amount of rust generated on the rolling bearing was evaluated. In Tables 1 and 2, ○ denotes a rolling bearing which did not rust at all, and Δ denotes a rolling bearing on which 1 to 3 points of rust appeared.

As clear from Tables 1 and 2, the rolling bearings comprising the grease compositions in Examples A1 to A8 did not rust at all and had excellent rust protection, while the rolling bearings comprising the grease compositions in Comparative Examples A1, A3 and A4, that is, the rolling bearings comprising the grease compositions which did not contain a calcium sulfonate complex as a thickener, had insufficient rust protection.

Subsequently, the ratio of a calcium sulfonate complex and diurea in thickeners was studied. That is to say, lubricating life and dropping point were evaluated regarding various grease compositions, which had each different ratio of a calcium sulfonate complex and diurea. The content of the thickeners was uniformly set at 18% by mass based on the total mass of the grease composition. As a base oil, dialkyl diphenyl ether having a kinematic viscosity at 40° C. of 42 mm²/s was used.

Figure 3:
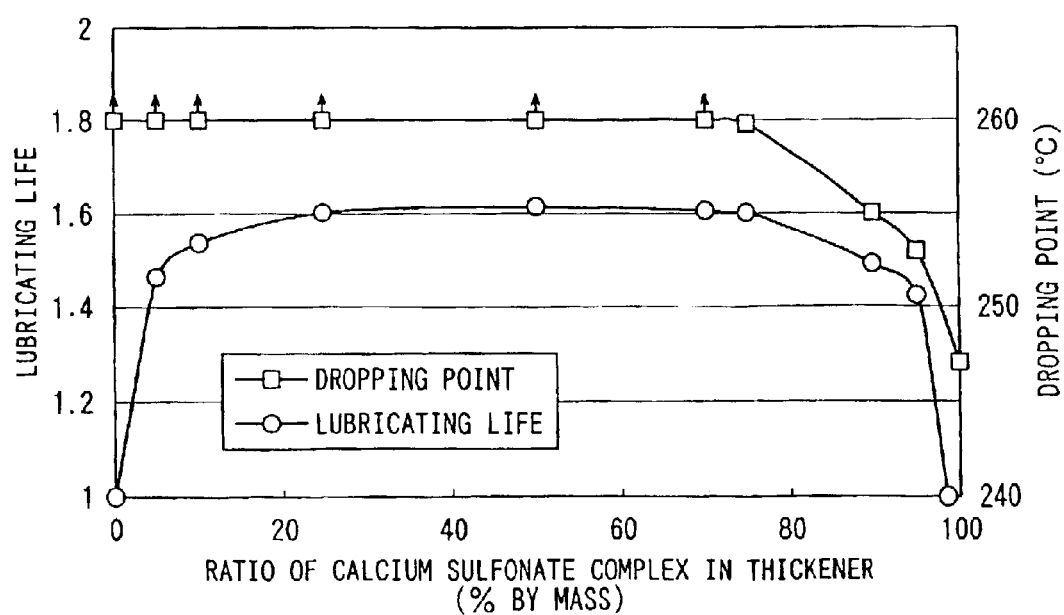
FIG. 3 is a graph showing the correlation between the ratio of a calcium sulfonate complex in a thickener, and the lubricating life and the dropping point of a grease composition.

The evaluation results are shown in the graph of FIG. 3. In this graph, the figure showing a lubricating life is represented by a relative value in a case where the lubricating life of a grease composition comprising 0% by mass of the calcium sulfonate complex (that is, comprising 100% by mass of the diurea) is defined as 1.

The graph of FIG. 3 shows that a grease composition had an excellent lubricating life when the ratio of the calcium sulfonate complex was 5 to 95% by mass, it had a more excellent lubricating life when the ratio was 10 to 90% by mass, and it had a further more excellent lubricating life when the ratio was 25 to 75% by mass.

Moreover, when the ratio of the calcium sulfonate complex was 75% or less by mass, the dropping point of the grease composition became 260° C. or higher, and it was therefore found that the grease composition had excellent heat resistance.

Thereafter, various grease compositions having each different content of thickeners were prepared to evaluate their worked penetration and water washout resistance (JIS K2220) The ratio of a calcium sulfonate complex and diurea in thickeners was uniformly set at 1:1 (mass ratio). As a base oil, dialkyl diphenyl ether having a kinematic viscosity at 40° C. of 42 mm²/s was used.

Figure 4:
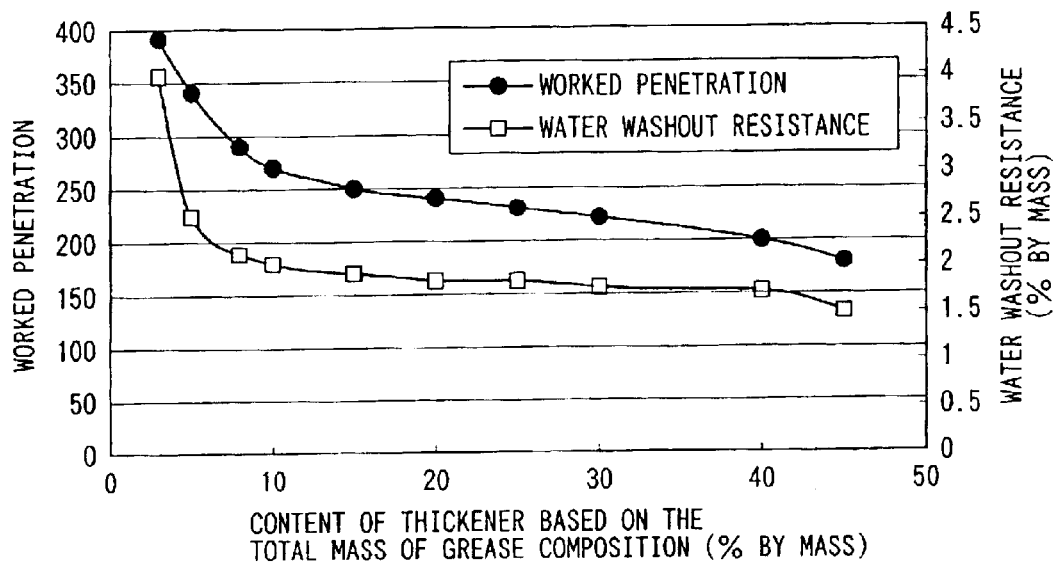
FIG. 4 is a graph showing the correlation between the content of a thickener based on the total mass of a grease composition, and the worked penetration and the water washout resistance.

The evaluation results are shown in the graph of FIG. 4. When the content of thickeners are set at 3 to 40% by mass, the worked penetration becomes 400 to 200, which is a value range applicable for the lubrication of a bearing. Taking into consideration handling property such as the supply of a grease composition, worked penetration is preferably set at 230 to 290, and it is therefore found that the content of thickeners is preferably 8 to 25% by mass.

With regard to water washout resistance, since the quality of a grease composition gets deteriorated if the grease composition does not have a certain degree of hardness. FIG. 4 shows that when the content of thickeners is 10% or more by mass, water washout resistance takes a preferred value, which is 2% or less by mass.

Considering the above evaluation results on worked penetration and water washout resistance comprehensively, it can be said that the content of thickeners is preferably set at 10 to 25% by mass based on the total mass of a grease composition.

Thereafter, various grease compositions, which had each different ratio of a neopentyl-type polyol ester oil with respect to a base oil, were prepared to evaluate their biodegradability. As a base oil, a mixed oil of a trimethylolpropane ester oil having a kinematic viscosity at 40° C. of 30 mm²/s and a dialkyl diphenyl ether having a kinematic viscosity at 40° C. of 30 mm²/s was used. As a thickener, a calcium sulfonate complex and diurea were mixed at a mass ratio of 1:1, and the content of the thickener was 15% by mass based on the total mass of the grease composition.

Figure 5:
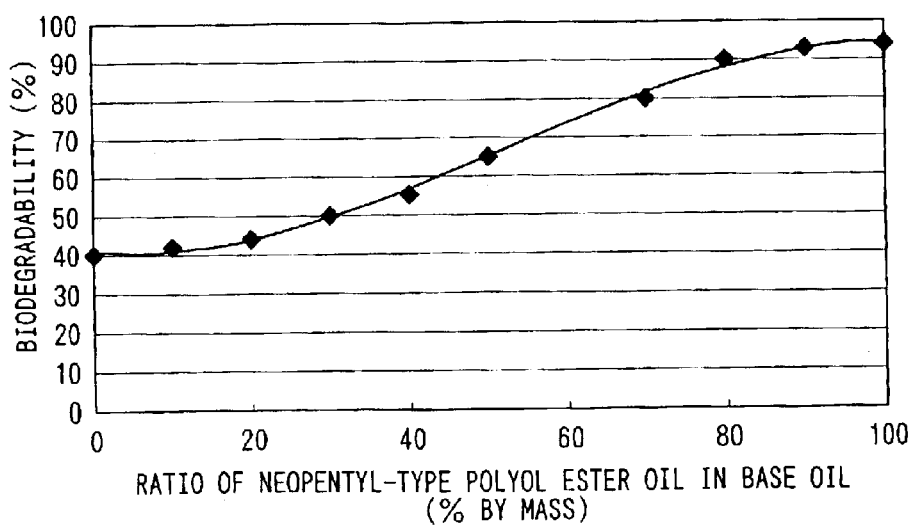
FIG. 5 is a graph showing the correlation between the ratio of a neopentyl-type polyol ester oil in a base oil and the biodegradability of a grease composition.

The evaluation results of biodegradability are shown in FIG. 5. The figure shows that a grease composition has excellent biodegradability of 90% or higher, when the ratio of a neopentyl-type polyol ester oil in a base oil is 80% or more by mass.

(B) Grease Composition Comprising Calcium Sulfonate Complex and Metallic Soap as Thickeners

EXAMPLE B1

Firstly, a calcium sulfonate complex was synthesized in a base oil as follows.

Twenty gram of overbased calcium sulfonate having a base number of 300 mgKOH/g was added to 500 g of pentaerythritol tetraester having a kinematic viscosity at 40° C. of 33.6 mm²/s, and fully stirred at 50° C. Then, 0.4 g of boric acid, 1.6 g of acetic acid, 0.8 g of behenic acid, 0.8 g of stearic acid, 0.2 g of water and 14 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, a metallic soap was synthesized in a base oil as follows.

The mixture obtained by the above operations was cooled to 60° C., and after 96.5 g of 12-hydroxystearic acid was added and completely dissolved therein, 16 g of 50% lithium hydroxide solution and 338 g of pentaerythritol tetraester were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium soap, was 25:75.

The biodegradability of this grease composition was 91% according to the Coordinating European Council guideline CEC L-33-T-82, and so the obtained grease composition had excellent biodegradability.

EXAMPLE B2

Firstly, a calcium sulfonate complex was synthesized in a base oil as follows.

Both 114 g of overbased calcium sulfonate having a base number of 400 mgKOH/g and 11.4 g of methanol were added to 500 g of pentaerythritol tetraester having a kinematic viscosity at 40° C. of 33.6 mm$^2$/s. Then, methanol was evaporated and removed by heating the mixture up to 80 to 95° C., so that calcium carbonate contained in the overbased calcium sulfonate was dispersed in the pentaerythritol tetraester in a colloid state.

Then, 6.2 g of acetic acid, 2.8 g of behenic acid, 2.0 g of stearic acid, 4.5 g of hydroxystearic acid and 10.7 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

The mixture obtained by the above operations was cooled to 60° C., and after 38.6 g of 12-hydroxystearic acid was added and completely dissolved therein, 6.5 g of 50% lithium hydroxide solution and 300 g of pentaerythritol tetraester were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium soap, was 75:25.

The biodegradability of this grease composition was 94% according to the Coordinating European Council guideline CEC L-33-T-82, and so the obtained grease composition had excellent biodegradability.

EXAMPLE B3

Firstly, a calcium sulfonate complex was synthesized in a base oil as follows.

Both 70.1 g of overbased calcium sulfonate having a base number of 300 mgKOH/g and 6.9 g of methanol were added to 500 g of pentaerythritol tetraester having a kinematic viscosity at 40° C. of 33.6 mm$^2$/s. Then, methanol was evaporated and removed by heating the mixture up to 80 to 95° C., so that calcium carbonate contained in the overbased calcium sulfonate was dispersed in the pentaerythritol tetraester in a colloid state.

Then, 0.7 g of boric acid, 2.7 g of acetic acid, 1.6 g of behenic acid, 1.3 g of stearic acid and 6.9 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

The mixture obtained by the above operations was cooled to 60° C., and after 68.6 g of 12-hydroxystearic acid was added and completely dissolved therein, 11.4 g of 50% lithium hydroxide solution and 325 g of pentaerythritol tetraester were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium soap, was 50:50.

The biodegradability of this grease composition was 90% according to the Coordinating European Council guideline CEC L-33-T-82, and so the obtained grease composition had excellent biodegradability.

EXAMPLE B4

Firstly, a calcium sulfonate complex was synthesized in a base oil as follows.

Both 118.5 g of overbased calcium sulfonate having a base number of 300 mgKOH/g and 11.8 g of methanol were added to 500 g of a mixed base oil of a paraffin mineral oil (having a kinematic viscosity at 40° C. of 80 mm$^2$/s) and pentaerythritol tetraester (having a kinematic viscosity at 40° C. of 33.6 mm$^2$/s). The mixing ratio of the paraffin mineral oil and the pentaerythritol tetraester in the above mixed base oil was 15:85 at a mass ratio. Then, methanol was evaporated and removed by heating the mixture up to 80 to 95° C., so that calcium carbonate contained in the overbased calcium sulfonate was dispersed in the mixed base oil in a colloid state.

Then, 1.3 g of boric acid, 4.6 g of acetic acid, 2.8 g of behenic acid, 2.0 g of stearic acid and 11.8 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 $cm^{-1}$, the introduction of carbon dioxide was terminated. Thereafter, the mixture was retained at 150° C. for 30 minutes so as to promote the growth of a micellar structure, that is, the homogenization of a crystal structure.

The mixture obtained by the above operations was cooled to 60° C., and after 38.6 g of 12-hydroxystearic acid was added and completely dissolved therein, 6.4 g of 50% lithium hydroxide solution and 305 g of the above mixed base oil were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium soap, was 75:25.

The biodegradability of this grease composition was 84% according to the Coordinating European Council guideline CEC L-33-T-82, and so the obtained grease composition had excellent biodegradability.

EXAMPLE B5

Firstly, a calcium sulfonate complex was synthesized in a base oil as follows.

Both 70.1 g of overbased calcium sulfonate having a base number of 300 mgKOH/g and 6.9 g of methanol were added to 500 g of a paraffin mineral oil having a kinematic viscosity at 40° C. of 80 $mm^2/s$. Then, methanol was evaporated and removed by heating the mixture up to 80 to 95° C., so that calcium carbonate contained in the overbased calcium sulfonate was dispersed in the paraffin mineral oil in a colloid state.

Then, 0.7 g of boric acid, 2.7 g of acetic acid, 1.6 g of behenic acid, 1.2 g of stearic acid and 6.9 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 $cm^{-1}$, the introduction of carbon dioxide was terminated. Thereafter, the mixture was retained at 150° C. for 30 minutes so as to promote the growth of a micellar structure, that is, the homogenization of a crystal structure.

The mixture obtained by the above operations was cooled to 60° C., and after 68.6 g of 12-hydroxystearic acid was added and completely dissolved therein, 11.4 g of 50% lithium hydroxide solution and 325 g of paraffin mineral oil were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium soap, was 50:50.

COMPARATIVE EXAMPLE B1

Eighty-five gram of 12-hydroxystearic acid was added to 500 g of a paraffin mineral oil having a kinematic viscosity at 40° C. of 80 $mm^2/s$ and completely dissolved therein, and thereafter 15 g of a 50% lithium hydroxide solution and 290 g of a paraffin mineral oil were added thereto and stirred. After the mixture was retained at 100° C. for 60 minutes, the mixture was heated up to 200° C. and then the generation reaction of lithium 12-hydroxystearate was terminated.

Thereafter, 10 g of amine antioxidant and 10 g of sulfonate anticorrosive were added to the mixture, and then milling and degassing processes were carried out to obtain a grease composition.

COMPARATIVE EXAMPLE B2

Both 300 g of overbased calcium sulfonate having a base number of 300 mgKOH/g and 30 g of methanol were added to 668 g of a paraffin mineral oil having a kinematic viscosity at 40° C. of 80 $mm^2/s$. Then, methanol was evaporated and removed by heating the mixture up to 80 to 95° C., so that calcium carbonate contained in the overbased calcium sulfonate was dispersed in the paraffin mineral oil in a colloid state.

Then, 3 g of boric acid, 12 g of acetic acid, 7 g of behenic acid, 5 g of stearic acid and 30 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 $cm^{-1}$, the introduction of carbon dioxide was terminated. Thereafter, the mixture was retained at 150° C. for 30 minutes so as to promote the growth of a micellar structure, that is, the homogenization of a crystal structure.

Thereafter, 10 g of amine antioxidant and 10 g of sulfonate anticorrosive were added to the mixture, and then milling and degassing processes were carried out to obtain a grease composition.

COMPARATIVE EXAMPLES B3 AND B4

Two types of commercially available grease compositions were prepared. The grease composition in Comparative Example B3 comprised a lithium soap as a thickener and a mineral oil as a base oil. The grease composition in Comparative Example B4 comprised a lithium soap as a thickener and a poly α-olefin oil as a base oil.

With regard to these 9 types of grease compositions (Examples B1 to B5, and Comparative Examples B1 to B4), worked penetration, dropping point, oil separation percentage and water washout resistance were determined (according to JIS K2220).

Moreover, the load carrying capacity, lubricating life and rust protection of these grease compositions were also evaluated. The evaluation methods are the same as those described above, but only the measurement conditions for lubricating life are somewhat different, as follows: test temperature is 80° C., radial load is 686 N and axial load is 490 N. The life is defined as a time when the motor stops due to overload or a time when the temperature of the bearing exceeds 90° C.

The results are summarized in Tables 3 and 4. It should be noted that seizure load and lubricating life are represented by relative values determined when each value in Comparative Example B1 is defined as 1.

TABLE 3

|  |  | Ex. B1 | Ex. B2 | Ex. B3 | Ex. B4 | Ex. B5 |
|---|---|---|---|---|---|---|
| Thickeners | Calcium sulfonate complex[1) | 25 | 75 | 50 | 75 | 50 |
|  | Lithium soap[1) | 75 | 25 | 50 | 25 | 50 |
| Worked penetration | | 265 | 293 | 274 | 282 | 266 |
| Dropping point (° C.) | | 232 | 243 | 236 | 235 | 224 |
| Oil separation[1) 2) | | 0.2 | 0.3 | 0.3 | 0.3 | 0.3 |
| Water washout resistance[1) 3) | | 2.1 | 1.9 | 2.2 | 2.0 | 1.9 |
| Seizure load | | 2.4 | 3.0 | 2.4 | 2.8 | 2.6 |
| Rust protection | | ○ | ○ | ○ | ○ | ○ |
| Lubricating life | | 2.8 | 2.2 | 2.4 | 2.1 | 2.2 |

[1)The unit of figures is % by mass.
[2)Under conditions of 100° C. and 24 hours
[3)Under conditions of 79° C. and 1 hour

TABLE 4

|  |  | Com. Ex. B1 | Com. Ex. B2 | Com. Ex. B3 | Com. Ex. B4 |
|---|---|---|---|---|---|
| Thickeners | Calcium sulfonate complex[1) | — | 100 | — | — |
|  | Lithium soap[1) | 100 | — | — | — |
| Worked penetration | | 265 | 285 | 275 | 283 |
| Dropping point (° C.) | | 184 | 235 | 185 | 189 |
| Oil separation[1) 2) | | 0.3 | 0.3 | 0.3 | 0.4 |
| Water washout resistance[1) 3) | | 1.9 | 2.1 | 1.8 | 2.0 |
| Seizure load | | 1.0 | 3.2 | 1.2 | 1.0 |
| Rust protection | | Δ | ○ | Δ | Δ |
| Lubricating life | | 1.0 | 0.8 | 1.1 | 1.4 |

[1)The unit of figures is % by mass.
[2)Under conditions of 100° C. and 24 hours
[3)Under conditions of 79° C. and 1 hour As is clear from Tables 3 and 4, since the grease compositions in Examples B1 to B5 comprised both a calcium sulfonate complex and a lithium soap as thickeners, these grease compositions had an excellent lubricating life at a high temperature and were long-lived under a high-temperature environment, when compared with the grease compositions in Comparative Examples B1 to B4 which comprised either one of the thickeners.

Moreover, rolling bearings comprising the grease compositions in Examples B1 to B5 did not rust at all, and therefore the rolling bearings had excellent rust protection. In contrast, rolling bearings comprising the grease compositions in Comparative Examples B1, B3 and B4, that is, rolling bearings comprising grease compositions which did not contain a calcium sulfonate complex as a thickener had insufficient rust protection.

(C) Grease Composition Comprising Calcium Sulfonate Complex and Complex Metallic Soap as Thickeners

EXAMPLE C1

Firstly, a calcium sulfonate complex was synthesized in a base oil as follows.

Fifty gram of overbased calcium sulfonate having a base number of 300 mgKOH/g was added to 500 g of dialkyl diphenyl ether having a kinematic viscosity at 40° C. of 97.5 mm$^2$/s. Then, the mixture was heated up to 50° C. and fully stirred.

Then, 1 g of boric acid, 4 g of acetic acid, 2 g of behenic acid, 2 g of stearic acid, 0.5 g of water and 35 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, a complex metallic soap was synthesized in a base oil as follows.

The mixture obtained by the above operations was cooled to 60° C., and then 59.4 g of 12-hydroxystearic acid was added and completely dissolved therein by heating up to 90° C. Lithium hydroxide monohydrate (8.4 g) was dissolved by heating in 42 g of water, and the thus obtained solution was added to the above mixture and then intensively stirred for saponification reaction and dehydration.

Then, 18.7 g of azelaic acid was further added to the mixture and stirred so that the mixture became homogenous. Lithium hydroxide monohydrate (8.4 g) was dissolved by heating in 42 g of water, and the thus obtained solution was added to the mixture and then intensively stirred for the saponification reaction of azelaic acid and dehydration. Dialkyl diphenyl ether (291 g)-was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium complex soap, was 50:50.

EXAMPLE C2

Firstly, a calcium sulfonate complex was synthesized in a base oil as follows.

Both 73.7 g of overbased calcium sulfonate having a base number of 400 mgKOH/g and 7.9 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 4 g of acetic acid, 1.8 g of behenic acid, 1.3 g of stearic acid, 2.9 g of hydroxystearic acid and 6.8 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, a complex metallic soap was synthesized in a base oil as follows.

The mixture obtained by the above operations was cooled to 60° C., and then 59.4 g of 12-hydroxystearic acid was added and completely dissolved therein by heating up to 90° C. Lithium hydroxide monohydrate (8.4 g) was dissolved by heating in 42 g of water, and the thus obtained solution was added to the above mixture and then intensively stirred for saponification reaction and dehydration.

Then, 18.7 g of azelaic acid was further added to the mixture and stirred so that the mixture became homogenous. Lithium hydroxide monohydrate (8.4 g) was dissolved by heating in 42 g of water, and the thus obtained solution was added to the above mixture and then intensively stirred for the saponification reaction of azelaic acid and dehydration. Dialkyl diphenyl ether (317.9 g) was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium complex soap, was 50:50.

EXAMPLE C3

Firstly, a calcium sulfonate complex was synthesized in a base oil as follows.

Both 38.3 g of overbased calcium sulfonate having a base number of 300 mgKOH/g and 3.8 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 0.4 g of boric acid, 1.5 g of acetic acid, 0.9 g of behenic acid, 0.7 g of stearic acid and 3.8 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, a complex metallic soap was synthesized in a base oil as follows.

The mixture obtained by the above operations was cooled to 60° C., and then 89.1 g of 12-hydroxystearic acid was added and completely dissolved therein by heating up to 90° C. Lithium hydroxide monohydrate (12.6 g) was dissolved by heating in 63 g of water, and the thus obtained solution was added to the above mixture and then intensively stirred for saponification reaction and dehydration.

Then, 28.1 g of azelaic acid was further added to the mixture and stirred so that the mixture became homogenous. Lithium hydroxide monohydrate (12.6 g) was dissolved by heating in 63 g of water, and the thus obtained solution was added to the above mixture and then intensively stirred for the saponification reaction of azelaic acid and dehydration. Dialkyl diphenyl ether (297.7 g) was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium complex soap, was 25:75.

EXAMPLE C4

Firstly, a calcium sulfonate complex was synthesized in a base oil as follows.

Both 115.2 g of overbased calcium sulfonate having a base number of 300 mgKOH/g and 11.6 g of methanol were added to 500 g of dialkyl diphenyl ether having a kinematic viscosity at 40° C. of 97.5 mm$^2$/s. Then, methanol was evaporated and removed by heating the mixture up to 80 to 95° C., so that calcium carbonate contained in the overbased calcium sulfonate was dispersed in the dialkyl diphenyl ether in a colloid state.

Then, 1.2 g of boric acid, 4.5 g of acetic acid, 2.7 g of behenic acid, 1.9 g of stearic acid and 11.4 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcite formation) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, a complex metallic soap was synthesized in a base oil as follows.

The mixture obtained by the above operations was cooled to 60° C., and then 29.1 g of 12-hydroxystearic acid was added and completely dissolved therein by heating up to 90° C. Lithium hydroxide monohydrate (4.1 g) was dissolved by heating in 20.7 g of water, and the thus obtained solution was added to the above mixture and then intensively stirred for saponification reaction and dehydration.

Then, 9.2 g of azelaic acid was further added to the mixture and stirred so that the mixture became homogenous. Lithium hydroxide monohydrate (4.1 g) was dissolved by heating in 20.7 g of water, and the thus obtained solution was added to the mixture and then intensively stirred for the saponification reaction of azelaic acid and dehydration. Dialkyl diphenyl ether (297.7 g) was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium complex soap, was 75:25.

EXAMPLE C5

Firstly, a calcium sulfonate complex was synthesized in a base oil as follows.

Both 76.6 g of overbased calcium sulfonate having a base number of 300 mgKOH/g and 7.7 g of methanol were added to 500 g of a mixed base oil of dialkyl diphenyl ether and pentaerythritol tetraester. The mixing ratio of dialkyl diphenyl ether and pentaerythritol tetraester in the above mixed base oil was 50:50, and the kinematic viscosity at 40° C. of the mixed base oil was 85.3 mm$^2$/s.

Then, methanol was evaporated and removed by heating the mixture up to 80 to 95° C., so that calcium carbonate contained in the overbased calcium sulfonate was dispersed in the base oil in a colloid state.

Subsequently, 0.8 g of boric acid, 3.0 g of acetic acid, 1.8 g of behenic acid, 1.3 g of stearic acid and 7.6 g of a 50% calcium hydroxide solution were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, the mixture was retained at 150° C. for 30 minutes so as to promote the growth of a micellar structure, that is, the homogenization of a crystal structure.

Secondly, a complex metallic soap was synthesized in a base oil as follows.

The mixture obtained by the above operations was cooled to 60° C., and then 59.4 g of 12-hydroxystearic acid was added and completely dissolved therein by heating up to 90° C. Lithium hydroxide monohydrate (8.4 g) was dissolved by heating in 42 g of water, and the thus obtained solution was added to the above mixture and then intensively stirred for saponification reaction and dehydration.

Then, 18.7 g of azelaic acid was further added to the mixture and stirred so that the mixture became homogenous. Lithium hydroxide monohydrate (8.4 g) was dissolved by heating in 42 g of water, and the thus obtained solution was added to the above mixture and then intensively stirred for the saponification reaction of azelaic acid and dehydration. Dialkyl diphenyl ether (317.7 g) was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and a lithium complex soap, was 50:50.

EXAMPLE C6

A grease composition was obtained in the same manner as described in Example C1 with the exception that pentaerythritol tetraester (kinematic viscosity at 40° C. of which was 68.3 mm$^2$/s) was used instead of dialkyl diphenyl ether.

The biodegradability of this grease composition was 92% according to the Coordinating European Council guideline CEC L-33-T-82, and so the obtained grease composition had excellent biodegradability.

EXAMPLE C7

A grease composition was obtained in the same manner as described in Example C2 with the exception that pentaerythritol tetraester (kinematic viscosity at 40° C. of which was 68.3 mm$^2$/s) was used instead of dialkyl diphenyl ether.

The biodegradability of this grease composition was 93% according to the CEC L-33-T-82, and so the obtained grease composition had excellent biodegradability.

EXAMPLE C8

A grease composition was obtained in the same manner as described in Example C3 with the exception that pentaerythritol tetraester (kinematic viscosity at 40° C. of which was 68.3 mm$^2$/s) was used instead of dialkyl diphenyl ether.

The biodegradability of this grease composition was 93% according to the CEC L-33-T-82, and so the obtained grease composition had excellent biodegradability.

COMPARATIVE EXAMPLE C1

To 500 g of dialkyl diphenyl ether having a kinematic viscosity at 40° C. of 97.5 mm$^2$/s, 125.1 g of 12-hydroxystearic acid was added and completely dissolved therein by heating up to 90° C. Lithium hydroxide monohydrate (17.7 g) was dissolved by heating in 88.7 g of water, and the thus obtained solution was added to the above mixture and then intensively stirred for saponification reaction and dehydration.

Then, 39.4 g of azelaic acid was further added to the mixture and stirred so that the mixture became homogenous. Lithium hydroxide monohydrate (17.7 g) was dissolved by heating in 88.7 g of water, and the thus obtained solution was added to the mixture and then intensively stirred for the saponification reaction of azelaic acid and dehydration. Dialkyl diphenyl ether (290 g) was added thereto and stirred. After the mixture was retained at 100° C. for 60 minutes, the mixture was heated up to 150° C. and then the generation reaction of a complex metallic soap was terminated.

Thereafter, 10 g of amine antioxidant and 10 g of sulfonate anticorrosive were added to the mixture, and then milling and degassing processes were carried out to obtain a grease composition.

COMPARATIVE EXAMPLE C2

Comparative Example C2 is the same as the above described Comparative Example A2.

COMPARATIVE EXAMPLES C3 to C5

Three types of commercially available grease compositions were prepared. The grease composition in Comparative Example C3 comprised a lithium complex soap as a thickener and dialkyl diphenyl ether as a base oil. The grease composition in Comparative Example C4 comprised a lithium complex soap as a thickener and pentaerythritol tetraester as a base oil. The grease composition in Comparative Example C5 comprised an overbased calcium sulfonate complex as a thickener and a mineral oil as a base oil.

With regard to these 13 types of grease compositions (Examples C1 to C8, and Comparative Examples C1 to C5), worked penetration, dropping point, oil separation percentage and water washout resistance were determined (according to JIS K2220).

Moreover, the load carrying capacity, lubricating life and rust protection of these grease compositions were also evaluated. The evaluation methods of these properties are completely the same as those described above in the chapter "(A) Grease composition comprising calcium sulfonate complex and polyurea as thickeners", and so the explanation will be omitted. The results are summarized in Tables 5 and 6.

TABLE 5

|  |  | Ex. C1 | Ex. C2 | Ex. C3 | Ex. C4 | Ex. C5 | Ex. C6 | Ex. C7 | Ex. C8 |
|---|---|---|---|---|---|---|---|---|---|
| Thickeners | Calcium sulfonate complex[1] | 50 | 50 | 25 | 75 | 50 | 50 | 50 | 50 |
|  | Lithium complex soap[1] | 50 | 50 | 75 | 25 | 50 | 50 | 50 | 50 |
| Worked penetration | | 275 | 269 | 273 | 270 | 268 | 264 | 269 | 266 |
| Dropping point (° C.) | | 260 or higher | 260 or higher | 260 or higher | 260 or higher | 260 or higher | 260 or higher | 260 or higher | 260 or higher |
| Oil separation[1] [2] | | 0.2 | 0.2 | 0.3 | 0.3 | 0.1 | 0.3 | 0.3 | 0.3 |
| Water washout resistance[1] [3] | | 1.8 | 1.8 | 2.1 | 2.0 | 2.2 | 1.9 | 1.7 | 1.8 |
| Seizure load (N) | | 3460 | 4010 | 3116 | 3880 | 3530 | 3316 | 3665 | 3500 |
| Rust protection | | ◯ | ◯ | ◯ | ◯ | ◯ | ◯ | ◯ | ◯ |
| Lubricating life (hr) | | 1850 | 1840 | 1907 | 1802 | 1551 | 1400 | 1320 | 1457 |

[1])The unit of figures is % by mass.
[2])Under conditions of 100° C. and 24 hours
[3])Under conditions of 79° C. and 1 hour

TABLE 6

|  |  | Com. Ex. C1 | Com. Ex. C2 | Com. Ex. C3 | Com. Ex. C4 | Com. Ex. C5 |
|---|---|---|---|---|---|---|
| Thickeners | Calcium sulfonate complex[1] | — | 100 | — | — | — |
|  | Lithium complex soap[1] | 100 | — | — | — | — |
| Worked penetration | | 275 | 285 | 280 | 287 | 276 |
| Dropping point (° C.) | | 260 or higher | 247 | 246 | 260 or higher | 260 or higher |
| Oil separation[1] [2] | | 0.3 | 0.3 | 0.3 | 0.3 | 0.3 |
| Water washout resistance[1] [3] | | 1.7 | 2.5 | 2.0 | 1.7 | 2.8 |
| Seizure load (N) | | 1620 | 4805 | 1805 | 1380 | 4802 |
| Rust protection | | Δ | ◯ | Δ | Δ | ◯ |
| Lubricating life (hr) | | 1050 | 832 | 900 | 749 | 302 |

[1])The unit of figures is % by mass.
[2])Under conditions of 100° C. and 24 hours
[3])Under conditions of 79° C. and 1 hour As is clear from Tables 5 and 6, since the grease compositions in Examples C1 to C8 comprised both a calcium sulfonate complex and a lithium complex soap as thickeners, these grease compositions had an excellent lubricating life at a high temperature and were long-lived under a high-temperature environment, when compared with the grease compositions in Comparative Examples C1 to C5 which comprised either one of the thickeners.

Moreover, rolling bearings comprising the grease compositions in Examples C1 to C8 did not rust at all, and therefore the rolling bearings had excellent rust protection. In contrast, rolling bearings comprising the grease compositions in Comparative Examples C1, C3 and C4, that is, rolling bearings comprising grease compositions which did not contain a calcium sulfonate complex as a thickener had insufficient rust protection.

(D) Grease Composition Comprising Calcium Sulfonate Complex and N-Substituted Terephthalamic Acid Metal Salt as Thickeners

EXAMPLE D1

Firstly, a calcium sulfonate complex was synthesized in a base oil as follows.

Fifty gram of overbased calcium sulfonate having a base number of 300 mgKOH/g was added to 396 g of a mineral oil having a kinematic viscosity at 40° C. of 97.7 mm$^2$/s, and the mixture was fully stirred at 50° C. Then, 1 g of boric acid, 4 g of acetic acid, 2 g of behenic acid, 2 g of stearic acid, 0.5 g of water and 35 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 85.7 g of the methyl ester of N-octadecyl terephthalamic acid and 250 g of a mineral oil were added thereto and dissolved by heating to 130° C. Thereafter, the mixture was cooled to 100° C. or lower, and 18.6 g of a 50% sodium hydroxide solution was added thereto. While fully stirring, the mixture was gradually heated to perform saponification. After completion of the saponification, 145 g of a mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 50:50.

EXAMPLE D2

Firstly, a calcium sulfonate complex was synthesized in a base oil as follows.

Fifty gram of overbased calcium sulfonate having a base number of 300 mgKOH/g was added to 396 g of a mineral oil having a kinematic viscosity at 40° C. of 97.7 mm$^2$/s, and the mixture was fully stirred at 50° C. Then, 1 g of boric acid, 4 g of acetic acid, 2 g of behenic acid, 2 g of stearic acid, 0.5 g of water and 35 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 57.8 g of the methyl ester of N-octadecyl terephthalamic acid and 300 g of a mineral oil were added thereto and dissolved by heating to 130° C. Thereafter, the mixture was cooled to 100° C. or lower, and 42 g of a 30% barium hydroxide solution was added thereto. While fully stirring, the mixture was gradually heated to perform saponification. After completion of the saponification, 102.8 g of mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and barium N-octadecyl terephthalamate, was 50:50.

EXAMPLE D3

Firstly, a calcium sulfonate complex was synthesized in a base oil as follows.

Overbased calcium sulfonate (68.1 g) having abase number of 300 mgKOH/g was added to 362 g of a mineral oil having a kinematic viscosity at 40° C. of 97.7 mm$^2$/s, and the mixture was fully stirred at 50° C. Then, 1.4 g of boric acid, 5.4 g of acetic acid, 2.7 g of behenic acid, 2.7 g of stearic acid, 0.5 g of water and 47.7 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 115.5 g of the methyl ester of N-octadecyl terephthalamic acid and 250 g of a mineral oil were added thereto and dissolved by heating to 130° C. Thereafter, the mixture was cooled to 100° C. or lower, and 25.0 g of a 50% sodium hydroxide solution was added thereto. While fully stirring, the mixture was gradually heated to perform saponification. After completion of the saponification, 62 g of a mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 50:50.

EXAMPLE D4

Firstly, a calcium sulfonate complex was synthesized in a base oil as follows.

Overbased calcium sulfonate (29.4 g) having a base number of 300 mgKOH/g was added to 435 g of a mineral oil having a kinematic viscosity at 40° C. of 97.7 mm$^2$/s, and the mixture was fully stirred at 50° C. Then, 0.6 g of boric acid, 2.3 g of acetic acid, 1.1 g of behenic acid, 1.1 g of stearic acid, 0.5 g of water and 20.5 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 36.4 g of the methyl ester of N-octadecyl terephthalamic acid and 300 g of a mineral oil were added thereto and dissolved by heating to 130° C. Thereafter, the mixture was cooled to 100° C. or lower, and 26.4 g of a 30% barium hydroxide solution was added thereto. While fully stirring, the mixture was gradually heated to perform saponification. After completion of the saponification, 135.1 g of a mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and barium N-octadecyl terephthalamate, was 50:50.

EXAMPLE D5

Firstly, a calcium sulfonate complex was synthesized in a base oil as follows.

Overbased calcium sulfonate (58.7 g) having abase number of 300 mgKOH/g was added to 379.7 g of a mineral oil having a kinematic viscosity at 40° C. of 97.7 mm$^2$/s, and the mixture was fully stirred at 50° C. Then, 1.2 g of boric acid, 4.7 g of acetic acid, 2.3 g of behenic acid, 2.3 g of stearic acid, 0.5 g of water and 41.1 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 33.1 g of the methyl ester of N-octadecyl terephthalamic acid and 250 g of a mineral oil were added thereto and dissolved by heating to 130° C. Thereafter, the mixture was cooled to 100° C. or lower, and 7.2 g of a 50% sodium hydroxide solution was added thereto. While fully stirring, the mixture was gradually heated to perform saponification. After completion of the saponification, 203.3 g of a mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 75:25.

EXAMPLE D6

Firstly, a calcium sulfonate complex was synthesized in a base oil as follows.

Overbased calcium sulfonate (36.4 g) having abase number of 300 mgKOH/g was added to 421.9 g of a mineral oil having a kinematic viscosity at 40° C. of 97.7 mm²/s, and the mixture was fully stirred at 50° C. Then, 0.7 g of boric acid, 2.9 g of acetic acid, 1.4 g of behenic acid, 1.4 g of stearic acid, 0.5 g of water and 25.3 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 183.9 g of the methyl ester of N-octadecyl terephthalamic acid and 250 g of a mineral oil were added thereto and dissolved by heating to 130° C. Thereafter, the mixture was cooled to 100° C. or lower, and 40.0 g of a 50% sodium hydroxide solution was added thereto. While fully stirring, the mixture was gradually heated to perform saponification. After completion of the saponification, 36.1 g of a mineral oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 25:75.

EXAMPLE D7

Firstly, a calcium sulfonate complex was synthesized in a base oil as follows.

Overbased calcium sulfonate (53.8 g) having a base number of 400 mgKOH/g was added to 389 g of a poly α-olefin oil having a kinematic viscosity at 40° C. of 67.5 mm²/s, and the mixture was fully stirred at 50° C. Then, 1.1 g of boric acid, 4.3 g of acetic acid, 2.1 g of behenic acid, 2.1 g of stearic acid, 0.5 g of water and 37.6 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 92.0 g of the methyl ester of N-octadecyl terephthalamic acid and 250 g of a poly α-olefin oil were added thereto and dissolved by heating to 130° C. Thereafter, the mixture was cooled to 100° C. or lower, and 20.0 g of a 50% sodium hydroxide solution was added thereto. While fully stirring, the mixture was gradually heated to perform saponification. After completion of the saponification, 138 g of a poly α-olefin oil was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 50:50.

EXAMPLE D8

Firstly, a calcium sulfonate complex was synthesized in a base oil as follows.

Overbased calcium sulfonate (51.9 g) having a base number of 400 mgKOH/g was added to 392.5 g of pentaerythritol tetraester having a kinematic viscosity at 40° C. of 73.2 mm²/s, and the mixture was fully stirred at 50° C. Then, 1.0 g of boric acid, 4.1 g of acetic acid, 2.1 g of behenic acid, 2.1 g of stearic acid, 0.5 g of water and 36.3 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 88.9 g of the methyl ester of N-octadecyl terephthalamic acid and 250 g of pentaerythritol tetraester were added thereto and dissolved by heating to 130° C. Thereafter, the mixture was cooled to 100° C. or lower, and 19.2 g of a 50% sodium hydroxide solution was added thereto. While fully stirring, the mixture was gradually heated to perform saponification. After completion of the saponification, 141.5 g of pentaerythritol tetraester was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 50:50.

EXAMPLE D9

Firstly, a calcium sulfonate complex was synthesized in a base oil as follows.

Overbased calcium sulfonate (55.4 g) having abase number of 400 mgKOH/g was added to 385.7 g of dialkyl diphenyl ether having a kinematic viscosity at 40° C. of 97.1 mm²/s, and the mixture was fully stirred at 50° C. Then, 1.1 g of boric acid, 4.5 g of acetic acid, 2.2 g of behenic acid, 2.2 g of stearic acid, 0.5 g of water and 35 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 23 g of the methyl ester of N-octadecyl terephthalamic acid and 300 g of dialkyl diphenyl ether were added thereto and dissolved by heating to 130° C. Thereafter, the mixture was cooled to 100° C. or lower, and 16.7 g of a 30% barium hydroxide solution was added thereto. While fully stirring, the mixture was gradually heated to perform saponification. After completion of the saponification, 155.3 g of dialkyl diphenyl ether was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and barium N-octadecyl terephthalamate, was 75:25.

EXAMPLE D10

Firstly, a calcium sulfonate complex was synthesized in a base oil as follows.

Overbased calcium sulfonate (57.1 g) having a base number of 400 mgKOH/g was added to 382.7 g of a poly α-olefin oil having a kinematic viscosity at 40° C. of 67.5 mm$^2$/s, and the mixture was fully stirred at 50° C. Then, 1.2 g of boric acid, 4.6 g of acetic acid, 2.2 g of behenic acid, 2.2 g of stearic acid, 0.5 g of water and 40 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 32.2 g of the methyl ester of N-octadecyl terephthalamic acid and 250 g of pentaerythritol tetraester having a kinematic viscosity at 40° C. of 73.2 mm$^2$/s were added thereto and dissolved by heating to 130° C. Thereafter, the mixture was cooled to 100° C. or lower, and 7.0 g of a 50% sodium hydroxide solution was added thereto. While fully stirring, the mixture was gradually heated to perform saponification. After completion of the saponification, 204.3 g of pentaerythritol tetraester was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 75:25.

EXAMPLE D11

Firstly, a calcium sulfonate complex was synthesized in a base oil as follows.

Overbased calcium sulfonate (60.3 g) having a base number of 400 mgKOH/g was added to 376.7 g of pentaerythritol tetraester having a kinematic viscosity at 40° C. of 73.2 mm$^2$/s, and the mixture was fully stirred at 50° C. Then, 1.2 g of boric acid, 4.8 g of acetic acid, 2.4 g of behenic acid, 2.4 g of stearic acid, 0.5 g of water and 42.2 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 34 g of the methyl ester of N-octadecyl terephthalamic acid and 250 g of dialkyl diphenyl ether having a kinematic viscosity at 40° C. of 97.1 mm$^2$/s were added thereto and dissolved by heating to 130° C. Thereafter, the mixture was cooled to 100° C. or lower, and 7.4 g of a 50% sodium hydroxide solution was added thereto. While fully stirring, the mixture was gradually heated to perform saponification. After completion of the saponification, 202.3 g of dialkyl diphenyl ether was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 75:25.

EXAMPLE D12

Firstly, a calcium sulfonate complex was synthesized in a base oil as follows.

Overbased calcium sulfonate (36.4 g) having a base number of 400 mgKOH/g was added to 422.8 g of a poly α-olefin oil having a kinematic viscosity at 40° C. of 67.5 mm$^2$/s, and the mixture was fully stirred at 50° C. Then, 0.7 g of boric acid, 2.9 g of acetic acid, 1.4 g of behenic acid, 1.4 g of stearic acid, 0.5 g of water and 24.9 g of calcium hydroxide were added thereto, and water was evaporated and removed by heating the mixture up to 80 to 95° C. Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated.

Secondly, an N-octadecyl terephthalamic acid metal salt was synthesized in a base oil as follows.

The mixture obtained by the above operations was cooled to 60° C., and 181.2 g of the methyl ester of N-octadecyl terephthalamic acid and 250 g of dialkyl diphenyl ether having a kinematic viscosity at 40° C. of 97.1 mm$^2$/s were added thereto and dissolved by heating to 130° C. Thereafter, the mixture was cooled to 100° C. or lower, and 39.4 g of a 50% sodium hydroxide solution was added thereto. While fully stirring, the mixture was gradually heated to perform saponification. After completion of the saponification, 39.1 g of dialkyl diphenyl ether was further added thereto at 150° C. and then the mixture was heated up to 200° C.

Thereafter, 10 g of amine antioxidant and 10 g of sulfonate anticorrosive were added to the mixture, and then milling and degassing processes were carried out to obtain a grease composition. The mass ratio of the generated thickeners, a calcium sulfonate complex and sodium N-octadecyl terephthalamate, was 25:75.

COMPARATIVE EXAMPLE D1

Methyl ester (83.0 g) of N-octadecyl terephthalamic acid was added to 500 g of a mineral oil having a kinematic viscosity at 40° C. of 97.7 mm$^2$/s and dissolved by heating to 130° C. Thereafter, the mixture was cooled to 100° C. or lower, and 18.0 g of a 50% sodium hydroxide solution was added thereto. While fully stirring, the mixture was gradually heated to perform saponification. After completion of the saponification, 388 g of a mineral oil was further added thereto at 150° C. and then the mixture was heated up to 200° C. Thereafter, 10 g of amine antioxidant and 10 g of sulfonate anticorrosive were added to the mixture, and then milling and degassing processes were carried out to obtain a grease composition.

COMPARATIVE EXAMPLE D2

Methyl ester (83.9 g) of N-octadecyl terephthalamic acid was added to 500 g of a poly α-olefin oil having a kinematic viscosity at 40° C. of 67.5 mm$^2$/s and dissolved by heating to 130° C. Thereafter, the mixture was cooled to 100° C. or lower, and 18.2 g of 50% sodium hydroxide solution was added thereto. While fully stirring, the mixture was gradually heated to perform saponification. After completion of the saponification, 387 g of a poly α-olefin oil was further added thereto at 150° C. and then the mixture was heated up to 200° C. Thereafter, 10 g of amine antioxidant and 10 g of sulfonate anticorrosive were added to the mixture, and then milling and degassing processes were carried out to obtain a grease composition.

COMPARATIVE EXAMPLE D3

Overbased calcium sulfonate (159 g) having a base number of 300 mgKOH/g was added to 681 g of dialkyl diphenyl ether having a kinematic viscosity at 40° C. of 97.5 mm$^2$/s, and then the mixture was fully stirred at 50° C. Then, 3.2 g of boric acid, 12.7 g of acetic acid, 6.4 g of behenic acid, 6.4 g of stearic acid, 1 g of water and 111.3 g of calcium hydroxide were added thereto, and water was evaporated and removed by heating the mixture up to 80 to 95° C.

Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, 10 g of amine antioxidant and 10 g of sulfonate anticorrosive were added to the mixture, and then milling and degassing processes were carried out to obtain a grease composition.

COMPARATIVE EXAMPLE D4

Over based calcium sulfonate (160.6 g) having a base number of 400 mgKOH/g was added to 678 g of pentaerythritol tetraester having a kinematic viscosity at 40° C. of 73.2 mm$^2$/s, and then the mixture was fully stirred at 50° C. Then, 3.2 g of boric acid, 12.8 g of acetic acid, 6.5 g of behenic acid, 6.5 g of stearic acid, 1 g of water and 112.4 g of calcium hydroxide were added thereto, and water was evaporated and removed by heating the mixture up to 80 to 95° C.

Thereafter, carbon dioxide was introduced into this mixture to generate calcium carbonate. The obtained mixture was analyzed with an infrared spectrometer, and when the stabilization (calcitication) of calcium carbonate was confirmed at a peak of 882 to 886 cm$^{-1}$, the introduction of carbon dioxide was terminated. Thereafter, 10 g of amine antioxidant and 10 g of sulfonate anticorrosive were added to the mixture, and then milling and degassing processes were carried out to obtain a grease composition.

COMPARATIVE EXAMPLES D5 AND D6

Two types of commercially available grease compositions were prepared. The grease composition in Comparative Example D5 comprised sodium N-octadecyl terephthalamate as a thickener and pentaerythritol tetraester as a base oil. The grease composition in Comparative Example D6 comprised a calcium sulfonate complex as a thickener and a mineral oil as a base oil.

The constitution and properties of these 18 types of grease compositions (Examples D1 to D12, and Comparative Examples D1 to D6) are summarized in Tables 7 to 9. It should be noted that the content of base oils and thickeners shown in Tables 7 to 9 is based on a condition that the total amount of base oils and thickeners is set at 100, and therefore the amount of additives are not considered herein. Each figure in columns of the types of thickeners and base oils indicates the mass ratio (% by mass) of each component based on the total mass of thickeners and base oils.

TABLE 7

| | | Ex. D1 | Ex. D2 | Ex. D3 | Ex. D4 | Ex. D5 | Ex. D6 |
|---|---|---|---|---|---|---|---|
| Type of thickeners[1] | CaSC[2] | 50 | 50 | 50 | 50 | 75 | 25 |
| | Na terephthalamate[3] | 50 | — | 50 | — | 25 | 75 |
| | Ba terephthalamate[4] | — | 50 | — | 50 | — | — |
| Amount of thickeners[1] | | 18.9 | 18.1 | 25.6 | 11.1 | 14.7 | 27.2 |
| Type of base oils[1] | Mineral oil | 100 | 100 | 100 | 100 | 100 | 100 |
| | PAO oil[5] | — | — | — | — | — | — |
| | PETE[6] | — | — | — | — | — | — |
| | DPE[7] | — | — | — | — | — | — |
| Amount of base oils[1] | | 81.1 | 81.9 | 74.4 | 88.9 | 85.3 | 72.8 |
| Worked penetration | | 287 | 295 | 250 | 334 | 280 | 275 |
| Penetration change (%) | | −2.4 | −1.7 | −2.0 | −1.4 | −3.6 | −0.4 |
| Seizure load (N) | | 3626 | 3626 | 4018 | 4018 | 4018 | 3234 |
| Anticorrosive test | | ○ | ○ | ○ | ○ | ○ | ○ |
| Lubricating life (hr) | | 410 | 387 | 432 | 403 | 365 | 355 |

[1]The unit of figures is % by mass.
[2]Calcium sulfonate complex
[3]N-octadecyl terephthalamic acid sodium salt
[4]N-octadecyl terephthalamic acid barium salt
[5]Poly α-olefin oil
[6]Pentaerythritol tetraester
[7]Dialkyl diphenyl ether

TABLE 8

| | | Ex. D7 | Ex. D8 | Ex. D9 | Ex. D10 | Ex. D11 | Ex. D12 |
|---|---|---|---|---|---|---|---|
| Type of thickeners[1] | CaSC[2] | 50 | 50 | 75 | 75 | 75 | 25 |
| | Na terephthalamate[3] | 50 | 50 | — | 25 | 25 | 75 |
| | Ba terephthalamate[4] | — | — | 25 | — | — | — |
| Amount of thickeners[1] | | 20.3 | 19.6 | 13.9 | 14.3 | 15.1 | 26.8 |
| Type of base oils[1] | Mineral oil | — | — | — | — | — | — |
| | PAO oil[5] | 100 | — | — | 50 | — | 50 |
| | PETE[6] | — | 100 | — | 50 | 50 | — |
| | DPE[7] | — | — | 100 | — | 50 | 50 |
| Amount of base oils[1] | | 79.7 | 80.4 | 86.1 | 85.7 | 84.9 | 73.2 |
| Worked penetration | | 288 | 269 | 272 | 277 | 260 | 284 |
| Penetration change (%) | | −1.7 | −1.9 | −3.7 | −3.6 | −3.8 | −0.7 |
| Seizure load (N) | | 3626 | 3626 | 3234 | 3423 | 4018 | 4018 |
| Anticorrosive test | | ○ | ○ | ○ | ○ | ○ | ○ |
| Lubricating life (hr) | | 823 | 1167 | 1683 | 1042 | 1515 | 1385 |

[1]The unit of figures is % by mass.
[2]Calcium sulfonate complex
[3]N-octadecyl terephthalamic acid sodium salt
[4]N-octadecyl terephthalamic acid barium salt
[5]Poly α-olefin oil
[6]Pentaerythritol tetraester
[7]Dialkyl diphenyl ether

TABLE 9

| | | Com. Ex. D1 | Com. Ex. D2 | Com. Ex. D3 | Com. Ex. D4 | Com. Ex. D5 | Com. Ex. D6 |
|---|---|---|---|---|---|---|---|
| Type of thickeners[1] | CaSC[2] | — | — | 100 | 100 | — | — |
| | Na terephthalamate[3] | 100 | 100 | — | — | — | — |
| | Ba terephthalamate[4] | — | — | — | — | — | — |
| Amount of thickeners[1] | | 9.2 | 9.3 | 29.9 | 30.2 | — | — |
| Type of base oils[1] | Mineral oil | 100 | — | — | — | — | — |
| | PAO oil[5] | — | 100 | — | — | — | — |
| | PETE[6] | — | — | — | 100 | — | — |
| | DPE[7] | — | — | 100 | — | — | — |
| Amount of base oils[1] | | 90.8 | 90.7 | 70.1 | 69.8 | — | — |
| Worked penetration | | 281 | 283 | 276 | 277 | 283 | 276 |
| Penetration change (%) | | -0.7 | 0.4 | -21.7 | -19.9 | 3.5 | -18.1 |
| Seizure load (N) | | 1666 | 1666 | 4802 | 4802 | 1274 | 4802 |
| Anticorrosive test | | Δ | Δ | ◯ | ◯ | Δ | ◯ |
| Lubricating life (hr) | | 309 | 477 | 832 | 549 | 688 | 302 |

[1]The unit of figures is % by mass.
[2]Calcium sulfonate complex
[3]N-octadecyl terephthalamic acid sodium salt
[4]N-octadecyl terephthalamic acid barium salt
[5]Poly α-olefin oil
[6]Pentaerythritol tetraester
[7]Dialkyl diphenyl ether With regard to these 18 types of grease compositions, worked penetration, load carrying capacity, rust protection, water resistance and lubricating life were evaluated.

For water resistance test, a roll stability tester (ASTM D1831) was used. Fifty gram of a grease composition and 15 g of water as well as a roll were charged in a cylinder, and this cylinder was then rotated at 165 rpm at a temperature of 80° C. for 24 hours, so that the grease composition was sheared by the roll. Thus, water resistance was evaluated by the rate of penetration change generated before and after the addition of shearing (penetration change rate=([penetration after the addition of shearing]–[penetration before the addition of shearing])/[penetration before the addition of shearing]×100).

The evaluation methods of worked penetration, load carrying capacity, rust protection and lubricating life are completely the same as those described above in the chapter "(A) Grease composition comprising calcium sulfonate complex and polyurea as thickeners", and so the explanation will be omitted.

The evaluation results are summarized in Tables 7 to 9. Since the grease compositions in Examples D1 to D12 comprised both a calcium sulfonate complex and an N-octadecyl terephthalamic acid metal salt as thickeners, these grease compositions were excellent in all of seizure resistance at a high temperature, lubricating life at a high temperature and water resistance.

In contrast, since the grease compositions in Comparative Examples D1 to D6 comprised either one of a calcium sulfonate complex and an N-octadecyl terephthalamic acid metal salt, these grease compositions were insufficient in any of seizure resistance at a high temperature, lubricating life at a high temperature and water resistance.

Moreover, rolling bearings comprising the grease compositions in Examples D1 to D12 did not rust at all, and therefore these rolling bearings had excellent rust protection. In contrast, rolling bearings comprising the grease compositions in Comparative Examples D1, D2 and D5, that is, rolling bearings comprising grease compositions which did not contain a calcium sulfonate complex as a thickener, had insufficient rust protection.

(E) Grease Composition Comprising N-Substituted Terephthalamic Acid Metal Salt and Polyurea as Thickeners

EXAMPLE E1

Methyl ester (85.7 g) of N-octadecyl terephthalamic acid was added to 250.0 g of dialkyl diphenyl ether (kinematic viscosity at 40° C. of which was 97.5 mm$^2$/s), and it was dissolved therein by heating to 130° C. Thereafter, the mixture was cooled to 100° C. or lower, and 18.6 g of a 50% sodium hydroxide solution was added thereto. While fully stirring, the mixture was gradually heated to perform saponification.

After completion of the saponification, 250.0 g of dialkyl diphenyl ether was further added thereto at 150° C. and then the mixture was heated up to 200° C. Then, the mixture was cooled to 60° C., and 51.0 g of 4,4'-diphenylmethane diisocyanate was added and completely dissolved therein. Thereafter, 44 g of cyclohexylamine and 280.7 g of dialkyl diphenyl ether were added thereto and stirred. After the mixture was retained at 100° C. for 60 minutes, the mixture was heated up to 150° C. and the reaction was terminated.

Thereafter, 10.0 g of amine antioxidant and 10.0 g of sulfonate anticorrosive were added to the mixture, and then milling and degassing processes were carried out to obtain a grease composition. The mass ratio of the generated thickeners, sodium N-octadecyl terephthalamate and diurea, was 50:50.

EXAMPLE E2

Methyl ester (57.8 g) of N-octadecyl terephthalamic acid was added to 300.0 g of dialkyl diphenyl ether (kinematic viscosity at 40° C. of which was 97.5 mm$^2$/s), and it was dissolved therein by heating to 130° C. Thereafter, the mixture was cooled to 100° C. or lower, and 42.0 g of a 30% barium hydroxide solution was added thereto. While fully stirring, the mixture was gradually heated to perform saponification.

After completion of the saponification, 23.2 g of dialkyl diphenyl ether was further added thereto at 150° C. and then the mixture was heated up to 200° C. Then, the mixture was cooled to 60° C., and 36.3 g of 4,4'-diphenylmethane diisocyanate was added and completely dissolved therein. Thereafter, 28.7 g of cyclohexylamine and 120.0 g of dialkyl diphenyl ether were added thereto and stirred. After the mixture was retained at 100° C. for 60 minutes, the mixture was heated up to 150° C. and the reaction was terminated.

Thereafter, 10.0 g of amine antioxidant and 10.0 g of sulfonate anticorrosive were added to the mixture, and then milling and degassing processes were carried out to obtain a grease composition. The mass ratio of the generated thickeners, barium di(N-octadecyl terephthalamate) and diurea, was 50:50.

EXAMPLE E3

Methyl ester (42.9 g) of N-octadecyl terephthalamic acid was added to 250.0 g of dialkyl diphenyl ether (kinematic viscosity at 40° C. of which was 97.5 mm$^2$/s), and it was dissolved therein by heating to 130° C. Thereafter, the mixture was cooled to 100° C. or lower, and 9.3 g of a 50% sodium hydroxide solution was added thereto. While fully stirring, the mixture was gradually heated to perform saponification.

After completion of the saponification, 50.0 g of dialkyl diphenyl ether was further added thereto at 150° C. and then the mixture was heated up to 200° C. Then, the mixture was cooled to 60° C., and 76.5 g of 4,4'-diphenylmethane diisocyanate was added and completely dissolved therein. Thereafter, 66.0 g of cyclohexylamine and 280.7 g of dialkyl diphenyl ether were added thereto and stirred. After the mixture was retained at 100° C. for 60 minutes, the mixture was heated up to 150° C. and the reaction was terminated.

Thereafter, 10.0 g of amine antioxidant and 10.0 g of sulfonate anticorrosive were added to the mixture, and then milling and degassing processes were carried out to obtain a grease composition. The mass ratio of the generated thickeners, sodium N-octadecyl terephthalamate and diurea, was 25:75.

EXAMPLE E4

Methyl ester (85.7 g) of N-octadecyl terephthalamic acid was added to 250.0 g of a mixed base oil (kinematic viscosity at 40° C. of which was 85.3 mm$^2$/s) of dialkyl diphenyl ether and pentaerythritol tetraester, and it was dissolved therein by heating to 130° C. Thereafter, the mixture was cooled to 100° C. or lower, and 18.6 g of 50% sodium hydroxide solution was added thereto. While fully stirring, the mixture was gradually heated to perform saponification.

After completion of the saponification, 250.0 g of the above mixed base oil was further added thereto at 150° C. and then the mixture was heated up to 200° C. Then, the mixture was cooled to 60° C., and 52.6 g of 4,4'-diphenylmethane diisocyanate was added and completely dissolved therein. Thereafter, 9.0 g of p-toluidine, 33.4 g of cyclohexylamine and 280.7 g of the above mixed base oil were added thereto and stirred. After the mixture was retained at 100° C. for 60 minutes, the mixture was heated up to 150° C. and the reaction was terminated.

Thereafter, 10.0 g of amine antioxidant and 10.0 g of sulfonate anticorrosive were added to the mixture, and then milling and degassing processes were carried out to obtain a grease composition. The mass ratio of the generated thickeners, sodium N-octadecyl terephthalamate and diurea, was 50:50.

EXAMPLE E5

Methyl ester (94.0 g) of N-octadecyl terephthalamic acid was added to 250.0 g of a mixed base oil (kinematic viscosity at 40° C. of which was 92.2 mm$^2$/s) of dialkyl diphenyl ether and a poly α-olefin oil, and it was dissolved therein by heating to 130° C. Thereafter, the mixture was cooled to 100° C. or lower, and 19.4 g of a 50% sodium hydroxide solution was added thereto. While fully stirring, the mixture was gradually heated to perform saponification.

After completion of the saponification, 250.0 g of the above mixed base oil was further added thereto at 150° C. and then the mixture was heated up to 200° C. Then, the mixture was cooled to 60° C., and 10.5 g of 4,4'-diphenylmethane diisocyanate was added and completely dissolved therein. Thereafter, 24.1 g of stearylamine and 341.7 g of the above mixed base oil were added thereto and stirred. After the mixture was retained at 100° C. for 60 minutes, the mixture was heated up to 120° C. and the reaction was terminated.

Thereafter, 10.0 g of amine antioxidant and 10.0 g of sulfonate anticorrosive were added to the mixture, and then milling and degassing processes were carried out to obtain a grease composition. The mass ratio of the generated thickeners, sodium N-octadecyl terephthalamate and diurea, was 75:25.

EXAMPLE E6

A grease composition was obtained completely in the same manner as described in Example E1 with the exception that pentaerythritol tetraester (kinematic viscosity at 40° C. of which was 70.3 mm$^2$/s) was used instead of dialkyl diphenyl ether.

The biodegradability of this grease composition was 93% according to the Coordinating European Council guideline CEC L-33-T-82, and so the obtained grease composition had excellent biodegradability.

EXAMPLE E7

A grease composition was obtained completely in the same manner as described in Example E2 with the exception that pentaerythritol tetraester (kinematic viscosity at 40° C. of which was 70.3 mm$^2$/s) was used instead of dialkyl diphenyl ether.

The biodegradability of this grease composition was 90% according to the CEC L-33-T-82, and so the obtained grease composition had excellent biodegradability.

EXAMPLE E8

A grease composition was obtained completely in the same manner as described in Example E3 with the exception that pentaerythritol tetraester (kinematic viscosity at 40° C. of which was 70.3 mm$^2$/s) was used instead of dialkyl diphenyl ether.

The biodegradability of this grease composition was 92% according to the CEC L-33-T-82, and so the obtained grease composition had excellent biodegradability.

COMPARATIVE EXAMPLE E1

To 500.0 g of dialkyl diphenyl ether (kinematic viscosity at 40° C. of which was 97.5 mm$^2$/s), 102.0 g of 4,4'-diphenylmethane diisocyanate was added and completely dissolved therein. Then, 88.0 g of cyclohexylamine and 290.0 g of dialkyl diphenyl ether were added thereto and stirred. After the mixture was retained at 100° C. for 60 minutes, the mixture was heated up to 150° C. and the reaction was terminated.

Thereafter, 10.0 g of amine antioxidant and 10.0 g of sulfonate anticorrosive were added to the mixture, and then milling and degassing processes were carried out to obtain a grease composition.

COMPARATIVE EXAMPLE E2

Methyl ester (85.7 g) of N-octadecyl terephthalamic acid was added to 500.0 g of dialkyl diphenyl ether (kinematic viscosity at 40° C. of which was 97.5 mm$^2$/s), and it was dissolved therein by heating to 130° C. Then, the mixture was cooled to 100° C. or lower, and 18.6 g of a 50% sodium hydroxide solution was added thereto. While fully stirring, the mixture was gradually heated to perform saponification.

After completion of the saponification, 385.0 g of dialkyl diphenyl ether was further added thereto at 150° C. and then the mixture was heated up to 200° C.

After cooling, 10.0 g of amine antioxidant and 10.0 g of sulfonate anticorrosive were added to the mixture, and then milling and degassing processes were carried out to obtain a grease composition.

COMPARATIVE EXAMPLE E3

Methyl ester (85.7 g) of N-octadecyl terephthalamic acid was added to 500.0 g of a paraffin mineral oil (kinematic viscosity at 40° C. of which was 100.2 mm²/s), and it was dissolved therein by heating to 130° C. Then, the mixture was cooled to 100° C. or lower, and 18.6 g of a 50% sodium hydroxide solution was added thereto. While fully stirring, the mixture was gradually heated to perform saponification.

After completion of the saponification, 385.0 g of a paraffin mineral oil was further added thereto at 150° C. and then the mixture was heated up to 200° C.

After cooling, 10.0 g of amine antioxidant and 10.0 g of sulfonate anticorrosive were added to the mixture, and then milling and degassing processes were carried out to obtain a grease composition.

COMPARATIVE EXAMPLES E4 TO E6

Three types of commercially available grease compositions were prepared. The grease composition in Comparative Example E4 comprised a urea compound as a thickener and dialkyl diphenyl ether as a base oil. The grease composition in Comparative Example E5 comprised a urea compound as a thickener and pentaerythritol tetraester as a base oil. The grease composition in Comparative Example E6 comprised sodium N-octadecyl terephthalamate as a thickener and pentaerythritol tetraester as a base oil.

With regard to these 14 types of grease compositions (Examples E1 to E8, and Comparative Examples E1 to E6), worked penetration, dropping point and oil separation percentage were determined (according to JIS K2220). The results are summarized in Tables 10 and 11.

The lubricating life of these grease compositions was also evaluated. The evaluation method will be explained below.

Each 5 g of 14 types of grease compositions was enclosed in a rolling bearing separately, and the bearing was then mounted to a tester which was similar to the bearing life tester ASTM D 1741 shown in FIG. 1. Thereafter, the rolling bearing was rotated at a rotation speed of 1,000 rpm under conditions of a temperature of 150° C., a radial load of 98 N and an axial load of 294 N, and lubricating life was defined as a time when the motor stopped due to overload or a time when the temperature of the bearing exceeded 160° C.

The configuration of the rolling bearing used in the test will be explained below, while referring to a partial longitudinal sectional view in FIG. 2.

This rolling bearing (Nominal No. 6306VV, inside diameter: 30 mm, outside diameter: 72 mm, width: 19 mm) is comprised of: an inner ring 1; an outer ring 2; a plurality of balls 3, which are disposed between the inner ring 1 and the outer ring 2 so as to flexibly roll therebetween; a cage 4 for retaining the plurality of balls 3 between the inner ring 1 and the outer ring 2; and noncontact rubber seals 5, 5.

The rubber seal 5 is attached to a seal groove 2a of the outer ring 2, and the seal covers almost the entire opening portion located between the outer outer surface of the inner ring 1 and the inner outer surface of the outer ring 2. A space portion, which is formed between the inner ring 1 and the outer ring 2 and in which the balls 3 were placed, is filled with a grease composition G, and the rubber seals 5, 5

TABLE 10

| | | Ex. E1 | Ex. E2 | Ex. E3 | Ex. E4 | Ex. E5 | Ex. E6 | Ex. E7 | Ex. E8 |
|---|---|---|---|---|---|---|---|---|---|
| Thickeners | Na N-octadecyl terephthalamate[1] | 50 | — | 25 | 50 | 75 | 50 | — | 50 |
| | Ba N-octadecyl terephthalamate[1] | — | 50 | — | — | — | — | 50 | — |
| | Diurea[1] | 50 | 50 | 75 | 50 | 25 | 50 | 50 | 50 |
| Worked penetration | | 268 | 275 | 270 | 273 | 272 | 279 | 278 | 285 |
| Dropping point (° C.) | | 260 or higher | 260 or higher | 260 or higher | 260 or higher | 260 or higher | 260 or higher | 260 or higher | 260 or higher |
| Oil separation[1] [2] | | 0.3 | 0.3 | 0.4 | 0.3 | 0.5 | 0.3 | 0.3 | 0.4 |
| Lubricating life (hr) | | 2326 | 2173 | 1926 | 2436 | 1815 | 1754 | 1567 | 1412 |

[1]The unit of figures is % by mass.
[2]Under conditions of 100° C. and 24 hour

TABLE 11

| | | Com. Ex. E1 | Com. Ex. E2 | Com. Ex. E3 | Com. Ex. E4 | Com. Ex. E5 | Com. Ex. E6 |
|---|---|---|---|---|---|---|---|
| Thickeners | Na N-octadecyl terephthalamate[1] | — | 100 | 100 | — | — | — |
| | Ba N-octadecyl terephthalamate[1] | — | — | — | — | — | — |
| | Diurea[1] | 100 | — | — | — | — | — |
| Worked penetration | | 270 | 285 | 283 | 281 | 276 | 283 |
| Dropping point (° C.) | | 260 or higher | 247 | 246 | 260 or higher | 260 or higher | 249 |
| Oil separation[1] [2] | | 0.3 | 12.3 | 13.1 | 0.4 | 0.3 | 16.5 |
| Lubricating life (hr) | | 1159 | 850 | 309 | 1034 | 688 | 521 |

[1]The unit of figures is % by mass.
[2]Under conditions of 100° C. and 24 hour

It is found that the grease compositions in Examples E1 to E8 are more excellent in their dropping point and oil separation percentage and have more excellent high-temperature performance, when compared with the grease compositions in Comparative Examples E2, E3 and E6 which comprise only sodium N-octadecyl terephthalamate as a thickener.

hermetically seal the grease composition in the bearing. This rubber seal 5 may also be a contact type.

The test results of lubricating life are shown in Tables 10 and 11. Each of the figures shown in the tables is an $L_{50}$ life, which was obtained by examining 10 test balls per one type of bearing and then using a Weibull distribution curve. The term "lubricating life" is not used herein to mean the rolling fatigue life of a bearing itself, but the term is herein used to mean the life of a grease when a bearing becomes not to rotate because of the deterioration of a grease composition or the like.

As understood from Tables 10 and 11, the grease compositions in Examples E1 to E8 had a lubricating life more excellent than that of the grease compositions in Comparative Examples E1 to E6, and further the grease compositions in Examples E1 to E8 had a longer life under a high-temperature environment.

(F) Grease Composition Comprising N-Substituted Terephthalamic Acid Metal Salt and Metallic Soap as Thickeners

EXAMPLE F1

Methyl ester (27.1 g) of N-octadecyl terephthalamic acid was added to 150.0 g of a paraffin mineral oil (kinematic viscosity at 40° C. of which was 120 mm$^2$/s), and it was dissolved therein by heating to 130° C. Thereafter, the mixture was cooled to 100° C. or lower, and 5.9 g of a 50% sodium hydroxide solution was added thereto. While fully stirring, the mixture was gradually heated to perform saponification.

After completion of the saponification, 150.0 g of a paraffin mineral oil was further added thereto at 150° C. and then the mixture was heated up to 200° C. Then, the mixture was cooled to 60° C., and 27.9 g of 12-hydroxystearic acid was added and completely dissolved therein. Thereafter, 4.5 g of a 50% lithium hydroxide solution and 132.5 g of a paraffin mineral oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 50:50.

EXAMPLE F2

Methyl ester (67.7 g) of N-octadecyl terephthalamic acid was added to 150.0 g of a diester oil (ditridecyl adipate, kinematic viscosity at 40° C. of which was 26.1 mm$^2$/s), and it was dissolved therein by heating to 130° C. Thereafter, the mixture was cooled to 100° C. or lower, and 14.7 g of a 50% sodium hydroxide solution was added thereto. While fully stirring, the mixture was gradually heated to perform saponification.

After completion of the saponification, 100.0 g of a diester oil was further added thereto at 150° C. and then the mixture was heated up to 200° C. Then, the mixture was cooled to 60° C., and 9.3 g of 12-hydroxystearic acid was added and completely dissolved therein. Thereafter, 1.5 g of a 50% lithium hydroxide solution and 155 g of a diester oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 88:12.

EXAMPLE F3

Methyl ester (67.7 g) of N-octadecyl terephthalamic acid was added to 150.0 g of a poly α-olefin oil (kinematic viscosity at 40° C. of which was 60 mm$^2$/s), and it was dissolved therein by heating to 130° C. Thereafter, the mixture was cooled to 100° C. or lower, and 14.6 g of a 50% sodium hydroxide solution was added thereto. While fully stirring, the mixture was gradually heated to perform saponification.

After completion of the saponification, 100.0 g of a poly α-olefin oil was further added thereto at 150° C. and then the mixture was heated up to 200° C. Then, the mixture was cooled to 60° C., and 46.3 g of 12-hydroxystearic acid was added and completely dissolved therein. Thereafter, 7.4 g of a 50% lithium hydroxide solution and 117.5 g of a poly α-olefin oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 67:33.

EXAMPLE F4

Methyl ester (22.6 g) of N-octadecyl terephthalamic acid was added to 150.0 g of a dialkyl diphenyl ether oil (kinematic viscosity at 40° C. of which was 97.5 mm$^2$/s), and it was dissolved therein by heating to 130° C. Thereafter, the mixture was cooled to 100° C. or lower, and 4.9 g of a 50% sodium hydroxide solution was added thereto. While fully stirring, the mixture was gradually heated to perform saponification.

After completion of the saponification, 100.0 g of a dialkyl diphenyl ether oil was further added thereto at 150° C. and then the mixture was heated up to 200° C. Then, the mixture was cooled to 60° C., and 37.0 g of 12-hydroxystearic acid was added and completely dissolved therein. Thereafter, 6.0 g of a 50% lithium hydroxide solution and 127.5 g of a dialkyl diphenyl ether oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 61:39.

EXAMPLE F5

A grease composition was obtained completely in the same manner as described in Example F4 with the exception that a pentaerythritol ester oil (kinematic viscosity at 40° C. of which was 34 mm$^2$/s) was used instead of a dialkyl diphenyl ether oil.

The biodegradability of this grease composition was 96% according to the Coordinating European Council guideline CEC L-33-T-82, and so the obtained grease composition had excellent biodegradability.

EXAMPLE F6

Methyl ester (18.0 g) of N-octadecyl terephthalamic acid was added to 150.0 g of a pentaerythritol ester oil (kinematic viscosity at 40° C. of which was 34 mm$^2$/s), and it was dissolved therein by heating to 130° C. Thereafter, the mixture was cooled to 100° C. or lower, and 3.9 g of a 50% sodium hydroxide solution was added thereto. While fully stirring, the mixture was gradually heated to perform saponification.

After completion of the saponification, 100.0 g of a pentaerythritol ester oil was further added thereto at 150° C. and then the mixture was heated up to 200° C. Then, the mixture was cooled to 60° C., and 32.4 g of 12-hydroxystearic acid was added and completely dissolved therein. Thereafter, 5.2 g of a 50% lithium hydroxide solution, 160.0 g of a pentaerythritol ester oil and 27.5 g of a paraffin mineral oil (kinematic viscosity at 40° C. of which was 120 mm$^2$/s) were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 36:64.

The biodegradability of this grease composition was 93% according to the Coordinating European Council guideline CEC L-33-T-82, and so the obtained grease composition had excellent biodegradability.

EXAMPLE F7

Methyl ester (45.1 g) of N-octadecyl terephthalamic acid was added to 150.0 g of a pentaerythritol ester oil (kinematic viscosity at 40° C. of which was 34 mm$^2$/s), and it was dissolved therein by heating to 130° C. Thereafter, the mixture was cooled to 100° C. or lower, and 9.8 g of a 50% sodium hydroxide solution was added thereto. While fully stirring, the mixture was gradually heated to perform saponification.

After completion of the saponification, 142.0 g of a pentaerythritol ester oil was further added thereto at 150° C. and then the mixture was heated up to 200° C. Then, the mixture was cooled to 60° C., and 23.2 g of 12-hydroxystearic acid was added and completely dissolved therein. Thereafter, 3.7 g of a 50% lithium hydroxide solution and 75.0 g of a diester oil (ditridecyl adipate, kinematic viscosity at 40° C. of which was 26.1 mm$^2$/s) were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 67:33.

The biodegradability of this grease composition was 82% according to the Coordinating European Council guideline CEC L-33-T-82, and so the obtained grease composition had excellent biodegradability.

COMPARATIVE EXAMPLE F1

To 200.0 g of a paraffin mineral oil (kinematic viscosity at 40° C. of which was 120 mm$^2$/s), 44.0 g of 12-hydroxystearic acid was added and completely dissolved therein. Thereafter, 7.0 g of a 50% lithium hydroxide solution and 245.0 g of a paraffin mineral oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition.

COMPARATIVE EXAMPLE F2

To 200.0 g of a paraffin mineral oil (kinematic viscosity at 40° C. of which was 120 mm$^2$/s), 54.2 g of the methyl ester of N-octadecyl terephthalamic acid was added and dissolved therein by heating to 130° C. Thereafter, the mixture was cooled to 100° C. or lower, and 11.7 g of a 50% sodium hydroxide solution was added thereto. While fully stirring, the mixture was gradually heated to perform saponification. After completion of the saponification, 232.5 g of a paraffin mineral oil was further added thereto at 150° C. and then the mixture was heated up to 200° C.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition.

COMPARATIVE EXAMPLE F3

To 150.0 g of a diester oil (ditridecyl adipate, kinematic viscosity at 40° C. of which was 26.1 mm$^2$/s), 117.3 g of the methyl ester of N-octadecyl terephthalamic acid was added and dissolved therein by heating to 130° C. Thereafter, the mixture was cooled to 100° C. or lower, and 25.4 g of a 50% sodium hydroxide solution was added thereto. While fully stirring, the mixture was gradually heated to perform saponification.

After completion of the saponification, 100.0 g of a diester oil was further added thereto at 150° C. and then the mixture was heated up to 200° C. Then, the mixture was cooled to 60° C., and 69.5 g of 12-hydroxystearic acid was added and completely dissolved therein. Thereafter, 11.1 g of a 50% lithium hydroxide solution and 37.5 g of a diester oil were added thereto and stirred. After the mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and lithium 12-hydroxystearate, was 63:37.

With regard to these 10 types of grease compositions (Examples F1 to F7, and Comparative Examples F1 to F3), worked penetration and dropping point were determined (according to JIS K2220). The results are summarized in Tables 12 and 13.

Moreover, the lubricating life of each of these grease compositions was also evaluated by the same method as described above (the rotation test using the tester shown in FIG. 1). The results are also shown in Tables 12 and 13. The test temperature was set at 120° C., and the life is defined as a time when a motor stopped due to overload or a time when the temperature of a bearing exceeded 130° C. The life of each grease composition is represented by a relative value where the life in Comparative Example F1 is defined as 1.

TABLE 12

|  |  | Ex. F1 | Ex. F2 | Ex. F3 | Ex. F4 | Ex. F5 |
|---|---|---|---|---|---|---|
| Thickeners | Na N-octadecyl terephthalamate[1] | 6 | 15 | 15 | 5 | 5 |
|  | Li 12-hydroxystearate[1] | 6 | 2 | 10 | 8 | 8 |
| Base oils | Paraffin mineral oil[1] | 86.5 | — | — | — | — |
|  | Pentaerythritol ester oil[1] | — | — | — | — | 85.5 |
|  | Diester oil[1] | — | 81.5 | — | — | — |
|  | Poly α-olefin oil[1] | — | — | 73.5 | — | — |
|  | Dialkyl diphenyl ether oil[1] | — | — | — | 85.5 | — |
| Additives | 2,6-di-t-butyl-p-cresol[1] | 0.5 | 0.5 | 0.5 | 0.5 | 0.5 |
|  | Phenyl-α-naphthylamine[1] | 0.5 | 0.5 | 0.5 | 0.5 | 0.5 |
|  | Sorbitan monooleate[1] | 0.5 | 0.5 | 0.5 | 0.5 | 0.5 |
| Worked penetration |  | 280 | 230 | 210 | 260 | 270 |
| Dropping point (° C.) |  | 200 | 220 | 240 | 230 | 230 |
| Lubricating life |  | 2.4 | 3.1 | 2.9 | 3.4 | 3.2 |

[1]The unit of figures is % by mass.

TABLE 13

|  |  | Ex. F6 | Ex. F7 | Com. Ex. F1 | Com. Ex. F2 | Com. Ex. F3 |
|---|---|---|---|---|---|---|
| Thickeners | Na N-octadecyl terephthalamate[1] | 4 | 10 | — | 12 | 26 |
|  | Li 12-hydroxystearate[1] | 7 | 5 | 9.5 | — | 15 |
| Base oils | Paraffin mineral oil[1] | 5.5 | — | 89 | 86.5 | — |
|  | Pentaerythritol ester oil[1] | 82 | 68.5 | — | — | — |
|  | Diester oil[1] | — | 15 | — | — | 57.5 |
|  | Poly α-olefin oil[1] | — | — | — | — | — |
|  | Dialkyl diphenyl ether oil[1] | — | — | — | — | — |
| Additives | 2,6-di-t-butyl-p-cresol[1] | 0.5 | 0.5 | 0.5 | 0.5 | 0.5 |
|  | Phenyl-α-naphthylamine[1] | 0.5 | 0.5 | 0.5 | 0.5 | 0.5 |
|  | Sorbitan monooleate[1] | 0.5 | 0.5 | 0.5 | 0.5 | 0.5 |
| Worked penetration |  | 290 | 240 | 280 | 265 | 180 |
| Dropping point (° C.) |  | 220 | 230 | 190 | 250 | 230 |
| Lubricating life (hr) |  | 2.6 | 3.2 | 1 | 1.4 | 1.5 |

[1]The unit of figures is % by mass.

As is clear from the tables, since the grease compositions in Examples F1 to F7 comprised both sodium N-octadecyl terephthalamate and lithium 12-hydroxystearate (a metallic soap) as thickeners, these grease compositions had an excellent lubricating life at a high temperature and were long-lived even under a high-temperature environment, when compared with the grease compositions in Comparative Examples F1 and F2 which comprised either one of the above thickeners. However, when a grease composition comprised an excessive amount of thickeners as shown in Comparative Example F3, the lubricating life of the grease composition was insufficient at a high temperature.

Moreover, as grease compositions in Examples F5 to F7, where the base oil comprised 80% or more by mass of a neopentyl-type polyol ester oil, the grease composition had excellent biodegradability, and where the base oil comprised 90% or more by mass of the above described oil, the grease composition had particularly excellent biodegradability.

(G) Grease Composition Comprising N-Substituted Terephthalamic Acid Metal Salt and Complex Metallic Soap as Thickeners

EXAMPLE G1

Methyl ester (27.1 g) of N-octadecyl terephthalamic acid was added to 150.0 g of a paraffin mineral oil (kinematic viscosity at 40° C. of which was 120 mm$^2$/s), and it was dissolved therein by heating to 130° C. Thereafter, the mixture was cooled to 100° C. or lower, and 5 g of a 50% sodium hydroxide solution was added thereto. While fully stirring, the mixture was gradually heated to perform saponification.

After completion of the saponification, 150.0 g of a paraffin mineral oil was further added thereto at 150° C. and then the mixture was heated up to 200° C. Then, the mixture was cooled to 60° C., and 20.9 g of 12-hydroxystearic acid was added and completely dissolved therein by heating the mixture to 90° C. Thereafter, 3.3 g of a 50% lithium hydroxide solution and 132.5 g of a paraffin mineral oil were added thereto and stirred. Thereafter, 6.7 g of azelaic acid was further added thereto, and while stirring, 3.4 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap (lithium 12-hydroxystearate and lithium azelate), was about 50:50.

EXAMPLE G2

Methyl ester (67.7 g) of N-octadecyl terephthalamic acid was added to 150.0 g of a diester oil (ditridecyl adipate, kinematic viscosity at 40° C. of which was 26.1 mm$^2$/s), and it was dissolved therein by heating to 130° C. Thereafter, the mixture was cooled to 100° C. or lower, and 12.6 g of a 50% sodium hydroxide solution was added thereto. While fully stirring, the mixture was gradually heated to perform saponification.

After completion of the saponification, 100.0 g of a diester oil was further added thereto at 150° C. and then the mixture was heated up to 200° C. Then, the mixture was cooled to 60° C., and 7.0 g of 12-hydroxystearic acid was added and completely dissolved therein by heating the mixture to 90° C. Thereafter, 1.1 g of a 50% lithium hydroxide solution and 125.0 g of a diester oil were added thereto and stirred. Thereafter, 2.2 g of azelaic acid was further added thereto, and while stirring, 1.1 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap, was 88:12.

EXAMPLE G3

Methyl ester (67.7 g) of N-octadecyl terephthalamic acid was added to 150.0 g of a poly α-olefin oil (kinematic viscosity at 40° C. of which was 60 mm$^2$/s), and it was dissolved therein by heating to 130° C. Thereafter, the mixture was cooled to 100° C. or lower, and 12.6 g of a 50% sodium hydroxide solution was added thereto. While fully stirring, the mixture was gradually heated to perform saponification.

After completion of the saponification, 100.0 g of a poly α-olefin oil was further added thereto at 150° C. and then the mixture was heated up to 200° C. Then, the mixture was cooled to 60° C., and 34.7 g of 12-hydroxystearic acid was added and completely dissolved therein by heating the mixture to 90° C. Thereafter, 5.5 g of a 50% lithium hydroxide solution and 94.5 g of a poly α-olefin oil were added thereto and stirred. Thereafter, 11.6 g of azelaic acid was further added thereto, and while stirring, 5.9 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap, was 60:40.

EXAMPLE G4

Methyl ester (22.6 g) of N-octadecyl terephthalamic acid was added to 150.0 g of a dialkyl diphenyl ether oil (kinematic viscosity at 40° C. of which was 97.5 mm$^2$/s), and it was dissolved therein by heating to 130° C. Thereafter, the mixture was cooled to 100° C. or lower, and 4.2 g of a 50% sodium hydroxide solution was added thereto. While fully stirring, the mixture was gradually heated to perform saponification.

After completion of the saponification, 100.0 g of a dialkyl diphenyl ether oil was further added thereto at 150° C. and then the mixture was heated up to 200° C. Then, the mixture was cooled to 60° C., and 27.8 g of 12-hydroxystearic acid was added and completely dissolved therein by heating the mixture to 90° C. Thereafter, 4.4 g of a 50% lithium hydroxide solution and 141.5 g of a dialkyl diphenyl ether oil were added thereto and stirred. Thereafter, 9.3 g of azelaic acid was further added thereto, and while stirring, 4.7 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap, was 37:63.

EXAMPLE G5

A grease composition was obtained completely in the same manner as described in Example G4 with the exception that a pentaerythritol ester oil (kinematic viscosity at 40° C. of which was 34 mm$^2$/s) was used instead of a dialkyl diphenyl ether oil.

The biodegradability of this grease composition was 96% according to the Coordinating European Council guideline CEC L-33-T-82, and so the obtained grease composition had excellent biodegradability.

EXAMPLE G6

Methyl ester (18.0 g) of N-octadecyl terephthalamic acid was added to 150.0 g of a pentaerythritol ester oil (kinematic viscosity at 40° C. of which was 34 mm$^2$/s), and it was dissolved therein by heating to 130° C. Thereafter, the mixture was cooled to 100° C. or lower, and 3.3 g of a 50% sodium hydroxide solution was added thereto. While fully stirring, the mixture was gradually heated to perform saponification.

After completion of the saponification, 100.0 g of a pentaerythritol ester oil was further added thereto at 150° C. and then the mixture was heated up to 200° C. Then, the mixture was cooled to 60° C., and 24.3 g of 12-hydroxystearic acid was added and completely dissolved therein by heating the mixture to 90° C. Thereafter, 3.9 g of a 50% lithium hydroxide solution, 160.0 g of a pentaerythritol ester oil and 27.5 g of a paraffin mineral oil (kinematic viscosity at 40° C. of which was 120 mm$^2$/s) were added thereto and stirred. Thereafter, 8.1 g of azelaic acid was further added thereto, and while stirring, 2.1 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap, was 50:50.

The biodegradability of this grease composition was 93% according to the Coordinating European Council guideline CEC L-33-T-82, and so the obtained grease composition had excellent biodegradability.

EXAMPLE G7

A grease composition was obtained completely in the same manner as described in Example G6 with the exception that the composition of a base oil was changed. That is to say, the ratio of a paraffin mineral oil was increased and thereby the content of a pentaerythritol ester oil was set at about 80% by mass based on the total mass of the base oil.

The biodegradability of this grease composition was 81% according to the Coordinating European Council guideline CEC L-33-T-82, and so the obtained grease composition had excellent biodegradability.

COMPARATIVE EXAMPLE G1

To 200.0 g of a paraffin mineral oil (kinematic viscosity at 40° C. of which was 120 mm$^2$/s), 33.0 g of 12-hydroxystearic acid was added and completely dissolved therein. Thereafter, 5.3 g of a 50% lithium hydroxide solution and 247.0 g of a paraffin mineral oil were added thereto and stirred.

Thereafter, 11 g of azelaic acid was further added thereto, and while stirring, 5.6 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition.

COMPARATIVE EXAMPLE G2

To 200.0 g of a paraffin mineral oil (kinematic viscosity at 40° C. of which was 120 mm$^2$/s), 54.2 g of the methyl ester of N-octadecyl terephthalamic acid was added and dissolved therein by heating to 130° C. Thereafter, the mixture was cooled to 100° C. or lower, and 11.5 g of a 50% sodium hydroxide solution was added thereto. While fully stirring, the mixture was gradually heated to perform saponification. After completion of the saponification, 232.5 g of a paraffin mineral oil was further added thereto at 150° C. and then the mixture was heated up to 200° C.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition.

COMPARATIVE EXAMPLE G3

To 100.0 g of a diester oil (ditridecyl adipate, kinematic viscosity at 40° C. of which was 26.1 mm$^2$/s), 104.0 g of the methyl ester of N-octadecyl terephthalamic acid was added and dissolved therein by heating to 130° C. Thereafter, the mixture was cooled to 100° C. or lower, and 18.6 g of a 50% sodium hydroxide solution was added thereto. While fully stirring, the mixture was gradually heated to perform saponification.

After completion of the saponification, 100.0 g of a diester oil was further added thereto at 150° C. and then the mixture was heated up to 200° C. Then, the mixture was cooled to 60° C., and 75.0 g of 12-hydroxystearic acid was added and completely dissolved therein. Thereafter, 11.5 g of a 50% lithium hydroxide solution and 65.8 g of a diester oil were added thereto and stirred. Thereafter, 26.5 g of azelaic acid was further added thereto, and while stirring, 12.2 g of a 50% lithium hydroxide solution was dropped therein so as to obtain a lithium complex soap. After the obtained mixture was retained at 100° C. for 60 minutes, the mixture was heated up to 200° C. and the reaction was terminated.

Thereafter, 2.5 g of 2,6-di-t-butyl-p-cresol, 2.5 g of phenyl-α-naphthylamine and 2.5 g of sorbitan monooleate were added as additives to the mixture, and then milling and degassing processes were carried out to obtain a grease composition. The mass ratio of the generated thickeners, sodium N-octadecyl terephthalamate and a lithium complex soap, was 50:50.

With regard to these 10 types of grease compositions (Examples G1 to G7, and Comparative Examples G1 to G3), worked penetration and dropping point were determined (according to JIS K2220). Moreover, according to a test method described in JIS K2220 5.7, after the grease compositions were left in a 150° C. atmosphere for 24 hours, the oil separation percentage of each of the grease compositions was determined. These results are summarized in Tables 14 and 15.

Furthermore, the lubricating life of each of these grease compositions was also evaluated by the same method as described above (the rotation test using the tester shown in FIG. 1). The results are also shown in Tables 14 and 15. The test temperature was set at 140° C., and the life is defined as a time when the motor stopped due to overload or a time when the temperature of the bearing exceeded 150° C. The life of each grease composition is represented by a relative value where the life in Comparative Example G1 is defined as 1.

TABLE 14

|  |  | Ex. G1 | Ex. G2 | Ex. G3 | Ex. G4 | Ex. G5 |
| --- | --- | --- | --- | --- | --- | --- |
| Thickeners | Na N-octadecyl terephthalamate[1] | 5.6 | 15 | 15 | 5 | 5 |
|  | Li 12-hydroxystearate[1] | 4.3 | 1.5 | 7.6 | 6.2 | 6.2 |
|  | Li azelate[1] | 1.4 | 0.5 | 2.6 | 2.2 | 2.2 |
| Base oils | Paraffin mineral oil[1] | 87.2 | — | — | — | — |
|  | Pentaerythritol ester oil[1] | — | — | — | — | 85 |
|  | Diester oil[1] | — | 81.4 | — | — | — |
|  | Poly α-olefin oil[1] | — | — | 73.5 | — | — |
|  | Dialkyl diphenyl ether oil[1] | — | — | — | 85 | — |

TABLE 14-continued

|  |  | Ex. G1 | Ex. G2 | Ex. G3 | Ex. G4 | Ex. G5 |
|---|---|---|---|---|---|---|
| Additives | 2,6-di-t-butyl-p-cresol[1) | 0.5 | 0.5 | 0.5 | 0.5 | 0.5 |
|  | Phenyl-α-naphthylamine[1) | 0.5 | 0.5 | 0.5 | 0.5 | 0.5 |
|  | Sorbitan monooleate[1) | 0.5 | 0.5 | 0.5 | 0.5 | 0.5 |
| Worked penetration | | 285 | 230 | 204 | 255 | 266 |
| Dropping point (° C.) | | 250 or higher | 250 or higher | 250 or higher | 250 or higher | 250 or higher |
| Oil separation[2) (%) | | 3.8 | 3.1 | 2.9 | 3.4 | 3.2 |
| Lubricating life | | 2.4 | 3.1 | 2.9 | 3.4 | 3.2 |

[1)The unit of figures is % by mass.
[2)Under conditions of 150° C. and 24 hour

TABLE 15

|  |  | Ex. G6 | Ex. G7 | Com. Ex. G1 | Com. Ex. G2 | Com. Ex. G3 |
|---|---|---|---|---|---|---|
| Thickeners | Na N-octadecyl terephthalamate[1) | 3.7 | 3.7 | — | 11.6 | 22.7 |
|  | Li 12-hydroxystearate[1) | 5 | 5 | 6.8 | — | 16.2 |
|  | Li azelate[1) | 1.7 | 1.7 | 2.3 | — | 6.5 |
| Base oils | Paraffin mineral oil[1) | 5.5 | 17.8 | 89.4 | 86.9 | — |
|  | Pentaerythritol ester oil[1) | 82.5 | 70.3 | — | — | — |
|  | Diester oil[1) | — | — | — | — | 53.1 |
|  | Poly α-olefin oil[1) | — | — | — | — | — |
|  | Dialkyl diphenyl ether oil[1) | — | — | — | — | — |
| Additives | 2,6-di-t-butyl-p-cresol[1) | 0.5 | 0.5 | 0.5 | 0.5 | 0.5 |
|  | Phenyl-α-naphthylamine[1) | 0.5 | 0.5 | 0.5 | 0.5 | 0.5 |
|  | Sorbitan monooleate[1) | 0.5 | 0.5 | 0.5 | 0.5 | 0.5 |
| Worked penetration | | 289 | 295 | 280 | 265 | 150 |
| Dropping point (° C.) | | 250 or higher | 250 or higher | 250 or higher | 250 | 250 or higher |
| Oil separation[2) (%) | | 3.9 | 3.9 | 3.3 | 5.2 | 1.9 |
| Lubricating life | | 2.8 | 2.7 | 1 | 1.2 | 1.5 |

[1)The unit of figures is % by mass.
[2)Under conditions of 150° C. and 24 hour

As is clear from the tables, since the grease compositions in Examples G1 to G7 comprised both sodium N-octadecyl terephthalamate and a lithium complex soap (a complex metallic soap) as thickeners, these grease compositions had an excellent lubricating life at a high temperature and were long-lived even under a high-temperature environment, when compared with the grease compositions in Comparative Examples G1 and G2 which comprised either one of the above thickeners. However, when a grease composition comprised an excessive amount of thickeners as shown in Comparative Example G3, the grease composition got hardened and the oil separation percentage became small, and therefore the lubricating life of the grease composition was insufficient at a high temperature.

Moreover, as grease compositions in Examples G5 to G7, where the base oil comprised 80% or more by mass of a neopentyl-type polyol ester oil, the grease composition had excellent biodegradability, and where the base oil comprised 90% or more by mass of the above described oil, the grease composition had particularly excellent biodegradability.

(H) Grease Composition Comprising Polyurea and Metallic Soap as Thickeners

EXAMPLE H1

Firstly, a metallic soap was synthesized in a base oil as follows. To 417.1 g of pentaerythritol tetraester having a kinematic viscosity at 40° C. of 88.9 mm²/s, 63.4 g of stearic acid was added and completely dissolved therein, and then 19.0 g of a 50% lithium hydroxide solution was added and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 24.0 g of 4,4'-diphenylmethane diisocyanate was added and completely dissolved therein, 48.9 g of stearylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H2

Firstly, a metallic soap was synthesized in a base oil as follows. To 417.1 g of pentaerythritol tetraester having a kinematic viscosity at 40° C. of 88.9 mm²/s, 95.0 g of stearic acid was added and completely dissolved therein, and then 28.6 g of a 50% lithium hydroxide solution was added and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 12.0 g of 4,4'-diphenylmethane diisocyanate was added and completely dissolved therein, 24.5 g of stearylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 25:75.

EXAMPLE H3

Firstly, a metallic soap was synthesized in a base oil as follows. To 417.1 g of pentaerythritol tetraester having a kinematic viscosity at 40° C. of 88.9 mm$^2$/s, 31.7 g of stearic acid was added and completely dissolved therein, and then 9.4 g of a 50% lithium hydroxide solution was added and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 36.0 g of 4,4'-diphenylmethane diisocyanate was added and completely dissolved therein, 73.4 g of stearylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 75:25.

EXAMPLE H4

Firstly, a metallic soap was synthesized in a base oil as follows. To 417.1 g of pentaerythritol tetraester having a kinematic viscosity at 40° C. of 88.9 mm$^2$/s, 63.4 g of stearic acid was added and completely dissolved therein, and then 19.0 g of a 50% lithium hydroxide solution was added and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 35.9 g of 4,4'-diphenylmethane diisocyanate was added and completely dissolved therein, 37.0 g of octylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H5

Firstly, a metallic soap was synthesized in a base oil as follows. To 417.1 g of pentaerythritol tetraester having a kinematic viscosity at 40° C. of 88.9 mm$^2$/s, 63.4 g of 12-hydroxystearic acid was added and completely dissolved therein, and then 19.0 g of a 50% lithium hydroxide solution was added and stirred. After the mixture was retained at 100° C. for 60 minutes, the mixture was heated up to 200° C. and then the generation reaction of lithium 12-hydroxystearate was terminated.

Secondly, diurea was synthesized in a base oil as follows. The mixture obtained by the above operations was cooled to 60° C., and after 23.1 g of 4,4'-diphenylmethane diisocyanate was added and completely dissolved therein, 49.8 g of octadecylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H6

Firstly, a metallic soap was synthesized in a base oil as follows. To 417.1 g of pentaerythritol tetraester having a kinematic viscosity at 40° C. of 88.9 mm$^2$/s, 64.9 g of the mixture of stearic acid and 12-hydroxystearic acid (the mixing ratio was 50:50 at a mass ratio) was added and completely dissolved therein. Then, 16.0 g of a 50% lithium hydroxide solution was added thereto and stirred. After the mixture was retained at 100° C. for 60 minutes, the mixture was heated up to 200° C. and then the generation reaction of a calcium soap was terminated.

Secondly, diurea was synthesized in a base oil as follows. The mixture obtained by the above operations was cooled to 60° C., and after 24.0 g of 4,4'-diphenylmethane diisocyanate was added and completely dissolved therein, 48.9 g of stearylamine and 417.1 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a calcium soap, was 50:50.

EXAMPLE H7

Firstly, a metallic soap was synthesized in a base oil as follows. Stearic acid (66.8 g) was added and completely dissolved in 413.2 g of a mixed base oil having a kinematic viscosity at 40° C. of 53.2 mm$^2$/s (which was the mixed base oil of a diester oil and pentaerythritol tetraester, wherein the mixing ratio was 50:50 at a mass ratio). Then, 20.0 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 25.3 g of 4,4'-diphenylmethane diisocyanate was added and completely dissolved therein, 51.5 g of stearylamine and 413.2 g of the above mixed base oil were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H8

Firstly, a metallic soap was synthesized in a base oil as follows. Stearic acid (60.7 g) was added and completely dissolved in 420.4 g of a mixed base oil having a kinematic viscosity at 40° C. of 142 mm$^2$/s (which was the mixed base oil of a diester oil and pentaerythritol tetraester, wherein the mixing ratio was 25:75 at a mass ratio). Then, 18.2 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 23.0 g of 4,4'-diphenylmethane diisocyanate was added and completely dissolved therein, 46.8 g of stearylamine and 420.4 g of the above mixed base oil were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H9

Firstly, a metallic soap was synthesized in a base oil as follows. To 409.8 g of pentaerythritol tetraester having a kinematic viscosity at 40° C. of 88.9 mm$^2$/s, 69.7 g of stearic acid was added and completely dissolved therein, and then 21.0 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 26.4 g of 4,4'-diphenylmethane diisocyanate was added and completely dissolved therein, 53.8 g of stearylamine and 409.8 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H10

Firstly, a metallic soap was synthesized in a base oil as follows. To 424.4 g of pentaerythritol tetraester having a kinematic viscosity at 40° C. of 88.9 mm$^2$/s, 57.1 g of stearic acid was added and completely dissolved therein, and then 17.0 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 21.6 g of 4,4'-diphenylmethane diisocyanate was added and completely dissolved therein, 44.0 g of stearylamine and 424.4 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H11

Firstly, a metallic soap was synthesized in a base oil as follows. To 417.1 g of a poly α-olefin oil having a kinematic viscosity at 40° C. of 100.3 mm$^2$/s, 63.4 g of stearic acid was added and completely dissolved therein, and then 19.0 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 24.0 g of 4,4'-diphenylmethane diisocyanate was added and completely dissolved therein, 48.9 g of stearylamine and 417.1 g of a poly α-olefin oil were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

EXAMPLE H12

Firstly, a metallic soap was synthesized in a base oil as follows. To 431.7 g of pentaerythritol tetraester having a kinematic viscosity at 40° C. of 88.9 mm$^2$/s, 50.7 g of stearic acid was added and completely dissolved therein, and then 15.2 g of a 50% lithium hydroxide solution was added thereto and stirred. After the mixture was retained at 100° C. for 60 minutes, the mixture was heated up to 200° C. and then the generation reaction of lithium stearate was terminated.

Secondly, diurea was synthesized in a base oil as follows. The mixture obtained by the above operations was cooled to 60° C., and after 19.2 g of 4,4'-diphenylmethane diisocyanate was added and completely dissolved therein, 39.1 g of stearylamine and 431.7 g of pentaerythritol tetraester were added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition. The mass ratio of the generated thickeners, diurea and a lithium soap, was 50:50.

COMPARATIVE EXAMPLE H1

A metallic soap was synthesized in a base oil as follows. To 865.0 g of pentaerythritol tetraester having a kinematic viscosity at 40° C. of 88.9 mm$^2$/s, 100 g of stearic acid was added and completely dissolved therein, and then 30.0 g of a 50% lithium hydroxide solution was added thereto and stirred. After the mixture was retained at 100° C. for 60 minutes, the mixture was heated up to 200° C. and then the generation reaction of lithium stearate was terminated.

Thereafter, 10 g of amine antioxidant and 10 g of sulfonate anticorrosive were added to the mixture, and then milling and degassing processes were carried out to obtain a grease composition.

COMPARATIVE EXAMPLE H2

Diurea was synthesized in a base oil as follows. To 870 g of pentaerythritol tetraester having a kinematic viscosity at 40° C. of 88.9 mm$^2$/s, 36.2 g of 4,4'-diphenylmethane diisocyanate was added and completely dissolved therein, and then 73.8 g of stearylamine was added thereto and stirred. After the mixture was retained at 100° C. for 60 minutes, the mixture was heated up to 150° C. and then the generation reaction of diurea was terminated.

Thereafter, 10 g of amine antioxidant and 10 g of sulfonate anticorrosive were added to the mixture, and then milling and degassing processes were carried out to obtain a grease composition.

COMPARATIVE EXAMPLES H3 AND H4

Two types of commercially available grease compositions were prepared. The grease composition in Comparative Example H3 comprised a lithium soap as a thickener, and a mixed oil of a diester oil and pentaerythritol tetraester as a base oil. The grease composition in Comparative Example H4 comprised a urea compound as a thickener and pentaerythritol tetraester as a base oil.

With regard to these 16 types of grease compositions (Examples H1 to H12, and Comparative Examples H1 to H4), worked penetration and dropping point were determined (according to JIS K2220). The results as well as the composition of each grease composition are shown in Tables 16 to 19.

In each of the tables, each figure in the column of "Type of thickeners" indicates the mass ratio of each component when the total mass of the thickeners is set at 100. Likewise, each figure in the column of "Type of base oils" indicates the mass ratio of each component when the total mass of the base oils is set at 100. Each figure in the column of "Amount of thickeners" indicates the mass ratio (unit: % by mass) of the thickeners when the total mass of a grease composition is set at 100.

Moreover, diurea A in each table means a urea compound obtained by reacting 4,4'-diphenylmethane diisocyanate with stearylamine at a mole ratio of 1:2. Furthermore, diurea B means a urea compound obtained by reacting 4,4'-diphenylmethane diisocyanate with octylamine at a mole ratio of 1:2.

TABLE 16

| | | Ex. H1 | Ex. H2 | Ex. H3 | Ex. H4 |
|---|---|---|---|---|---|
| Type of thickeners | Lithium stearate | 50 | 75 | 25 | 50 |
| | Lithium 12-hydroxystearate | — | — | — | — |
| | Diurea A | 50 | 25 | 75 | — |
| | Diurea B | — | — | — | 50 |
| Amount of thickeners (% by mass) | | 14.6 | 14.6 | 14.6 | 14.6 |
| Type of base oils | Pentaerythritol tetraester | 100 | 100 | 100 | 100 |
| | Diester oil | — | — | — | — |
| | Poly α-olefin oil | — | — | — | — |
| Worked penetration | | 221 | 219 | 218 | 220 |
| Dropping point (° C.) | | 248 | 232 | 260 or higher | 249 |

TABLE 16-continued

| | | Ex. H1 | Ex. H2 | Ex. H3 | Ex. H4 |
|---|---|---|---|---|---|
| Amount of dusts generated in the early stage of rotation[1] | 25° C. | 650 | 800 | 550 | 600 |
| | 70° C. | 3200 | 4250 | 2850 | 3300 |
| Acoustic performance in the early stage of rotation | | ○ | ○ | ○ | ○ |
| Torque value in the early stage of rotation | | ○ | ○ | ○ | ○ |
| Durability (hr) | | >3000 | >3000 | >3000 | >3000 |
| Amount of dusts generated after durability test[1] | | 4550 | 5750 | 3800 | 4300 |

[1]Unit: dusts/283 cm$^3$

TABLE 17

| | | Ex. H5 | Ex. H6 | Ex. H7 | Ex. H8 |
|---|---|---|---|---|---|
| Type of thickeners | Lithium stearate | — | — | 50 | 50 |
| | Calcium stearate | — | 25 | — | — |
| | Lithium 12-hydroxystearate | 50 | — | — | — |
| | Calcium 12-hydroxystearate | — | 25 | — | — |
| | Diurea A | — | 50 | 50 | 50 |
| | Diurea B | 50 | — | — | — |
| Amount of thickeners (% by mass) | | 14.6 | 14.6 | 15.4 | 14.0 |
| Type of base oils | Pentaerythritol tetraester | 100 | 100 | 50 | 75 |
| | Diester oil | — | — | 50 | 25 |
| | Poly α-olefin oil | — | — | — | — |
| Worked penetration | | 216 | 210 | 206 | 235 |
| Dropping point (° C.) | | 245 | 217 | 250 | 249 |
| Amount of dusts generated in the early stage of rotation[1] | 25° C. | 550 | 700 | 650 | 600 |
| | 70° C. | 3450 | 2900 | 2850 | 2600 |
| Acoustic performance in the early stage of rotation | | ○ | ○ | ○ | ○ |
| Torque value in the early stage of rotation | | ○ | ○ | ○ | ○ |
| Durability (hr) | | >3000 | >3000 | >3000 | >3000 |
| Amount of dusts generated after durability test[1] | | 4600 | 3950 | 3600 | 4050 |

[1]Unit: dusts/283 cm$^3$

TABLE 18

| | | Ex. H9 | Ex. H10 | Ex. H11 | Ex. H12 |
|---|---|---|---|---|---|
| Type of thickeners | Lithium stearate | 50 | 50 | 50 | 50 |
| | Lithium 12-hydroxystearate | — | — | — | — |
| | Diurea A | 50 | 50 | 50 | 50 |
| | Diurea B | — | — | — | — |
| Amount of thickeners (% by mass) | | 16.0 | 13.1 | 14.6 | 11.7 |
| Type of base oils | Pentaerythritol tetraester | 100 | 100 | — | 100 |
| | Diester oil | — | — | — | — |
| | Poly α-olefin oil | — | — | 100 | — |
| Worked penetration | | 198 | 237 | 223 | 275 |
| Dropping point (° C.) | | 246 | 247 | 245 | 248 |
| Amount of dusts generated in the early stage of rotation[1] | 25° C. | 600 | 600 | 150 | 3500 |
| | 70° C. | 2800 | 3100 | 1200 | 12000 |
| Acoustic performance in the early stage of rotation | | ○ | ○ | ○ | ○ |
| Torque value in the early stage of rotation | | ○ | ○ | ○ | ○ |
| Durability (hr) | | >3000 | >3000 | 1000 | >3000 |
| Amount of dusts generated after durability test[1] | | 4850 | 4550 | 28000 | 26000 |

[1]Unit: dusts/283 cm$^3$

TABLE 19

|  |  | Com. Ex. H1 | Com. Ex. H2 | Com. Ex. H3 | Com. Ex. H4 |
|---|---|---|---|---|---|
| Type of thickeners | Lithium stearate | 100 | — | — | — |
|  | Lithium 12-hydroxystearate | — | — | — | — |
|  | Diurea A | — | 100 | — | — |
|  | Diurea B | — | — | — | — |
| Amount of thickeners (% by mass) |  | 11.5 | 11.0 | — | — |
| Type of base oils | Pentaerythritol tetraester | 100 | 100 | — | — |
|  | Diester oil | — | — | — | — |
|  | Poly α-olefin oil | — | — | — | — |
| Worked penetration |  | 224 | 217 | 240 | 234 |
| Dropping point (° C.) |  | 197 | 260 or higher | 192 | 260 or higher |
| Amount of dusts generated in the early stage of rotation[1)] | 25° C. | 2400 | 650 | 3000 | 600 |
|  | 70° C. | 9000 | 3300 | 10000 | 3200 |
| Acoustic performance in the early stage of rotation |  | ○ | X | ○ | X |
| Torque value in the early stage of rotation |  | ○ | ○ | ○ | ○ |
| Durability (hr) |  | >3000 | — | >3000 | — |
| Amount of dusts generated after durability test[1)] |  | 23000 | — | 24000 | — |

[1)]Unit: dusts/283 cm$^3$

A rolling bearing, which was filled with each of these grease compositions, was prepared, and the acoustic performance, torque performance, durability and the amount of dusts generated from the grease composition were evaluated.

Figure 6:
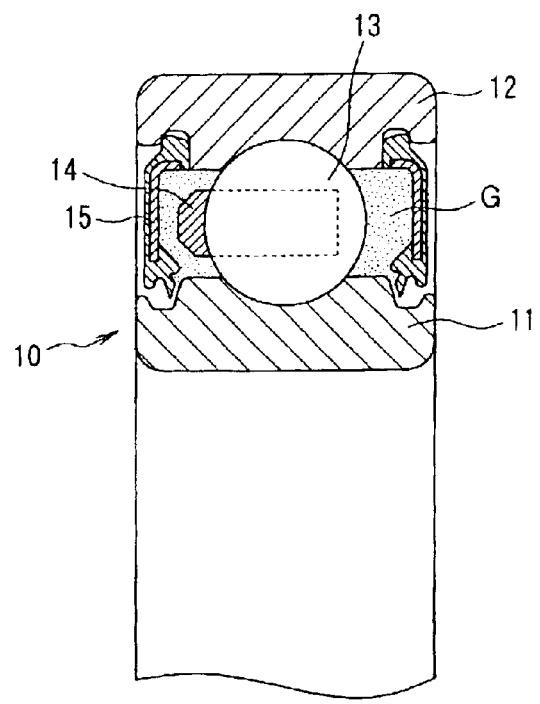
FIG. 6 is a partial longitudinal sectional view showing the configuration of a deep groove ball bearing, which is one embodiment of the rolling apparatus of the present invention.

The used rolling bearing was a single-row deep groove ball bearing 10 (inside diameter: 5 mm, outside diameter: 13 mm, width: 4 mm) completely defatted by organic solvent, and this rolling bearing was comprised of: an inner ring 11; an outer ring 12; a plurality of balls 13, which were disposed between the inner ring 11 and the outer ring 12 to flexibly roll therebetween; a cage 14 for retaining the plurality of balls 13 between the inner ring 11 and the outer ring 12; and noncontact rubber seals 15, 15 (refer to FIG. 6). A space portion, which was formed between the inner ring 11 and the outer ring 12 and in which the balls 13 were placed, was filled with 19 mg of a grease composition G, and the rubber seals 15, 15 hermetically sealed the grease composition in the bearing.

Next, the methods for evaluating the above various performances will be explained.

[Method for Evaluating the Amount of Dusts Generated from Grease Composition]

Figure 7:
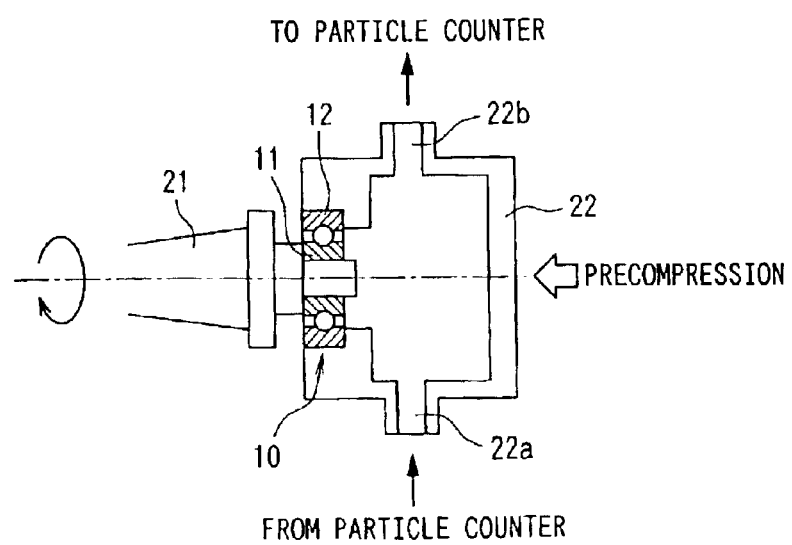
FIG. 7 is a schematic diagram showing the configuration of an apparatus for evaluating the amount of dusts generated from a bearing.

As shown in FIG. 7, the inner ring 11 of the ball bearing 10 was mounted on a rotation axis 21, and the outer ring 12 was mounted on a container 22. The container 22 comprised an air introduction port 22a and an air discharge port 22b, and clean air was flown into the container 22 through the air introduction port 22a, and then the air was flown out of the container 22 through the air discharge port 22b.

When the rotation axis 21 was rotated by a motor which is not shown in the figure and the ball bearing 10 was thereby rotated, dusts were generated from the grease composition G contained in the ball bearing 10, and the particles of the grease composition were dispersed in the container 22. These particles were flown out of the container 22 by the air which was flown in through the air introduction port 22a, and then the particles were transported to a particle counter which is not shown in the figure. Thereafter, the number of particles having a particle size of 0.3 or greater which were contained in 0.01 cubic feet (283 cm$^3$) of the air, was counted by this particle counter.

The ball bearing 10 was mounted on the container 22 under the condition where a preload of 14.7 N was loaded. Moreover, the rotation speed of the ball bearing 10 was set at 3,600 min$^{-1}$. Under these conditions, the amount of dusts generated was counted both at 25° C. and at 70° C. for 20 minutes.

Thus, the amount of dusts generated in the early stage of rotation of a ball bearing, which was counted as above, is also shown in Tables 16 to 19.

[Method for Evaluating Acoustic Performance]

The acoustic performance of the ball bearing 10 in the early stage of rotation (the rotation speed was 1,800 min$^{-1}$) was evaluated using an Anderon Meter. The results are also shown in Tables 16 to 19. In each table, when the Anderon value is 2 or less, it is evaluated as satisfactory and shown with the mark ○, and when the Anderon value is more than 2, it is evaluated as unsatisfactory and shown with the mark X.

[Method for Evaluating Torque Performance]

Figure 8:
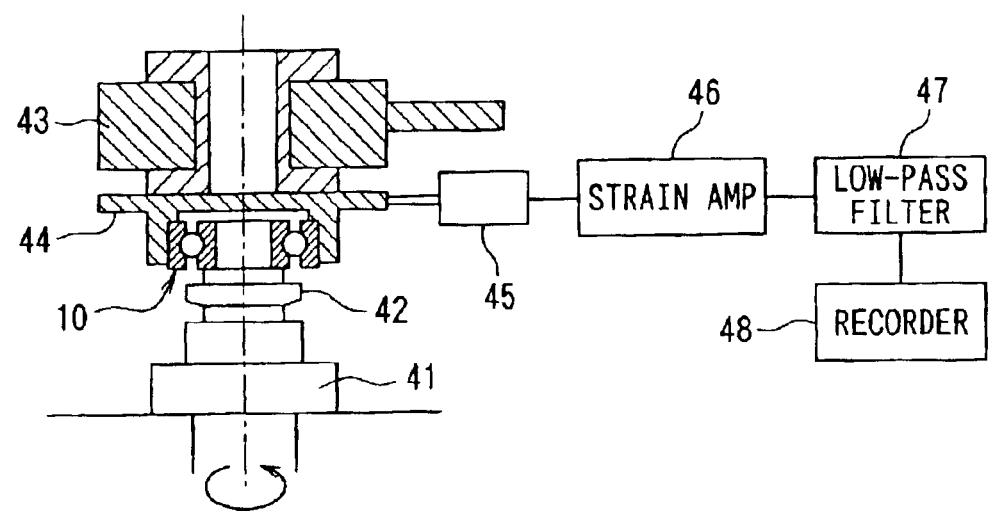
FIG. 8 is a schematic diagram showing the configuration of a torque measuring apparatus.

Using a torque measuring device shown in FIG. 8, the torque value of the ball bearing 10 was determined in the early stage of rotation. The inner ring of the ball bearing 10 was fixed to an air spindle 41 via an arbor 42, and the outer ring was fixed to an aluminum cap 44 which was equipped with an air bearing 43. The air spindle 41 was rotated at a rotation speed of 3,600 min$^{-1}$ at a room temperature so as to rotate the inner ring of the ball bearing 10. At the time when the torque value was almost stabilized (about 10 minutes later), the torque value was determined by a strain gauge 45 which was connected to the aluminum cap 44. The obtained value was recorded by a recorder 48 via a strain amp 46 and a low-pass filter 47.

The obtained results are also shown in Tables 16 to 19. In each table, when the torque value is 29.4 N·cm or less, it is evaluated as satisfactory and shown with the mark ○, and when the torque value is more than 29.4 N·cm, it is evaluated as unsatisfactory and shown with the mark X.

[Method for Evaluating Durability]

Figure 9:
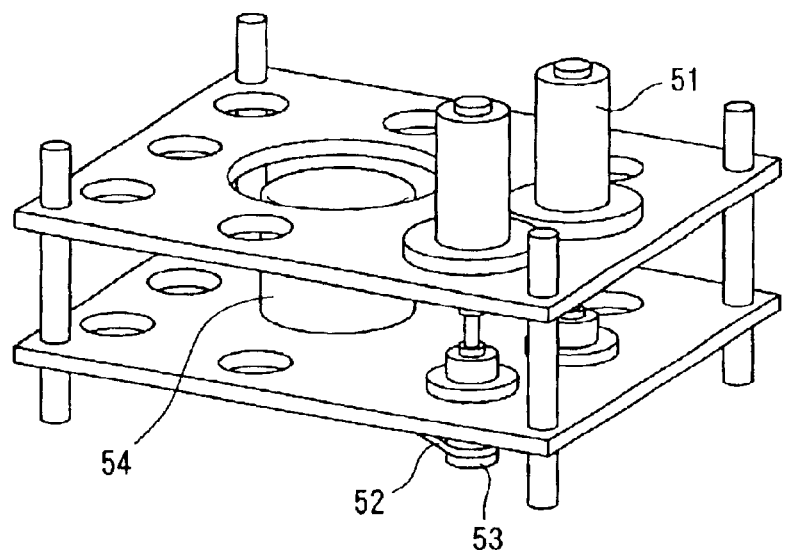
FIG. 9 is an oblique perspective view of a continuous rotator for evaluating the durability of a bearing.
Figure 10:
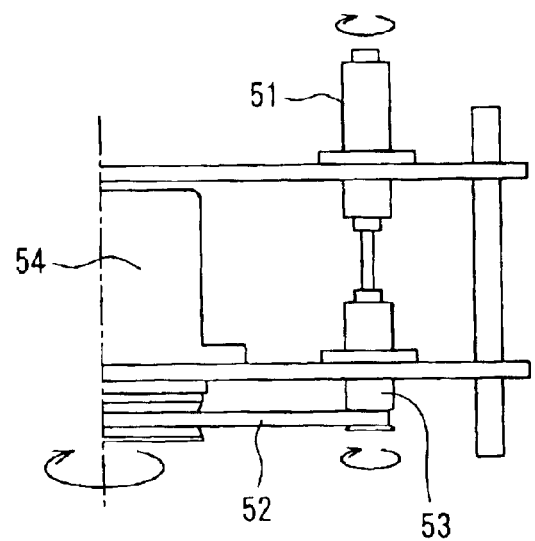
FIG. 10 is a partial front view of the continuous rotator in FIG. 9.

The ball bearing 10 (not shown) was mounted in the housing 51 of a continuous rotator having a configuration shown in the oblique perspective view of FIG. 9 and the partial front view of FIG. 10, and rotated by a motor 54 via a rubber belt 52 and a pulley 53. The rotation speed was 3,600 min$^{-1}$ and the test temperature was 70° C. The Anderon value of the ball bearing 10 was determined using an Anderon Meter every 500 hours of rotation, and the life was defined as a time when the Anderon value exceeded 2. However, where the Anderon value did not exceed 2 even after 3,000 hours, the test was terminated.

As well as the evaluation of durability, the evaluation of the amount of dusts generated from a grease composition was also carried out. That is, the amount of dusts generated from a grease composition at the time of the completion of the durability test (after rotation at a high temperature for a long time) was determined by the same method as described above.

The evaluation results of the durability and the amount of dusts generated from a grease composition after rotation at a high temperature for a long time are also shown in Tables 16 to 19. Where ">3,000" which is described in the column of durability means that the durability test was terminated after 3,000 hours of rotation.

Now, the results of each test will be considered. As apparent from Tables 16 to 19, the grease compositions in Examples H1 to H10 generated a small amount of dusts in the early stage of rotation both at an ordinary temperature and at a high temperature, and even when the grease compositions were subjected to rotation at a high temperature for a long time, the amount of dusts generated was not significantly increased. Further, their acoustic performance and torque value were excellent in the early stage of rotation, and also their durability was extremely excellent.

In contrast, since the grease composition in Comparative Example H1 did not contain polyurea as a thickener, the high-temperature performance was insufficient, and the grease composition generated a large amount of dusts at a high temperature in the early stage of rotation. Moreover, when the grease composition was subjected to rotation at a high temperature for a long time, the amount of dusts generated was significantly increased.

Since the grease composition in Comparative Example H2 did not contain a metallic soap as a thickener, the acoustic performance was unsatisfactory in the early stage of rotation.

The grease composition in Example H11 was good regarding the amount of dusts generated, the acoustic performance and the torque value in the early stage of rotation, but since the grease composition comprised a poly α-olefin oil as a base oil, the durability was somewhat lower than that of the grease compositions in Examples H1 to H10, and when the grease composition was rotated at a high temperature for a long time, it generated a large amount of dusts.

The grease composition in Example H12 was good regarding the acoustic performance and the torque value in the early stage of rotation, and the durability. However, since this grease composition had large worked penetration, it generated a large amount of dusts in the early stage of rotation both at an ordinary temperature and at a high temperature when compared with those in Examples H1 to H10, and when the grease composition was rotated at a high temperature for a long time, the amount of dusts generated therefrom was significantly increased.

Next, the ratio between polyurea and a metallic soap in a thickener was studied. That is, various ratios were set between polyurea and a metallic soap in the grease composition in Example H1, so that various grease compositions were prepared. Then, the amount of dusts generated in the early stage of rotation and the durability at 70° C. were evaluated by the same method as described above. The results are shown in a graph in FIG. 11.

Figure 11:
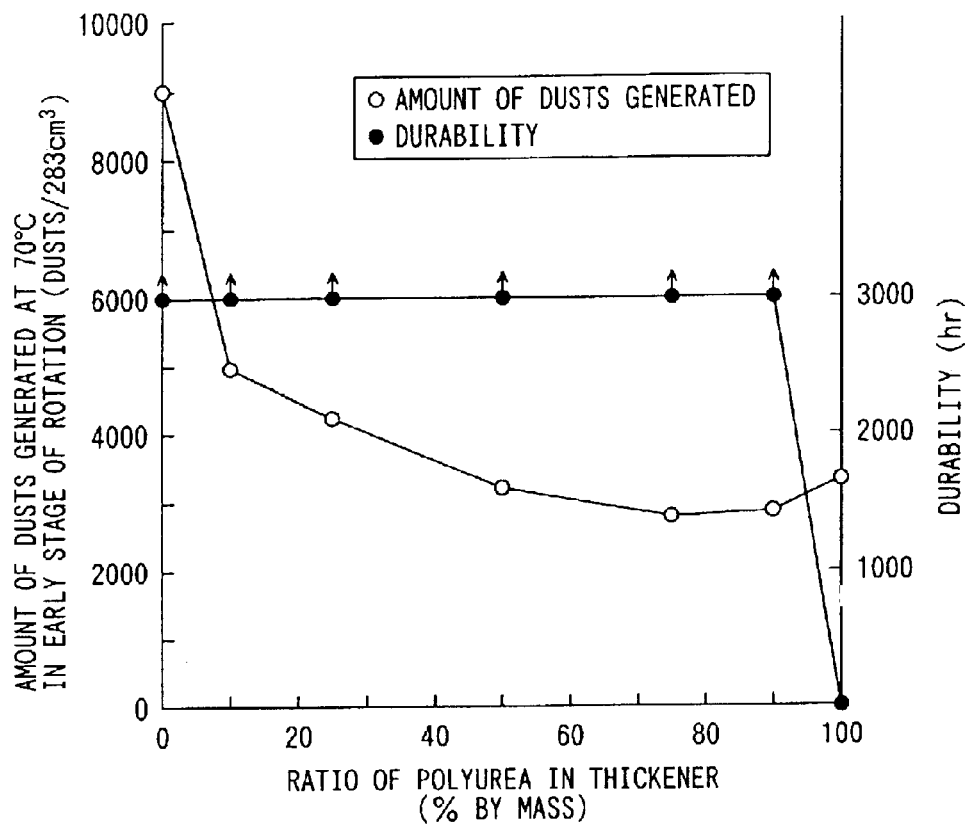
FIG. 11 is a graph showing the correlation between the ratio of polyurea in a thickener, and the amount of dusts generated from a grease composition and the durability of the grease composition.

The graph in FIG. 11 shows that both the amount of dusts generated in the early stage of rotation and the durability at 70° C. were excellent when the ratio of polyurea was 10 to 90% by mass. In passing, the durability is 0 hr where the ratio of polyurea is 100% by mass, and this is because the evaluation on the acoustic performance in the early stage of rotation was unsatisfactory and therefore the durability was evaluated as 0 hr.

Subsequently, the content of thickeners in a grease composition was studied. That is, various contents of thickeners were applied to the grease composition in Example H1, so that various grease compositions were prepared. Then, the amount of dusts generated in the early stage of rotation and the worked penetration at 70° C. were evaluated by the same method as described above. The results are shown in a graph in FIG. 12.

Figure 12:
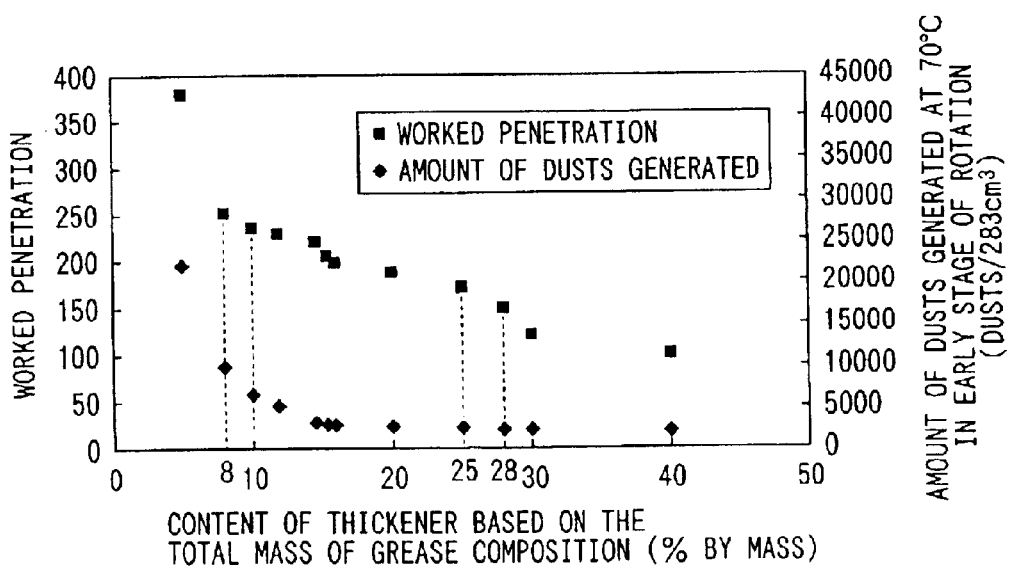
FIG. 12 is a graph showing the correlation between the content of a thickener based on the total mass of a grease composition, and the worked penetration and the amount of dusts generated from the grease composition.

The graph in FIG. 12 shows that the grease compositions generated a small amount of dusts in the early stage of rotation at 70° C. and the value of worked penetration was also appropriate, when the content of thickeners was 8 to 28% by mass. Moreover, it is also found that the grease compositions generated a further smaller amount of dusts in the early stage of rotation at 70° C. and the value of worked penetration was also more appropriate, when the content of thickeners was 10 to 25% by mass.

(I) Grease Composition Comprising Polyurea and Complex Metallic Soap as Thickeners Tables 20 to 23 show the composition (the unit of figures is % by mass), worked penetration and dropping point of each of grease compositions in Examples and Comparative Examples. The methods for measuring worked penetration and dropping point are according to JIS K2220 5.3 and JIS K2220 5.4, respectively.

TABLE 20

|  |  | Ex. I1 | Ex. I2 | Ex. I3 | Ex. I4 | Ex. I5 |
|---|---|---|---|---|---|---|
| Type of thickeners | Complex metallic soap A | 13.5 | 12.0 | 7.75 | 4.0 | 1.5 |
|  | Complex metallic soap B | — | — | — | — | — |
|  | Diurea A | 1.5 | 4.0 | 7.75 | 12.0 | 13.5 |
|  | Diurea B | — | — | — | — | — |
|  | Diurea C | — | — | — | — | — |
| Mass ratio of complex metallic soap/diurea | | 90/10 | 75/25 | 50/50 | 25/75 | 10/90 |
| Type of base oils | Mineral oil A | 83.0 | 82.0 | 82.5 | 82.0 | 83.0 |
|  | Mineral oil B | — | — | — | — | — |
|  | Mineral oil C | — | — | — | — | — |
|  | Poly α-olefin oil | — | — | — | — | — |
|  | Polyol ester oil | — | — | — | — | — |
|  | Alkyl diphenyl ether oil | — | — | — | — | — |
| Amine antioxidant | | 1.0 | 1.0 | 1.0 | 1.0 | 1.0 |
| Calcium sulfonate | | 1.0 | 1.0 | 1.0 | 1.0 | 1.0 |
| Worked penetration | | 270 | 272 | 280 | 276 | 276 |
| Dropping point (° C.) | | 260 or higher | 260 or higher | 260 or higher | 260 or higher | 260 or higher |
| Durability (hr) | | 300 | 360 | 420 | 340 | 270 |

TABLE 21

|  |  | Ex. I6 | Ex. I7 | Ex. I8 | Ex. I9 | Ex. I10 |
|---|---|---|---|---|---|---|
| Type of thickeners | Complex metallic soap A | 7.25 | 9.0 | — | 7.75 | 5.2 |
|  | Complex metallic soap B | — | — | 7.5 | — | — |
|  | Diurea A | — | — | 7.5 | 7.75 | 5.2 |
|  | Diurea B | 7.25 | — | — | — | — |
|  | Diurea C | — | 9.0 | — | — | — |
| Mass ratio of complex metallic soap/diurea |  | 50/50 | 50/50 | 50/50 | 50/50 | 50/50 |
| Type of base oils | Mineral oil A | 83.5 | 80.0 | 83.0 | 42.5 | 87.6 |
|  | Mineral oil B | — | — | — | 40.0 | — |
|  | Mineral oil C | — | — | — | — | — |
|  | Poly α-olefin oil | — | — | — | — | — |
|  | Polyol ester oil | — | — | — | — | — |
|  | Alkyl diphenyl ether oil | — | — | — | — | — |
| Amine antioxidant |  | 1.0 | 1.0 | 1.0 | 1.0 | 1.0 |
| Calcium sulfonate |  | 1.0 | 1.0 | 1.0 | 1.0 | 1.0 |
| Worked penetration |  | 273 | 272 | 279 | 270 | 338 |
| Dropping point (° C.) |  | 260 or higher | 260 or higher | 260 or higher | 260 or higher | 260 or higher |
| Durability (hr) |  | 480 | 550 | 300 | 320 | 380 |

TABLE 22

|  |  | Ex. I11 | Ex. I12 | Ex. I13 | Ex. I14 |
|---|---|---|---|---|---|
| Type of thickeners | Complex metallic soap A | 9.8 | 7.75 | 7.75 | 7.75 |
|  | Complex metallic soap B | — | — | — | — |
|  | Diurea A | — | 7.75 | 7.75 | 7.75 |
|  | Diurea B | 9.8 | — | — | — |
|  | Diurea C | — | — | — | — |
| Mass ratio of complex metallic soap/diurea |  | 50/50 | 50/50 | 50/50 | 50/50 |
| Type of base oils | Mineral oil A | 78.4 | — | — | — |
|  | Mineral oil B | — | — | — | — |
|  | Mineral oil C | — | — | — | — |
|  | Polyα-olefin oil | — | 82.5 | — | — |
|  | Polyol ester oil | — | — | 82.5 | — |
|  | Alkyl diphenyl ether oil | — | — | — | 82.5 |
| Amine antioxidant |  | 1.0 | 1.0 | 1.0 | 1.0 |
| Calcium sulfonate |  | 1.0 | 1.0 | 1.0 | 1.0 |
| Worked penetration |  | 229 | 279 | 286 | 269 |
| Dropping point (° C.) |  | 260 or higher | 260 or higher | 260 or higher | 260 or higher |
| Durability (hr) |  | 400 | 900 | 1370 | 2280 |

TABLE 23

|  |  | Com. Ex. I1 | Com. Ex. I2 | Com. Ex. I3 | Com. Ex. I4 |
|---|---|---|---|---|---|
| Type of thickeners | Complex metallic soap A | 16.0 | — | 7.75 | 2.9 |
|  | Complex metallic soap B | — | — | — | — |
|  | Diurea A | — | 15.0 | 7.75 | 2.9 |
|  | Diurea B | — | — | — | — |
|  | Diurea C | — | — | — | — |
| Mass ratio of complex metallic soap/diurea |  | 100/0 | 0/100 | 50/50 | 50/50 |
| Type of base oils | Mineral oil A | 82.0 | 83.0 | — | — |
|  | Mineral oil B | — | — | — | 92.2 |
|  | Mineral oil C | — | — | 83.0 | — |
|  | Polyα-olefin oil | — | — | — | — |
|  | Polyol ester oil | — | — | — | — |
|  | Alkyl diphenyl ether oil | — | — | — | — |
| Amine antioxidant |  | 1.0 | 1.0 | 1.0 | 1.0 |
| Calcium sulfonate |  | 1.0 | 1.0 | 1.0 | 1.0 |
| Worked penetration |  | 275 | 289 | 299 | 390 |
| Dropping point (° C.) |  | 260 or higher | 260 or higher | 260 or higher | 260 or higher |
| Durability (hr) |  | 190 | 120 | 190 | 130 |

As is clear from each table, the grease compositions in Example I1 to I4 comprised both polyurea and a complex metallic soap as thickeners. In contrast, the grease composition in Comparative Example I1 comprised only the complex metallic soap as a thickener, and the grease composition in Comparative Example I2 comprised only polyurea as a thickener. Moreover, the grease composition in Comparative Example I3 comprised a mineral oil having a low kinematic viscosity as a base oil, and the grease composition in Comparative Example I4 comprised a mineral oil as abase oil and had too large worked penetration.

The term "complex metallic soap A" in each table is used to mean a lithium complex soap, which was synthesized from 12-hydroxystearic acid and azelaic acid. The mass ratio between 12-hydroxystearic acid and azelaic acid is 75% by mass: 25% by mass. The term "complex metallic soap B" is used to mean a lithium-calcium complex soap, which was synthesized from 12-hydroxystearic acid and azelaic acid. The mass ratio between 12-hydroxystearic acid and azelaic acid is 80% by mass: 20% by mass, and the mass ratio between lithium and calcium is 50% by mass: 50% by mass.

The term "diurea A" in each table is used to mean a urea compound, which was synthesized from 4,4'-diphenylmethane diisocyanate and cyclohexylamine. The term "diurea B" is used to mean a urea compound, which was synthesized from 4,4'-diphenylmethane diisocyanate, cyclohexylamine and p-toluidine. The mass ratio between cyclohexylamine and p-toluidine is 80:20. The term "diurea C" is used to mean a urea compound, which was synthesized from 4,4'-diphenylmethane diisocyanate, cyclohexylamine and p-toluidine. The mass ratio between cyclohexylamine and p-toluidine is 50:50.

The term "mineral oil A" in each table is used to mean a mineral oil having a kinematic viscosity at 40° C. of 98.3 mm$^2$/s, "mineral oil B" is used to mean a mineral oil having a kinematic viscosity at 40° C. of 460 mm$^2$/s, and "mineral oil C" is used to mean a mineral oil having a kinematic viscosity at 40° C. of 33.1 mm$^2$/s. Moreover, in each table, the kinematic viscosity at 40° C. of a poly α-olefin oil is 68.0 mm$^2$/s, that of a polyol ester oil is 68.3 mm$^2$/s, and that of an alkyl diphenyl ether oil is 97.0 mm$^2$/s.

Then, a rolling bearing, which was filled with each of these 18 types of grease compositions, was prepared to evaluate the durability.

Figure 13:
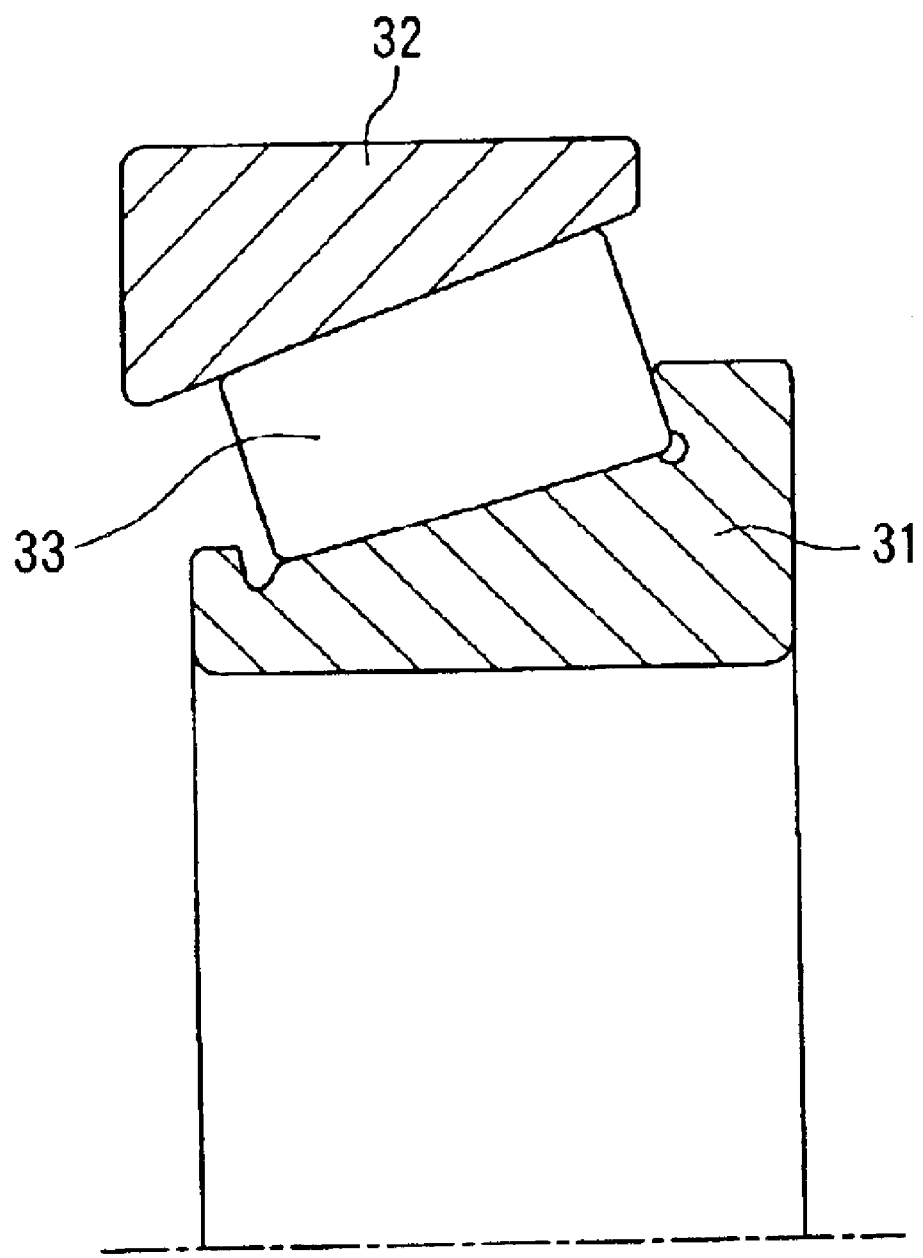
FIG. 13 is a partial longitudinal sectional view showing the configuration of a tapered roller bearing, which is one embodiment of the rolling apparatus of the present invention.

The used rolling bearing is a tapered roller bearing (Nominal No. 30205, inside diameter: 25 mm, outside diameter: 52 mm, width: 16.25 mm), which is comprised of: an inner ring 31; an outer ring 32; and a plurality of rollers 33, which are disposed between the inner ring 31 and the outer ring 32 so as to flexibly roll therebetween (refer to FIG. 13). The inner space of the bearing is filled with a grease composition which is not shown in the figure.

A radial load of 980 N and an axial load of 980 N were applied to this tapered roller bearing, the temperature of the outer ring 32 was set at 150° C., and the inner ring 31 was rotated at a rotation speed of 8,000 min$^{-1}$. Seizuring life was defined as a time taken until the temperature of the outer ring 32 rose to 155° C., or a time taken until the bearing torque rose and it caused motor overcurrent. Using such a seizuring life, durability was evaluated. When the tapered roller bearing did not reach its seizuring life even after 200 hours passed, it was evaluated as satisfactory. The thus evaluated durability of a tapered roller bearing is also shown in Tables 20 to 23.

As is clear from Tables 20 to 23, bearings filled with the grease compositions in Examples I1 to I14 which comprised both polyurea and a complex metallic soap as thickeners, had durability much more excellent than that of bearings filled with the grease compositions in Comparative Examples I1 and I2 which only comprised either one of the above thickeners.

Since the grease composition in Comparative Example I3 comprised a mineral oil having a low kinematic viscosity as a base oil, a bearing filled with this grease composition had durability inferior to a bearing filled with the grease composition in Example I9 (which comprises a mineral oil having a high kinematic viscosity as a base oil). Moreover, since the grease composition in Comparative Example I4 comprised a mineral oil as abase oil and had too large worked penetration, a bearing filled with this grease composition had durability inferior to a bearing filled with the grease composition in each of other Examples.

Figure 14:
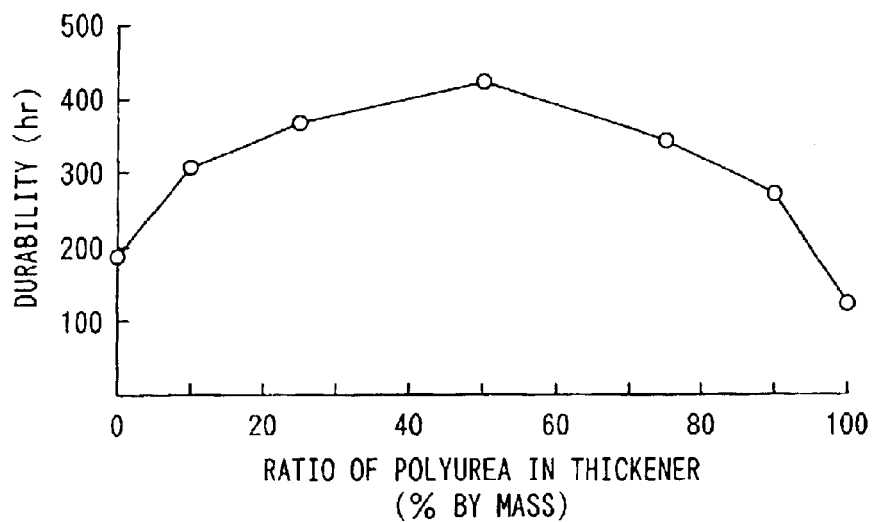
FIG. 14 is a graph showing the correlation between the ratio of polyurea in a thickener and the durability of a bearing.

Now, the ratio between polyurea and a complex metallic soap in a thickener is considered, while referring to FIG. 14. FIG. 14 is a graph showing the durability of a bearing which was filled with each of the grease compositions in Examples I1 to I5. This graph shows that the durability is excellent when the ratio of polyurea is 10 to 90% by mass based on the total mass of the thickener, and that the durability is more excellent when the ratio is 25 to 75% by mass.

Figure 15:
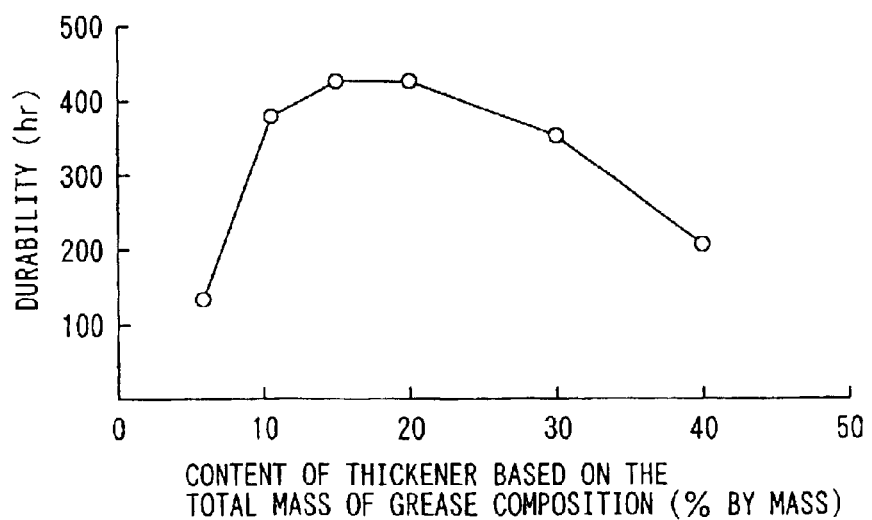
FIG. 15 is a graph showing the correlation between the content of a thickener based on the total mass of a grease composition and the durability of a bearing.

Subsequently, the content of thickeners in a grease composition was studied. That is, various contents of thickeners were applied to the grease composition in Example I3, so that various grease compositions were prepared. Then, their durability was evaluated by the same method as described above. The results are shown in a graph in FIG. 15.

This graph shows that a bearing has excellent durability, when the content of thickeners is 10 to 30% by mass.

These embodiments are provided for illustrative purposes only, and are not intended to limit the scope of the invention. For example, in the present embodiments, a deep groove ball bearing and a tapered roller bearing were used to explain the rolling apparatus of the present invention. However, the present invention can be applied to other various types of rolling bearings, which include radial bearings such as an angular ball bearing, a self-aligning ball bearing, a cylindrical roller bearing, a needle roller bearing and a self-aligning roller bearing, and thrust bearings such as a thrust ball bearing and a thrust roller bearing.

Moreover, the present invention is not limited to a rolling bearing, but can be applied to other various types of rolling apparatus. Examples of such rolling apparatuses include a ball screw, a linear guide apparatus, a linear bearing and others.

What is claimed is:

1. A grease composition comprising a base oil and a thickener which contains a calcium sulfonate complex and a second thickener component, wherein said calcium sulfonate complex comprises calcium sulfonate and calcium carbonate as essential components, and further comprises two or more compounds selected from the group consisting of calcium dibehenate, calcium distearate, calcium dihydroxystearate, calcium borate and calcium acetate.

2. The grease composition according to claim 1, wherein said second thickener component is polyurea.

3. The grease composition according to claim 1, wherein said second thickener component is a metallic soap.

4. The grease composition according to claim 1, wherein said second thickener component is a complex metallic soap.

5. The grease composition according to claim 1, wherein said second thickener is an N-substituted terephthalamic acid metal salt.

6. The grease composition according to claim 1, wherein said thickener comprises 5 to 95% by mass of the calcium sulfonate complex and 95 to 5% by mass of said second thickener component.

7. The grease composition according to claim 6, wherein the content of said thickener is 3 to 40% by mass based on the total mass of the composition.

8. The grease composition according to claim 6, wherein the content of said thickener is 8 to 25% by mass based on the total mass of the composition, and the grease composition has a worked penetration of 230 to 290.

9. The grease composition according to claim 6, wherein said base oil comprises a neopentyl-type polyol ester oil, and the content of the neopentyl-type polyol ester oil is 800 or more by mass based on the total mass of the base oil.

10. The grease composition according to claim 9, which comprises 80 to 97 parts by mass of said base oil and 3 to 20 parts by mass of said thickener.

11. The grease composition according to claim 9, which has a biodegradability of 800 or higher according to the Coordinating European Council guideline CEC L-33-T-82.

12. A rolling apparatus comprising an inner member having a raceway surface on the outer surface; an outer member which has a raceway surface opposed to the raceway surface of said inner member and is disposed outside of said inner member; and a plurality of rolling elements which are disposed between said two raceway surfaces so as to flexibly roll therebetween, wherein a space, which is formed between said inner member and said outer member and in which said rolling elements are disposed, is filled with the grease composition according to claim 1.

13. A grease composition comprising a base oil and a thickener which contains an N-substituted terephthalamic acid metal salt and a second thickener component, wherein said second thickener component is a metallic soap.

14. The grease composition comprising to claim 13, wherein said second thickener component is a complex metallic soap.

15. The grease composition according to claim 13, wherein said thickener comprises 5 to 95% by mass of the N-substituted terephthalamic acid metal salts and 95 to 5% by mass of said second thickener component.

16. The grease composition according to claim 15, wherein the content of said thickener is 3 to 40% by mass based on the total mass of the composition.

17. The grease composition according to claim 15, wherein said base oil comprises a neopentyl-type polyol ester oil, and the content of the neopentyl-type polyol ester oil is 80% or more by mass based on the total mass of the base oil.

18. The grease composition according to claim 17, which comprises 80 to 97 parts by mass of said base oil and 3 to 20 parts by mass of said thickener.

19. The grease composition according to claim 17, which has a biodegradability of 80% or higher according to the Coordinating European Council guideline CEC L-33-T-82.

20. A rolling apparatus comprising an inner member having a raceway surface on the outer surface; an outer member which has a raceway surface opposed to the raceway surface of said inner member and is disposed outside of said inner member; and a plurality of rolling elements which are disposed between said two raceway surfaces so as to flexibly roll therebetween, wherein a space, which is formed between said inner member and said outer member and in which said rolling elements are disposed, is filled with the grease composition according to claim 13.

* * * * *